US007870126B2

(12) United States Patent
Lester et al.

(10) Patent No.: US 7,870,126 B2
(45) Date of Patent: Jan. 11, 2011

(54) CAMPAIGN AWARENESS MANAGEMENT SYSTEMS AND METHODS

(75) Inventors: Brett A. Lester, Overland Park, KS (US); Scott A. Evans, Lenexa, KS (US); Larry D Miley, Kansas City, KS (US); Scott R. Carpenter, Wichita, KS (US); Dan W Schwartz, Belton, MO (US)

(73) Assignee: CeleritasWorks, LLC, Overland Park, KS (US)

(*) Notice: Subject to any disclaimer, the term of this patent is extended or adjusted under 35 U.S.C. 154(b) by 215 days.

(21) Appl. No.: 11/933,279

(22) Filed: Oct. 31, 2007

(65) Prior Publication Data

US 2008/0147738 A1  Jun. 19, 2008

Related U.S. Application Data

(60) Provisional application No. 60/870,819, filed on Dec. 19, 2006.

(51) Int. Cl.
*G06F 17/30* (2006.01)
(52) U.S. Cl. .................... 707/724; 707/721; 707/729; 707/769; 707/E17.014; 707/E17.018; 707/E17.03; 707/999.002; 707/999.104
(58) Field of Classification Search ............ None
See application file for complete search history.

(56) References Cited

U.S. PATENT DOCUMENTS 6,968,366 B1 * 11/2005 Zhang et al. ............ 709/219

| 2002/0161646 | A1 | 10/2002 | Gailey et al. |
| 2003/0216966 | A1 | 11/2003 | Saenz et al. |
| 2004/0024608 | A1 * | 2/2004 | Saenz et al. ............ 705/1 |
| 2004/0068435 | A1 | 4/2004 | Braunzell |
| 2005/0182676 | A1 | 8/2005 | Chan |
| 2006/0143082 | A1 * | 6/2006 | Ebert ............ 705/14 |
| 2007/0027754 | A1 * | 2/2007 | Collins et al. ............ 705/14 |
| 2007/0162926 | A1 | 7/2007 | Steelberg et al. |
| 2008/0086356 | A1 | 4/2008 | Glassman et al. |
| 2008/0154675 | A1 | 6/2008 | Lester et al. |
| 2008/0154700 | A1 | 6/2008 | Lester et al. |
| 2009/0284530 | A1 | 11/2009 | Lester et al. |

OTHER PUBLICATIONS

Doyle, Shaun, "How is Geography Supporting Marketing in Today's Commercial Organizations", Henry Stewart Publications, Journal of Database marketing vol. 1, 1, 85-89, Jun. 25, 2001.
Office Action for U.S. Appl. No. 11/933,249, Community Awareness Management Systems and Methods, dated Aug. 2, 2010, 19 pages.
Office Action for U.S. Appl. No. 11/933,291, Community Awareness Management Systems and Methods, dated Aug. 31, 2010, 7 pages.

* cited by examiner

*Primary Examiner*—Hung T Vy
*Assistant Examiner*—Andalib F Lodhi

(57) ABSTRACT

A campaign management system manages campaign data for one or more campaigns and geospatial data for areas in which the campaigns are directed. The system performs spatial queries, data queries, and/or geocode-based queries, generates maps geographically identifying where campaign events are occurring in the geographic area, and generates feature data for display. Campaign symbology, such as shading, color coding, patterns, icons, or other symbols identify one or more campaign events in the geographic area.

7 Claims, 50 Drawing Sheets

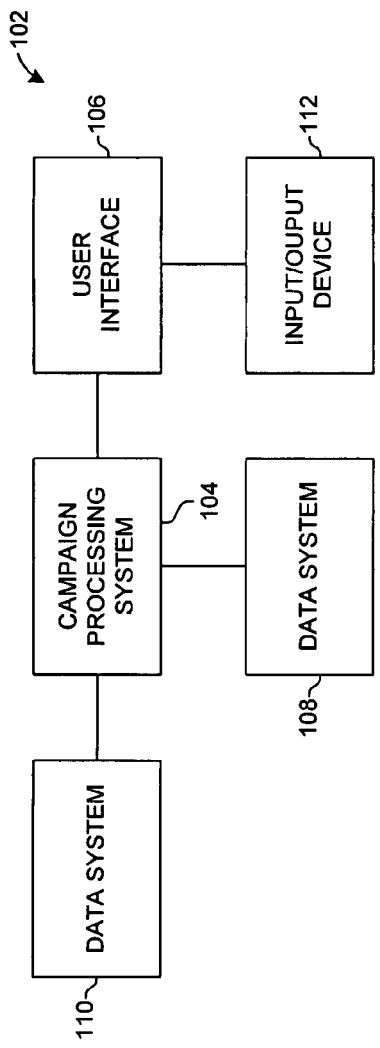
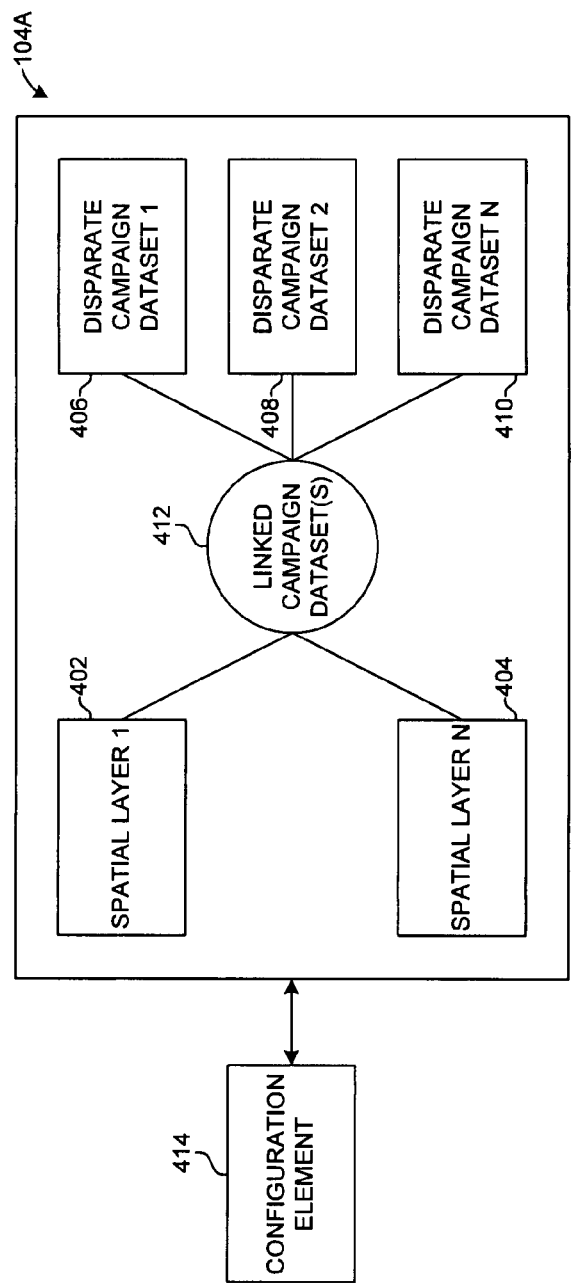

Celeritas®
Campaign Awareness Manager
Patent Pending
Version 1.3
Username
Password
Login
 To request an account, click here.
 If you forgot your password, click here.
FIG. 10

Campaign Entry (Attribute Values)

Enter values for any of the defined attributes for this type of campaign. Only the values marked with the ( o ) symbol are required Name: Smell Gas?
Type: Radio
Cost:
Audience Potential:
Frequency/Channel:
Other:
Format:
Vendor Company and Contact:
Rating:

[Back] [Next] [Cancel]

Tool Category

Campaign Research Tools

⊙ Campaigns by State
○ Campaigns by County
○ Campaigns by Zip Code
○ Campaigns by Audience Type
○ Campaigns by Content Type
○ Campaigns by Name

CAMPAIGN AWARENESS MANAGEMENT SYSTEMS AND METHODS

RELATED APPLICATIONS

This application takes priority to U.S. Patent App. Ser. No. 60/870,819, entitled Campaign Awareness Management Systems and Methods, filed Dec. 19, 2006, the entire contents of which are hereby incorporated herein by reference. This application is related to Ser. No. 11/933,249, entitled Campaign Awareness Management Systems and Methods, Ser. No. 11/933,269, entitled Campaign Awareness Management Systems and Methods, and Ser. No. 11/933,291, entitled Campaign Awareness management Systems and Methods, all filed on the same date as this application, the entire contents of which are hereby incorporated herein by reference.

FEDERALLY SPONSORED RESEARCH OR DEVELOPMENT

Not Applicable.

COMPACT DISK APPENDIX

Not Applicable.

BACKGROUND OF THE INVENTION

A campaign is an organization of advertising, marketing, sales, and/or informational activities aimed at communicating one or more messages to a particular audience and/or a broad audience. Sometimes, a campaign is directed toward a particular geographic area and/or a broad geographic area.

A campaign may be organized to convey various messages using various types of campaigns. For example, a utility or government entity may design a campaign to instruct the general public to call the utility company or another entity before excavating land in order to determine if a utility line is present in that area. The campaign may identify a phone number, a website, or other information that may be accessed by the general public and may identify other safety features or safety instructions to the general public. The campaign may communicate the information through radio advertisements, television advertisements, print advertisements, information on one or more websites, fliers, or other information vehicles.

In another example, a restaurant may design a campaign to inform customers of a new menu product. The restaurant may design advertising directed to a certain regional geographic area and directed to a specific demographic, such as 18-25 year old people. In this example, the restaurant may communicate their message through television advertisements and radio advertisements only.

Generally, money and/or other resources are expended for a campaign. However, the person or entity that is generating the campaign is not able to adequately determine whether or not the campaign was effective or to what extent it was effective. The person or entity is unable to determine the effectiveness of the specific communication mechanism, whether the message reached the intended audience, or whether the message made a difference in a geographic area.

There is a need to identify the effectiveness of advertising, marketing, sales, and/or informational campaigns. There is a need to identify the effectiveness of a campaign relative to a geography and, generally, to identify campaign information.

SUMMARY OF THE INVENTION

In one aspect, a campaign processing system comprises a data management system configured to manage storage and retrieval of campaign data for at least one campaign and geospatial data for an area to which the at least one campaign is directed. A spatial management system is configured to initiate a query of the geospatial data and the campaign data, to determine selected feature data corresponding to the query, and to generate map image data for at least one image, the selected feature data comprising selected campaign data, the at least one image identifying at least a portion of the area and campaign symbology identifying at least one campaign event for the at least one campaign. A program management system is configured to generate the query to the spatial management system, to receive the selected feature data and the at least one image data from the spatial management system, and to generate the feature data and the at least one image data for display.

Some aspects include external data. In some embodiments, the external data is linked to campaign data and/or spatial data.

BRIEF DESCRIPTION OF THE DRAWINGS

FIG. 1 is a diagram of a campaign management system in accordance with an embodiment of the present invention.

FIG. 4 is a block diagram of linked data in a campaign management system in accordance with an embodiment of the present invention.

FIGS. 10-52 are screen views of a user interface for a campaign management system in accordance with an embodiment of the present invention.

DETAILED DESCRIPTION

Figure 2:
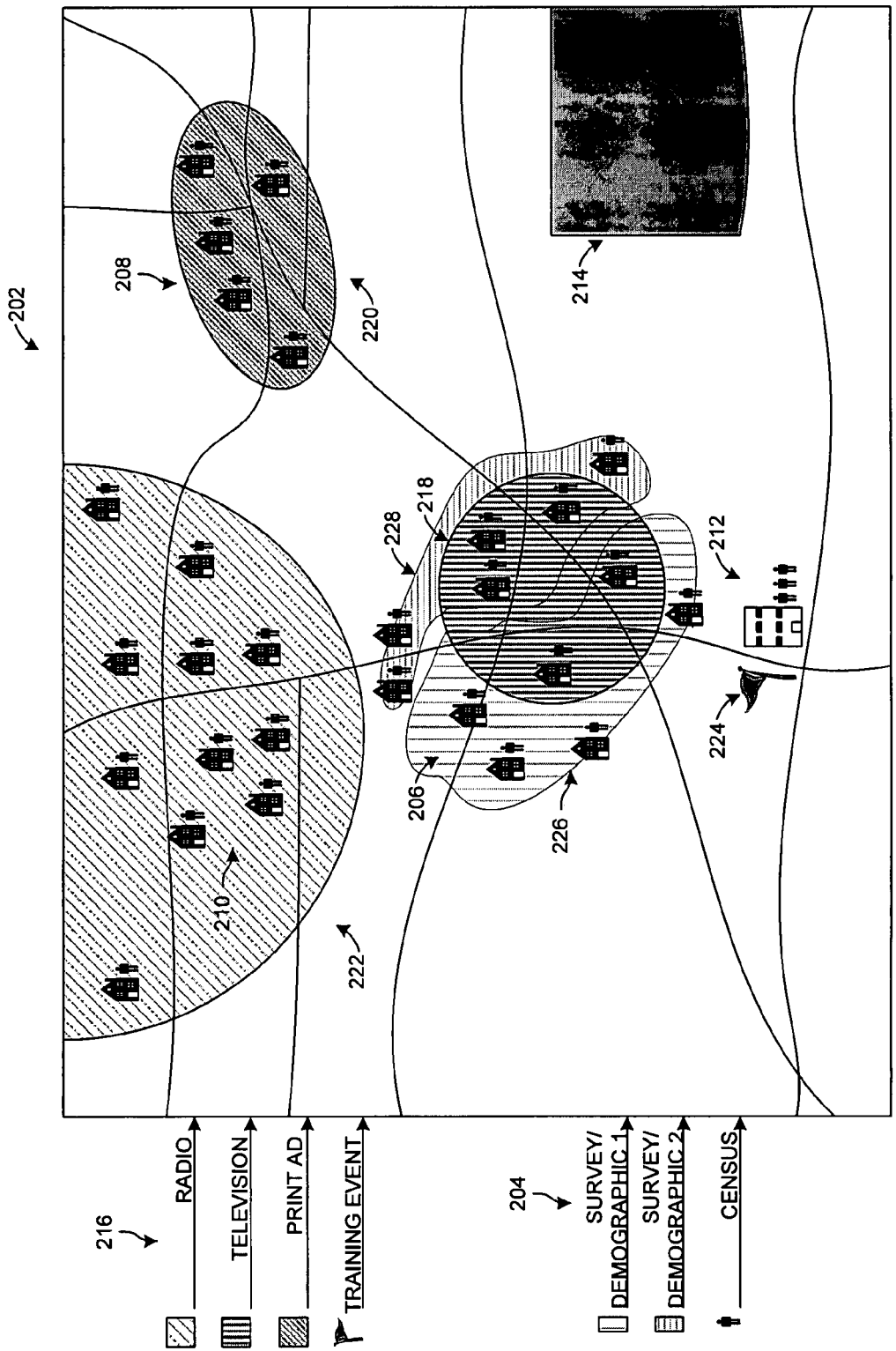
FIG. 2 is a diagram of multiple campaign types for a campaign and external data in a geographic region in accordance with an embodiment of the present invention.

The campaign management system may manage one or more campaigns or one or a variety of different types of campaigns. A campaign is the organization of advertising, marketing, sales, and/or informational activities aimed at communicating one or more messages to a particular audience and/or a broad audience. Sometimes, the campaign may be directed toward a particular geographic area and/or a broad geographic area. In these instances, the campaign has a geography.

A campaign may have one or more campaign events. In some instances, a campaign has a single event. In other instances, a campaign has multiple events. An event includes a message conveyed by a communication or a mechanism to convey a message, such as by mail, email, phone calls, training, attendance, a meeting, personal communication, radio, television, newspaper, magazines, print advertisement, other media, or otherwise, including communications with attached electronic or paper documentation, business relations, and other actions taken with regard to a campaign. In one example, an event includes a message broadcast by a radio station. In another example, an event includes a mailing to a zip code. In another example, an event includes distributing cups with a safety message. In another example, an event includes placing informational material on point of sale devices. In another example, an event includes broadcasting a television advertisement for a product. In another example, an event includes providing a website with informational material. In another example, an event includes conveying a message for a campaign type.

Event data (event attributes) identifies different features or aspects of one or more events for one or more campaigns. In one example, event data includes the cost for a radio advertisement. In another example, event data includes an address, a city, a county, a contact person name, a phone number for a contact person, and an identification of a speaker for a training event. In some examples, event data may include one or more journal entries and/or one or more documents or document data. Event data alternately is referred to as one or more event attributes.

FIG. 1 depicts an exemplary embodiment of a campaign management system 102. The campaign management system 102 manages campaign data, geospatial data, external data for campaigns, and/or other data. The campaign management system 102 identifies and tracks one or more events for a campaign, including one or more events occurring in a region or geographic area and one or more events that occur at a location, such as an address or a place. In one embodiment, the campaign management system 102 geographically identifies campaign events, such as on a map. In one example, the campaign management system 102 identifies a radio advertisement for a campaign in a geographic area. In another example, the campaign management system 102 identifies a location of a training session on a map of a city. In some examples, the campaign management system 102 also manages campaigns by the types of campaigns, messages, content, geography, events, attributes, and/or geospatial data.

The campaign management system 102 tracks, manages, displays, and measures the effectiveness of one or more campaign events. In one embodiment, the campaign management system 102 measures the effectiveness of one or more campaign events relative to a geography.

The campaign management system 102 enables linking campaign data and geospatial data in some embodiments. Further, external data, such as surveys, a census, demographic data, result-related data, or other information may be linked to campaign data or geospatial data to indicate the effectiveness of the message. For example, a message may be generated to a specific geographic area. Census data or demographic data may be linked to the campaign data, which may enable correlating the campaign data for a geographic area with its demographics to determine if the type of message and its content are appropriate for that area. In another example, a survey data layer may be linked to the campaign data and geographic data. In this example, the survey data indicates if the message was received by the intended target audience and whether or not the message was effective using one or more vehicles. For example, linked data may indicate whether a television or radio informational segment conveyed the intended message to the intended targets and whether the intended targets responded to the message. In another example, linked data may indicate whether an outreach program extended over a number of years worked to reduce drug use in an area.

Campaigns can be delivered in a variety of vehicles. A campaign type is a particular vehicle or mechanism with which a message is communicated to an audience and/or a geographic area. For example, a campaign type may indicate whether a message is generated using radio or television advertisements or informational-style advertisements, print advertising or information, or direct mail campaigns. Examples of campaign types include direct mail, email, webcast, video, internet, magazine, newspaper, print, radio, television, telephone, tradeshow, fair, training, meeting, survey, billboard, bill stuffer, special interest group, point of sale, public relations, informational segment, outreach program, safety, and/or other campaign types. Other examples exist.

For each of the campaign types, a campaign attribute generally is identified. A campaign attribute identifies a characteristic of a campaign that assists in the measurement of the scope of a particular campaign and/or the reach, frequency, cost, return on investment, efficiency, and/or effectiveness of the campaign. For example, identifying a campaign by the campaign type of direct mail is broad. A direct mail mailing may be made, for example, by a 3×5 inch card. Another type of direct mail may be an 8×11 inch color informational advertisement. In these examples, the 3×5 inch card and 8×11 color are campaign attributes for a direct mail campaign. Other examples exist.

The specific attributes of the direct mail mailing will assist a campaign manager in determining what does and does not work. The campaign attributes provide a way to expand the information associated with the campaign message and the campaign type.

One campaign attribute includes a designation of the form of the campaign type. The form indicates the format of the message and/or how the message is conveyed. In one example, the campaign type may be a magazine. However, information beyond just identifying the campaign type of magazine may be desirable. In these instances, the form may be identified as, for example, a half page or a quarter page, a color advertisement or a black and white informational segment, or another form. In the example of the radio, the form may identify the radio campaign as a talk radio format, a country music radio format, a sports radio format, or another type of radio format.

The campaign attributes may vary for different campaign types. In one example, the direct mail campaign type includes attributes for audience potential (circulation), vendor company and contact, target area, form, description, rating, cost, and other campaign attributes. In another example, the magazine and/or newspaper and/or print include attributes for an audience potential (circulation), vendor company and contact, format, rating, cost, and/or other attributes. In another example, radio and/or television campaign types include attributes for audience potential, vendor company and contact, format, frequency, channel, affiliate, rating, cost, and/or other attributes. In another example, a tradeshow and/or fair include attributes for attendance, vendor company and contact, theme, rating, cost, location, and/or other attributes. In another example, a training campaign type includes attributes for attendance, vendor company and contact, rating, cost, location, and/or other attributes. In another example, a survey campaign type includes attributes for the number of surveys conducted, vendor company and contact, rating, cost, location, and/or other attributes. In another example, a billboard campaign type includes attributes for an audience potential, vendor company and contact, rating, cost, location, and/or other attributes. In another example, a bill stuffer campaign type includes attributes for an audience potential, rating, cost, location, and/or other attributes. In another example, a special interest group campaign type includes attributes for a group, meeting purpose and/or theme, rating, cost, and/or other attributes. In another example, a point of sale campaign type includes attributes for an audience potential, vendor company and contact, rating, cost, location, and/or other attributes. In another example, a public relations campaign type includes attributes for an audience potential, rating, cost, format, and/or other attributes. In another example, a general campaign type or other campaign types include attributes for an audience potential, contact, rating, format, cost, location, and/or other attributes.

In one embodiment, geographies for a campaign are established from a base set of source geographies. For example, the geographies can be a list of United States counties. A campaign can be based on a selection of the counties. In this example, the specific campaign geography includes a selection of the counties from the source geographies. The newly created campaign geography can be a multipart geography with multiple different selection of source geographies layers, such as states, counties, metropolitan areas, cities, and other areas or locations. The campaign geography also visually and geographically identifies the footprint of the campaign. In another example, the campaign geography is a pipeline buffer. The buffer is broken into regions, sub-parts, portions of the pipeline having different owners or entities, lines, or another geography.

In one example, the geography for a broad-coverage campaign type includes a particular area or a general area. For example, a geography identified as a county and/or a state may be identified for campaign types for direct mail, magazine, newspaper, print, radio, television, and/or surveys. In another example, other campaign types may be identified with a location for a geography, such as an address, geographic feature, coordinate, or other location. For example, an address may be identified as a geography for a tradeshow, a fair, a training event, a meeting, a billboard, and/or a public relations event. In another example, a zip code or city may be identified as a geography for a campaign type. For example, a city or a zip code may be identified as a geography for a billboard, bill stuffers, point of sale, and/or public relations. In other examples, a region or an area may be identified as the geography, such as the southwest United States, the northern part of a city, a broadcast area for a radio station, or another region or area. Other examples exist.

A campaign also may identify the message content and/or the content type for the message. A campaign may include multiple messages for multiple campaign types. The message content/content type identify the subject matter of the message, such as whether the message was a safety message or a product advertisement, whether the message was communicated in English, Spanish, or another language, and whether a Spanish message was communicated using a Spanish radio station or a Spanish newspaper. With the message content attribute, one can measure the number of times a particular message is conveyed and how the message was conveyed. Some messages are general, while other messages attempt to convey a particular idea or issue. Different message content and content type vehicles may be used for different campaign types. Some campaigns or campaign strategies may include one or more messages, one or more pieces of content that are to be tracked throughout the course of the campaign, a period of time for a campaign, and other data for the campaign. In some instances herein, the terms message content, content type, and message content type are used synonymously.

The message content may be tracked to provide a measure of how many times a particular message was conveyed to one or more market places. For example, a One Call campaign may include a "call before you dig" message, a damage prevention message, and a public awareness message. Specific campaign attributes may be identified for each type of message, including a period of time for which the message was conveyed to a particular industry, market, or general audience, and each message may have a different layer of information or awareness data associated with it. At the end of, or within, a selectable time period for the campaign, the campaign management system 102 is able to identify how many times each message with its particular content was conveyed. That information may be correlated with external data by the campaign management system 102, such as data identifying whether the number of dig-related accidents or phone calls to a One Call center increased or decreased during the time period for the campaign.

In another example, a pipeline company in California may include advertisements for a "call before you dig" and earthquake preparedness. An advertisement may include messages directed to both the earthquake preparedness and the "call before you dig" messages. Alternately, advertisements may be directed to only one or the other message. The campaigns for the "call before you dig" and the earthquake preparedness are identified by the message content that was distributed or otherwise conveyed and the content included in the messages. That message content data may be correlated against other campaign data by the campaign management system 102, such as safety records or utility records, to identify the level of effectiveness of the messages conveyed in the geographic area.

Some examples of message content/message content types include "call before you dig," damage prevention, underground and/or above ground prevention, public awareness, awareness of hazards, earthquake preparedness, emergency preparedness, incident response notification, training, 811, hurricane restoration, pipeline safety, safety, and/or other message content types. Other examples of message content include product identification, product awareness, product advertising, services identification, services advertising, services awareness, informational message, general advertising, contacts, and/or other message contents.

Another campaign attribute includes an audience. An audience and/or audience type identifies the targets or intended recipients of one or more campaign messages. The audience may identify a single audience or multiple audiences. For example, the audience may include school principals, police, fire, and emergency responders for one campaign. Audiences for another campaign may include particular demographics, such as an age range, an occupation, a job title, and/or persons having particular responsibilities. Other examples of audiences include people that listen to the radio or view a particular station, program, or time slot. Other examples of audiences include people that receive a service, such as phone, cable, a food service, a home or lawn service, or an information or entertainment service. Another example of audiences includes people that buy or sell specific products. Other examples of audiences include people within a selected number of miles from a utility, a bank, a power plant, a school, or another business, building, or entity. Other examples of audiences include people in a region or area or other people of interest or people that live in an area of interest to which a message is to be communicated. Other examples exist.

Audience data (audience attributes) identifies different features or aspects of one or more audience members and audience types. In one example, audience data (audience attributes) includes an audience member name, an audience type, such as an emergency official, responder, police, firefighter, a resident, the public, an excavator, a business, a purchase agent or purchaser, a service person, or another audience type, an address, a city, a county, and/or a phone number. In another example, audience data (audience attributes) is located in an audience record or data structure.

Geospatial data comprises geographic data and/or spatial data. Geographic data comprises data identifying a geography, such as a terrain, streets or highways, lakes, other bodies of water, parks, mountains, landmarks, structures, and/or other geographic data, including graphic data, image data, text data, and/or other data. Spatial data comprises data of or representing geographic elements or data, including graphic data, image data, text data, and/or other data, and representing a position or location, such as a position or location in space. Spatial data includes location data or position data, such as a latitude, a longitude, an address, a city, a state, a county, streets, street crossings, locations, points, and/or other data.

A spatial attribute includes one or more points, lines, shapes, symbols, shading, colors, and/or polygons that represent a geographic element, a spatial element, and/or another physical or logical element. A geographic element includes an interest area, an audience area, an audience, a campaign event area, a campaign event, a building, a city, a county, a state, a country, a selected area, an address, a zip code, a location, a point in space, a symbol, and/or another element. Generally, a geographic element has a position or location, such as a position in space. Likewise, a physical element generally has a position, such as a position in space. A geospatial element comprises a spatial element, a geographic element, or both. Geospatial attributes, geospatial data, and geospatial layers may simply be referred to herein as spatial attributes, spatial data, and spatial layers respectively.

A geocode identifies a geographic location of a place or a thing. A geocode may be, for example, a latitude and a longitude of a location. However, other location identifiers may be used to designate a geographic location. Examples of location identifiers are latitude and longitude coordinates, north, south, east, west, up, down, left, right, vertical and horizontal coordinates, North America Data (NAD) 27, NAD 83, axial coordinates, other ordinate systems, positioning indicators, mark identifiers, and/or other location identifiers.

In one embodiment, the campaign management system 102 includes a browser-based geographic information services (GIS) functionality used to manage events for one or more campaigns and to track and identify events for a campaign, including events in one or more geographic areas or locations or regions. With the GIS functionality, a user can quickly and geographically identify where campaign events occurred and whether a campaign event was generated for a location or a region or other geographic area.

One or more types of campaign symbology may be used to identify one or more various campaign events. Campaign symbology may include color codes, shading, patterns, icons, other shapes or symbols, and/or other symbology. In one example, campaign events within an interest area are color coded for a GIS-based display to identify selected designations for a campaign event. For example, a geographic area on a map may be color coded with a first color designation to identify a television campaign event for that area. In another example, another geographic area on a map may be color coded with another designation to identify a radio campaign for the same or another campaign message. In another example, a flag or other symbol on a map of a geographic area may identify a location of a training event or billboard for another campaign event.

In one embodiment, the campaign management system 102 enables users to enter journal entries. The journal entries may be associated with a campaign or one or more campaign attributes or campaign data, including an audience or audience member, and including one or more campaign events. The journal entries also may be associated with a geographic area. In one example, a journal entry may be associated with a message for a training campaign type.

Journal entries may have an associated journal entry type. In one embodiment, journal entry types include memo, note, email, phone call, meeting, cost, message, rating, form, documentation, correspondence, and/or other journal entry types.

A journal entry has journal data with one or more descriptions, comments, user information, audience information, event information, message content information, and/or other campaign information. Journal entries may have one or more journal attributes, such as a phone number, a fax number, an email address, a contact or audience name, a contact or audience type, a company name, a title, an address, a city name, a county name, a state name, a zip code, a region, statistical information, a free-form field entry, and other data types. Other journal entry attributes may include a note, a memo, a letter, an email, a phone call, a linked document, a video, a graphic, audio, a meeting, another communication, information, an advertisement, and/or another journal entry type In one embodiment, the journal entry includes a document. In one example, a journal entry is used to document a name and address of an audience member. In another example, a journal entry is used to document one or more campaign events for one or more campaigns. In another example, a journal entry is used to document one or more campaign attributes for a campaign type, including a cost, a location or region, a rating, a form, audience potential, vendor company and contact information, and/or other information related to a campaign.

In one example, the journal entry identifies one or more audience members in attendance at a training event and the context of the conversation with one or more attendees. In another example, a journal entry is associated with a print advertisement for a magazine campaign type. In this example, the journal entry identifies a cost of the print advertisement and a communication with an employee of the vendor specifying the content for the print advertisement. Other examples exist. In some instances, the journal entries are linked to documents, one or more audiences or audience members, campaign data, such as campaign events, or external data. In other instances, documents and/or one or more contacts for one or more audience members are linked or associated with or to one or more journal entries.

In one embodiment, journal entry data is stored in one or more journal records. In another embodiment, each journal entry and the journal data associated with the journal entry is stored in a journal record. In another embodiment, a journal utility maintains journal data in a journal log file for each campaign, campaign event, campaign type, message, audience, and/or other campaign data. The journal log file can contain, for example, one or more events for a campaign, one or more messages conveyed during or for a campaign, the content and type of message, audience data, and/or other campaign data.

In another embodiment, the campaign management system 102 enables linking documents and/or document data to one or more campaigns, campaign data, including one or more campaign events, one or more journal entries, and/or journal data. For example, the campaign management system 102 may enable a user to link one or more documents to one or more campaign events, campaign types, messages, audience data, and/or other campaign data. In one embodiment, a document is linked to campaign event data when the document is transmitted to a vendor company for a campaign type. For example, when a user sends a document to a vendor contact for a campaign event, the user may link the document to the specific data identifying the campaign event and/or the vendor contact. In another example, a user creates a journal entry for a campaign event and associates or links one or more documents to the journal entry. Examples of documents include memos, text documents, word processing documents, PDFs, images, video files, audio files, emails, links, PowerPoint documents, graphics documents, and/or other types of documents. In one example, a document in a document repository is linked or associated with a campaign event using a table having a campaign identification and a corresponding document identification. In another example, a journal in a journal entry repository is linked or associated with a campaign event using a table having a campaign identification and a corresponding journal identification. In another example, a document in a document repository is linked or associated with a contact using a table having a contact identification and a corresponding document identification.

By using the journal utility and/or the link documents utility, a user can manage campaign events and identify documents associated with a campaign event and other notes, memos, and other information associated with the campaign event, including the user's own internal memoranda. By using the journal entries and/or the linked documents, the user can track each communication, action, or other transaction associated with a campaign event and create records that are easily associated and reviewable. A transaction is a communication, message, or action taken with respect to initiating, managing, or terminating one or more campaign events.

The campaign management system 102, including the GIS function, the journal entries/utility, the document linking/link documents utility, and/or the event tracking, can be used for one or multiple industries or systems. The user can use the campaign management system 102 to track events for sales calls, marketing activities for products or services, informational segments, outreach programs, safety awareness programs, damage prevention, other awareness programs, and/or other types of campaigns. Other examples exist.

Referring now to the example of FIG. 2, the campaign management system 102 manages one or more campaign types for a campaign over a geographic area and manages external data associated with the campaign. Campaign data, geospatial data, and/or external data associated with the campaign may be generated for display, such as to a user interface or another type of display.

In the example of FIG. 2, a campaign is produced with multiple campaign events for a geographic area 202. The campaign includes radio, television, and print advertisements events. The campaign also includes a training event, and external data associated with the campaign.

In the example of FIG. 2, the campaign events are depicted in relation to the geographic area and/or geospatial elements. The geographic area 202 may include streets, rivers, lakes, buildings, and/or other geospatial data, including the identification of population.

In the example of FIG. 2, the external data 204 includes demographic data, survey data, and census data. The external census data indicates that residential populations are located in portions 206-210 of the geographic area 202, a business population exists in a portion 212 of the geographic area, and no population or a minimal population exists in a portion 214 of the geographic area. Based on the external data 204 and its identification within the geographic area 202, four campaign events are identified for a campaign. The campaign events include a television campaign event for a first area 218, a print advertisement campaign event for a second geographic area 220, a television campaign event for a third geographic area 222, and a training event at a location 224. Because there is no population or a minimal population in a portion of the geographic area 214, no campaign events are held or identified for that area. In another example, each campaign event is identified for a separate campaign. Thus, the television campaign event is for a television campaign, the print advertisement campaign event is for a print advertisement campaign, the television campaign event is for a television campaign, and the training event is for a training campaign.

Additional external data for the campaign may be linked to the campaign data, the geospatial data, and/or the other external data. For example, external data may be linked to show the results of one or more campaign events and/or the effectiveness or efficiency of one or more campaign events. In the example of FIG. 2, survey data is linked to the campaign data and/or the geospatial data to identify the effectiveness or efficiency of a particular campaign event and whether or not the message for the campaign was adequately conveyed to the anticipated audience. In addition, demographic data is linked to the campaign data and/or the geospatial data to identify whether or not certain demographics are in an area and responded to the message for the campaign events and what the response was. Survey results for a first demographic are depicted for a portion of the geographic area 226 in which the television campaign event was conveyed. Survey results for another demographic are depicted for another portion of the area 228 in which the television campaign event was generated.

It will be appreciated that a user can easily identify geographically where one or more campaign events occurred and the results of those campaign events. A user can easily identify whether a different type of campaign event should be generated based upon some campaign data, including external data related to the campaign. A user can easily identify the types of campaign event messages that were conveyed to an audience and the effectiveness of those messages.

The example of FIG. 2 can be incorporated into a user interface in some embodiments. The user interface may be generated to an output device, such as a browser, a monitor associated with a processing device, or another device. In some examples, the user interface is generated to a mobile device. In other examples, the user interface is generated to a display device or other output device associated with a personal computer (PC) or a device in communication with a network.

In one embodiment, the campaign management system 102 links one or more campaign datasets with one or more spatial layers. The spatial layers and the campaign datasets include features, and the features include spatial attributes and/or campaign data attributes. Campaign data includes campaign type data, attribute data, message content data/message type data, audience data, interest area data, geography data, external data related to one or more campaigns, journal data, document data, and/or other data for or related to one or more campaigns. Campaign data also includes geospatial data in some instances. However, for simplicity the geospatial data will be referred to separately in many references herein.

A data attribute is a member of a collection of data that has a relationship to an element, either directly or indirectly. For example, when grouping campaign event data or other campaign data for a campaign management system, the campaign type is a data attribute that has a relationship to the campaign being managed by the campaign management system. In another example, when grouping finance information for product sales, the sale price is a data attribute that has a relationship to the sale of products. Data for a data attribute may simply be referred to attribute data.

A feature is an element that has one or more feature attributes, including one or more campaign data attributes and/or one or more spatial attributes. The campaign data attributes and/or the spatial attributes have a relationship to each other because of the relationship to the element. For example, a radio advertisement is a feature that has a cost data attribute and a location spatial attribute. A television advertisement is another feature that has a cost data attribute and the same or a different location spatial attribute. Another radio advertisement has another cost data attribute and a different location spatial attribute. Each radio event is a different feature because each radio event can be separately identified with its data attributes and/or spatial attributes. Similarly, the television advertisement event is a different feature because it can be separately identified with its data attributes and/or spatial attributes.

In another example, a first census statistic is a data attribute of a first zip code feature, and a second census statistic is a data attribute of a second zip code feature. In this example, the zip code is a spatial element because it has at least one spatial attribute, such as a position and boundaries.

Data for a feature may be referred to simply as feature data. Data for a data attribute, including data for one or more data attributes and/or one or more spatial attributes, may be referred to simply as feature attribute data or more simply as feature data. Non-geospatial feature data may be referred to as program feature data or campaign feature data or campaign data. Geospatial feature data may be referred to simply as geospatial data or spatial data.

Natural attributes of a feature are those attributes that are inherent to the feature. In one example, a natural attribute of an audience is a resident, a business, or another attribute. In another example, a natural attribute of a radio advertisement is a cost.

Each data attribute and each spatial attribute has a data value. In the above example, the cost attribute and the location attribute of the first radio advertisement event each are populated with a data value. These data values are collected in datasets. The datasets may be in one or more databases, in discreet data sources, or in other locations. In some instances herein and dependent on usage, the data value of the data attribute is referred to simply as the data attribute.

A layer is a collection of similar features that have common types of campaign data attributes and/or spatial attributes. Using the examples above, a radio event layer includes the first radio advertisement as a first feature and the second ratio advertisement as a second feature. The features are grouped in the radio event layer because they have similar data attributes of radio advertisement event data. In another example, an event layer may include all events for a campaign, including the radio advertisements and the television advertisement.

Layers include a spatial data layer, a campaign data layer, and/or other layers. A spatial layer contains or identifies some spatial information, such as a city, county, state, region, area, location, address, zip code, Standard Industry Classification (SIC) code, or another spatial element. Typically, spatial layers are a set of one or more features that have a set of one or more spatial data attributes. For example, a layer of the United States counties might have data for a resident, a business, emergency responders, or other county officials and related spatial data, including spatial information that describes the boundaries or area of each county. A campaign data layer often contains or identifies campaign data, such as campaign event data. In other examples, campaign data layers contain or identify campaign events, campaign event types, and attributes for campaigns. Campaign data layers, such as an event layer, an interest area layer, an audience layer, and/or other layers, refer to displayable or displayed data in some instances.

A dataset, such as a data table, a data file, a data structure, or another dataset, may be located in a database, a data file, or a location other than a database or data file. The database or other locations may contain spatial information for a spatial layer or other information for other layers, including campaign data layers. The dataset may be in a different location than other datasets. A non-geospatial dataset for or related to the campaign may be referred to as a program dataset or a campaign dataset. A geospatial dataset may be referred to as a spatial dataset. Datasets have the same relation to features and attributes as layers in one embodiment.

A disparate dataset refers to a dataset that is not co-located with another dataset or is not in a same data system, database, or data structure as another dataset. Disparate datasets may be located, for example, in different storage areas, such as different databases, different data files, different database tables, or other different data structures. However, some disparate datasets may be located in the same storage area, such as a same database, but organized as different data tables or structures.

In one example, a spatial layer is related to campaigns and events, and a data layer is related to campaigns and data layers for events associated with campaigns. In this example, a campaign represents a collection of one or more events for a geography, and the campaign has a campaign event layer.

Figure 3:
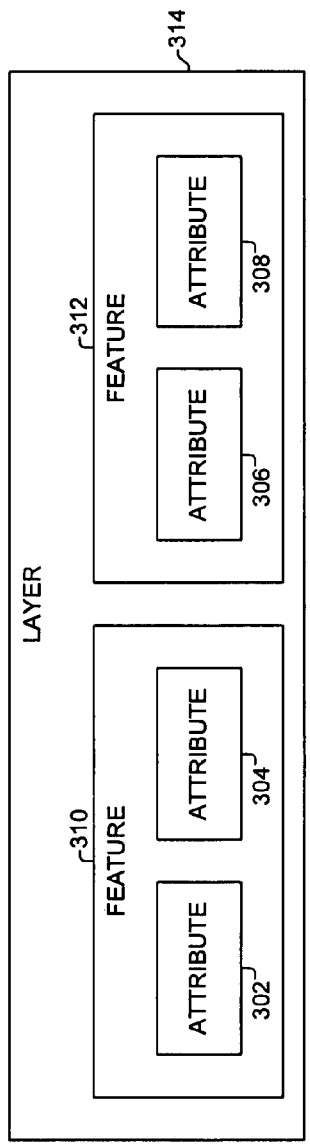
FIG. 3 is a block diagram of a layer in a campaign management system in accordance with an embodiment of the present invention.

FIG. 3 depicts an example of a relationship between attributes 302-308, features 310-312, and a layer 314. In the example of FIG. 3, a first feature 310 has a first attribute 302 to an Nth attribute 304. A second feature 312 has a first attribute 306 to an Nth attribute 308. The two features 310 and 312 are part of a layer 314.

Referring again to FIG. 1, the campaign management system 102 includes a campaign processing system 104, a user interface 106, and a data system 108. The campaign management system 102 optionally may include another data system 110 and/or an input/output device 112. The campaign management system 102 manages data for a campaign, including geospatial data and campaign data. In one embodiment, the campaign management system 102 manages data for one or more campaign types for one or more campaign events.

The campaign processing system 104 processes geospatial data and campaign data, including map data, document data, journal data, other geospatial data, and/or other campaign data. The campaign processing system 104 renders geospatial data and campaign data to one or more outputs and/or generates geospatial data and campaign data for rendering, such as for or to a user interface for a display. In one example, campaign data includes interest area data and/or audience data and/or other campaign feature data.

In some embodiments, the campaign processing system 104 enables performing queries of the campaign data and/or the geospatial data. In other embodiments, the campaign processing system 104 generates geospatial data and campaign data for display and enables selecting some or all geospatial data and/or campaign data to further generate other geospatial data and/or campaign data or take other action. Such a selection of geospatial data and/or campaign data constitutes entry of a search or of a search criteria for a query in some embodiments. In one example, the selection is made on a map, feature, display, or other display portion.

In one embodiment, the campaign processing system 104 processes geospatial data and campaign data from one or more campaign datasets related to a campaign and spatially links the geospatial data and the campaign data to create one or more spatially linked campaign datasets. The campaign processing system 104 then enables performing searches or queries of the linked campaign data and geospatial data. This embodiment is optional for some embodiments herein. In some instances of this embodiment, entry of a search or search criteria and/or queries constitute generating geospatial data and campaign data for display and enabling selecting some or all geospatial data and/or campaign data to further display other geospatial data and/or campaign data or take other action.

The campaign processing system 104 includes one or more processors to process the spatial data and the campaign data, to link the spatial data and the campaign data, and to perform searches, queries, to generate data, and/or to take other actions in the operation of the system. Memory is used to store data. Operational code (instructions, algorithms, software, other code) to effect the processes herein also operates on the one or more processors.

In one embodiment, the campaign processing system 104 enables linking one or more sets of spatial data to one or more sets of campaign data. The campaign processing system 104 has a configuration element, such as a configuration file. In one example, the configuration element is an extensible markup language (XML) configuration file residing in the campaign processing system 104. The link or links between the spatial data and the campaign data is defined in one or more configuration files. This embodiment is optional for other embodiments.

In one example, the spatial data is organized as spatial data layers, and the campaign data is organized in campaign datasets. A configuration file contains a definition of the spatial data layers and campaign datasets that can be accessed by the campaign processing system 104. In this example, the campaign datasets include external data related to the campaign. Each spatial data layer and campaign dataset has a configuration section, and each configuration section has a link section. If a campaign dataset is to be linked to a spatial data layer, the campaign dataset's link section identifies each data attribute that is linked to the corresponding data attribute in the spatial data layer. The spatial data layer's link section has a similar identification. In one example, the campaign processing system 104 links a journal entries campaign dataset from a table in one database and an events campaign dataset from a table in another database with a spatial layer. The link is defined based on common attributes or fields, which are attributes or fields that the journal entries campaign dataset and the events campaign dataset have in common with the spatial layer. These common attributes or fields are sometimes referred to as natural keys herein. This example is optional for some embodiments.

In one embodiment, a link configuration or other configuration enables the campaign processing system 104 to construct a series of nested queries at runtime to obtain journal entries that have a natural relationship to campaign events, such as feature data attributes common to both the journal entries and the events. In this example, the queries are referred to as being nested because the spatial layer is queried first to get a collection of feature data that matches the search criteria from a spatial aspect. Then, for each set of feature data that resulted from the spatial query of the spatial layer, the campaign processing system 104 executes one or more queries against the campaign datasets to obtain the associated data.

In another embodiment, the campaign processing system 104 enables creation of a query tool to perform nested queries, such as a search tool for research or navigation. A query tool, for example, identifies campaign events having a certain campaign type that have been presented in a geographic area. In this example, an event's campaign dataset contains campaign types, start and end dates of a campaign event, a geography for a campaign event, an organization identified for the campaign, a contact name for the campaign, audience information, and event identifications, and a journal entries campaign dataset contains an indication of a contact or vendor name assisting with the campaign communications, an event date, and an organization identified for the campaign. A link is configured between the events campaign dataset and the journal entries campaign dataset using a spatial layer. The query tool queries the events campaign dataset to identify the campaign events having the selected campaign type. For each set of events feature data returned in the first query, the query tool queries the journal entries campaign datasets to identify entries that identify the selected campaign events. The link configuration also facilitates the display of journal entries when an event is selected.

In another example, the event data is organized as a spatial layer, and the journal entries data is organized as a campaign dataset. In this example, the query tool is used to identify a collection of feature data from the events spatial layer that matches the search criteria from a spatial aspect, such as all events within a certain zip code. Then, for each set of feature data that resulted from the query of the spatial layer, the campaign processing system 104 executes a query against the journal entries campaign dataset to obtain the associated linked data, which in this instance are the journal entries.

In another embodiment, the spatial data and campaign data are not linked. In this embodiment, the campaign processing system 104 queries the spatial data and campaign data to obtain the requested or associated data. In this example, one or more spatial searches and one or more searches are performed.

In another embodiment, the campaign processing system 104 enables creation of a query tool to perform nested queries, such as a search tool for research or navigation. In this example, an event's campaign dataset contains campaign types, start and end dates of a campaign event, a geography for a campaign event, an organization identified for the campaign, a contact name for the campaign, audience information, and event identifications, and a journal entries campaign dataset contains an indication of a contact or vendor name assisting with the campaign communications, an event date, and an organization identified for the campaign. The query tool queries the events campaign dataset to identify the campaign events having the selected campaign type. For each set of events feature data returned in the first query, the query tool queries the journal entries campaign datasets to identify entries that identify the selected campaign events.

In another example, the event data is organized as a spatial layer, and the journal entries data is organized as a campaign dataset. In this example, the query tool is used to identify a collection of feature data from the events spatial layer that matches the search criteria from a spatial aspect, such as all events within a certain zip code. Then, for each set of feature data that resulted from the query of the spatial layer, the campaign processing system 104 executes a query against the journal entries campaign dataset to obtain the associated data, which in this instance are the journal entries.

In another embodiment, the spatial data and campaign data are not linked. In this embodiment, the campaign processing system 104 queries the spatial data and campaign data to obtain the requested or associated data.

In another embodiment, one or more spatial searches and one or more data searches are performed. In this embodiment, a spatial search is performed for counties or another spatial attribute to determine all campaign types within or for that spatial attribute. For the campaign types returned in the spatial search, the campaign processing system 104 executes a data to determine all journal entries having a particular contact name or all message contents of a particular type. In another example, a spatial search is executed to determine all campaigns in a region. Then, the one or more campaigns, a data search is executed to determine the journal entries for the one or more campaigns. Another data search can be executed to determine all documents associated with the one or more campaigns or the journal entries.

In one embodiment, the campaign processing system 104 enables dynamically linking documents to the spatial data or campaign data. Linking documents in this way enables organizing documents and navigating to documents spatially, effectively building a runtime relationship between individual spatial data and/or campaign data and one or more documents. For example, an audio file of a message played by a radio station for a selected campaign type can be linked to an event feature. Documents may be linked to event attributes.

In one example, a user interface is used to insert a new document into a document index database and bind the index entry to a selected spatial layer, spatial data, or campaign data. The user interface queries the user for a document location and the specific spatial layer feature data or other data to which the document will be linked. The document is then "bound" to the feature data in the document index table. In one embodiment, a structured query language (SQL) is used to insert document index relationship entries to specific documents that are associated with specific feature data. Alternately, a graphical user interface (GUI) wizard can facilitate this process.

In one embodiment, one or more documents are associated with a campaign event or other attribute through a journal entry. In this embodiment, the one or more documents are attached when entering or editing the journal entry.

In one embodiment, the campaign processing system 104 generates spatial data and campaign data for display. The spatial data is generated for display as a map. Some campaign data also may be generated for display on the map in some instances. Other campaign data is generated for display as text and/or graphics. The campaign processing system 104 enables a user to access linked documents and/or journal entries by selecting spatial data or campaign data on the map, by selecting campaign data otherwise generated for display, and/or by navigating to the documents and/or journal entries. In one example, if linked documents exist for the selected data, references identifying the documents or document data are displayed. The user can then display the linked documents by selecting the respective reference. Alternately, the document data is displayed. If linked journal entries exist for the selected data, references identifying the journal entries are displayed. The user can display the linked journal entries by selecting the journal entry reference. Alternately, the journal entry data is otherwise displayed. Other examples exist.

The user interface 106 presents spatial data and/or campaign data for display. The spatial data and/or the campaign data is received at the user interface 106 from the campaign processing system 104. The user interface 106 also enables a user to enter data, select data including to result in the display of other data, enter queries, searches, and search data, link campaign data and spatial data, link journal entries and journal data, link documents and document data, otherwise link other data, otherwise build an application, and other purposes. The data, queries, selections, searches, link information, and other data are sent to, and processed by, the campaign processing system 104. The user interface 106 may operate using one or more processors.

The data systems 108 and 110 store and/or retrieve spatial data, campaign data, and/or other data related to the campaign management system 102. The data systems 108 and 110 communicate with the campaign processing system 104 to transmit data to, and/or receive data from, the campaign processing system. Although one data system 108 and one other optional data system 110 are depicted in FIG. 1, the data systems each or together represent one or multiple data systems. The data system 108 and/or 110 may operate using one or more processors.

In one embodiment, the data system 108 and/or the data system 110 is a data system internal to the campaign processing system 104. In this embodiment, the data system 108 and/or 110 can be accessed via an intranet connection, another internet protocol (IP) connection, another network connection, a backplane or other direct connection to the campaign processing system 104, or another connection or link. Alternately, the data system 108 and/or 110 can be connected directly to, or be a sub-component of the campaign processing system 104. Other data systems may be used. The data system 108 and/or the data system 110 are optional in some embodiments.

In another embodiment, the data system 108 and/or the data system 110 is an external data system. In this embodiment, the data system 108 and/or 110 communicates with the campaign processing system 104, such as over a connection or communication link, to transmit data to, and receive data from, the campaign processing system. In another embodiment, the external data system 108 and/or 110 is accessed via an intranet connection, another IP connection, another network connection, or another connection or link. In one example of this embodiment, the campaign processing system 104 processes a universal resource locator (URL) or another designation to connect to the external data system 108 and/or 110 and to communicate with the external data system for receiving and/or sending data.

The input/output device 112 may include a monitor, a processor, a computer, a printer, another output device, a mouse, a trackball, a touchpad, another pointer, a keyboard, another entry device, other input or output devices, and/or a combination of the foregoing. In one embodiment, the user interface 106 is generated for display to the input/output device 112. In another embodiment, the user interface 106 receives input data from the input/output device 112. In another embodiment, the input/output device 112 is a user computer for which the user interface 106 is generated. In one example of this embodiment, the user computer communicates with the spatial processing system 104 via an intranet connection, another IP connection, another network connection, and/or another connection or link. Wireline and wireless connections and links are included as connections and links herein. In another example of this embodiment, the user computer includes the input/output device 112, the data system 108, and the campaign processing system 104, and the user interface is generated for display on the input/output device. In one embodiment, a user computer includes a mobile device, such as a personal digital assistant, a pocket PC, a phone, a laptop computer, or another mobile device.

The campaign processing system 104 may operate with one or multiple users on a one-to-one basis, and a one-to-many basis, or a many-to-one basis. In one example, the campaign processing system 104 communicates with multiple users for multiple input/output devices. In another embodiment, the campaign processing system 104 operates as a service bureau and communicates with one or more input/output devices and/or data systems. In another embodiment, the campaign processing system 104 operates as a web hosting system and communicates with one or more input/output devices and/or data systems. In another embodiment the campaign processing system operates as an internal system for a company to manage campaigns for the company. In another embodiment the campaign processing system 104 operates on a personal computer. In one example of this embodiment, all or part of the campaign management system 102 resides and/or operates on a personal computer. In another embodiment, the campaign processing system 104 operates on a mobile device.

FIG. 4 depicts an embodiment of a campaign processing system 104A process for spatially linking spatial data and campaign data. In this embodiment, the spatial data is configured in spatial layers, and the campaign data is configured in disparate campaign data structures. The campaign processing system 104A spatially links one or more spatial layers 402-404 with one or more disparate campaign datasets 406-410 to create one or more spatially linked campaign datasets 412. In one embodiment, the spatial link configuration is saved in a configuration element 414, such as a configuration file or another configuration element.

Spatial layers have data attributes that are native to the spatial features. For example, a county has a shape. But, it also has other attributes, such as audiences, campaign events, and other attributes. These natural data attributes are the data attributes that are part of the spatial layer.

While the disparate campaign datasets are not a part of the features of the spatial layer in one embodiment, the campaign datasets can be linked to the spatial layer using data attributes from the campaign datasets that are related to the spatial layer to create linked datasets, such as from a common data attribute. A user then can access the disparate datasets spatially.

Accessing a dataset spatially refers to querying a linked campaign dataset that has a relationship to spatial data in a spatial layer and selecting data from the linked campaign dataset and/or the spatial layer based on the selected spatial data or the selected campaign data. As an illustration, an event spatial layer has a message content feature that has a first dataset with message content attributes. A survey statistic could be added to the data attributes of the message content. However, the specific attribute for the survey would only represent one moment in time, which is the specific survey responses at the time of creation of the event layer. If the survey statistics are left in a second dataset that is disparate from the first dataset, but both are linked with the event layer, the survey statistics representing different points in time may be accessed without having to change the event layer representing campaign events for each point in time that is of interest.

The linked datasets in this example may be accessed spatially, for example, by querying the event layer for campaigns in a region that have residents within a specified area. The resident data from the resulting area query at various points in time will be produced. In this example, the resident data is spatially accessed via the spatial attributes of the event spatial layer and the data attributes for the events.

In one embodiment, disparate campaign datasets are dynamically linked at runtime with a spatial layer to create a linked campaign dataset, thereby extending the natural data attributes of the spatial layer with those from the linked datasets. The datasets are linked using an attribute common to both campaign datasets and the spatial layer and are linked without copying data from one campaign dataset to the other.

The campaign management system 102 links the disparate campaign datasets so that the campaign datasets may remain in their respective original data location, file, table, database, structure, or other location. Thus, the need to replicate the data to get it into the same (non-disparate) campaign dataset as the spatial data or the same dataset as another dataset is eliminated. This combination of one or more disparate campaign datasets and one or more spatial layers (or other spatial data) is referred to as a linked dataset.

In one example, multiple campaign datasets are identified from a query, and the campaign datasets are merged at runtime using a data attribute common to a spatial layer and to the multiple campaign datasets. In this example, the campaign datasets and the spatial layer are linked dynamically at runtime, not permanently. As a result, any number of linked campaign datasets can be established for a spatial layer without altering the spatial and data attributes of the spatial layer or requiring any alterations of the disparate campaign datasets. The campaign processing system 104A enables linking campaign datasets from different databases, structures, tables, and database and structure types.

In another example, a campaign dataset is spatially linked with a spatial layer by identifying an attribute common to the spatial layer and to the campaign dataset and identifying a link between a spatial layer and the campaign dataset for that attribute. The link instructs the campaign processing system 104A where to find the campaign dataset and how to relate it to the spatial layer. In one example, a common attribute is identified between the spatial layer and the campaign dataset, the locations of the data attribute for the campaign dataset and the spatial layer are identified, and the data attribute is linked between a campaign dataset and the same attribute of the spatial layer.

In another embodiment, a spatial layer is linked using a data attribute that is present in both the spatial layer and the campaign dataset. In another embodiment, a spatial layer is linked to a first campaign dataset by linking a data attribute that is present in both a spatial layer and the first campaign dataset, and the spatial layer is linked to a second campaign dataset by linking another data attribute that is present in both the spatial layer and the second campaign dataset. In this embodiment, the spatial layer is spatially linked to the first campaign dataset and a second campaign dataset, and the first campaign dataset and the second campaign dataset are indirectly linked to each other via the spatial layer. In this embodiment, the first data attribute is different from the second data attribute.

In still another embodiment, the spatial layer is linked to a first campaign dataset by linking a data attribute that is present in both the spatial layer and the first campaign dataset. The spatial layer is linked to a second campaign dataset by linking the same data attribute, which also is present in the second campaign dataset.

In another embodiment, the campaign management system has a graphical user interface (GUI) with a configuration manager that is used to define the relationships between one or more campaign datasets and one or more spatial layers. This may be, for example, a text definition of the relationship that one or more spatial layers will have at runtime to one or more disparate campaign datasets. The linking relationships, for example, may be defined via XML entries within the campaign management system 102. The linked campaign dataset configuration definitions then are stored by the configuration manager in XML for use by the campaign management system 102. Thus, a user does not have to write code to link the datasets.

Figure 5:
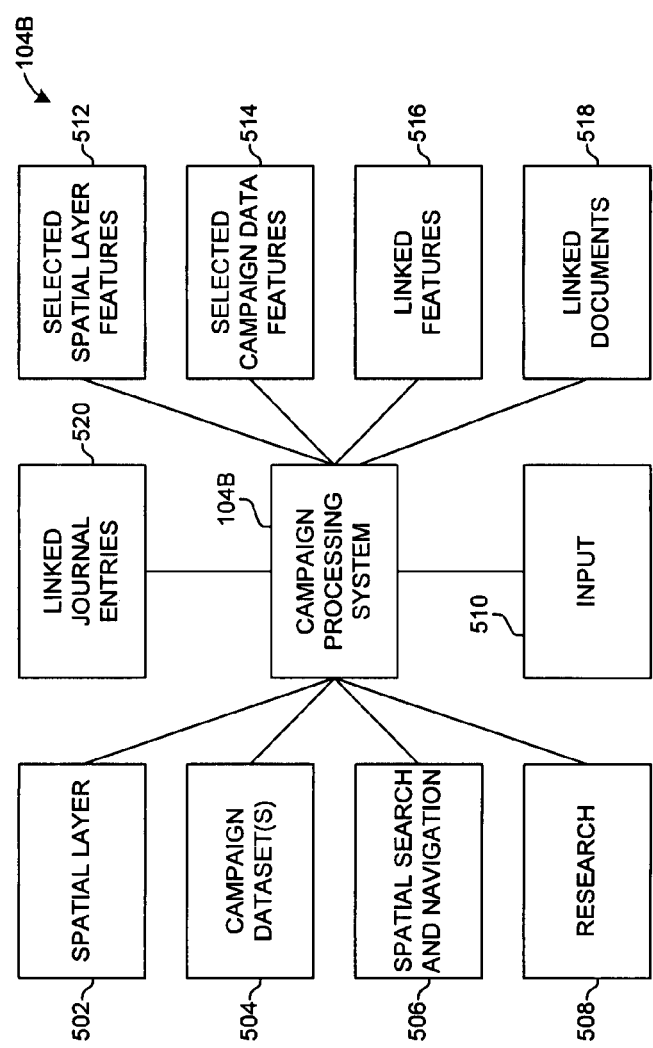
FIG. 5 is a block diagram of inputs and outputs for a campaign management system in accordance with an embodiment of the present invention.

FIG. 5 depicts an exemplary embodiment of selectable options and outputs of a campaign processing system 104B, including defined toolsets. The selectable options and outputs are exemplary. Other examples exist.

One or more spatial layers 502 are defined for an application of the campaign processing system 104B. In one embodiment, the particular application, such as a campaign application for a dig safe program, a service or product advertising campaign, an awareness campaign, or another campaign, determine the particular spatial layers that are defined. In one example for a dig safe campaign application, spatial layers are defined for campaign type, state, county, zip code, address, city, audience type, content type, name, and/or other layers. These spatial layers that are defined and selected for processing may be queried (i.e. searched), and the corresponding spatial data may be generated to a map image or other image as spatial features or in another manner.

One or more campaign datasets 504 are defined for an application of the campaign processing system 104B. In one embodiment, the particular application, such as a dig safe campaign, a service or product advertising campaign, an awareness campaign, or another campaign, determine the particular campaign datasets that are defined. In one example for a dig safe campaign application, campaign datasets are defined for campaign type, message content/content type, audience data, audience type, interest area data, journal entries, and/or other campaign datasets. The campaign datasets that are defined and selected for processing may be queried, and the corresponding campaign data may be generated as feature data for display as an image, in a table, as text, as one or more graphics, as one or more images, and/or in another manner.

A set of tools is defined for the particular campaign application of the campaign processing system 104B. Multiple types of tools may be available. In the embodiment of FIG. 5, the tools include a spatial search and navigation tool 506 and a research tool 508. The tools may be used to query one or more spatial layers, campaign datasets, and/or linked campaign datasets or view data of one or more spatial layers, campaign datasets, and/or linked campaign datasets. Other tools may be used.

The spatial search and navigation tool 506 enables a query (i.e. search). When the spatial search and navigation tool 506 is selected, a corresponding input 510 is used to search the selected spatial layer or layers, the campaign datasets, and/or the linked campaign dataset or datasets. In one example, the input 510 is entered via a user interface.

The research tool 508 also enables a query (i.e. search). When the research tool 508 is selected, a corresponding input 510 is used to search the selected spatial layer or layers, the campaign datasets, and/or the linked campaign dataset or datasets. In one embodiment, the input 510 is entered via a user interface. In one embodiment, the search and navigation tool 506 and the research tool 508 identify searches by a geographical area, a region, a location, and/or a geographic feature. In one example, the spatial search and navigation tool 506 is used to locate or identify a geographic area. In this example, the research tool 508 is used to identify a campaign or campaign event or campaign data, including via a geographical area.

One or more outputs are generated if a match between an input 510 and one or more spatial layers and/or one or more campaign datasets and/or one or more linked campaign datasets is identified for a query. If a query match or other result is identified for one or more spatial layers, the selected spatial layer features 512 resulting from the match or other result, including the attributes for each of the features, are generated for display, such as in a map or other image or in another manner. If a result is identified for one or more campaign datasets on which the query is performed, the selected campaign dataset features 514 resulting from the query, including the attributes for each of the features, are generated for display, such as in a list specifying selected features and its corresponding data attributes, as one or more images, as a table, as text, or in another manner. In some instances, campaign data also is generated for display in the map, image, or other display of the spatial data, such as event location data, interest area data, audience data, journal data, or other campaign data.

If a query match or other result is identified for one or more campaign datasets and/or one or more campaign datasets that are linked to a spatial layer, the corresponding linked features 516 resulting from the match or other result are generated for display, such as each with a feature reference and/or linked feature reference in a list or in another manner. In one embodiment, each feature reference and/or linked feature reference can be selected to display a list specifying the corresponding dataset features and their data attributes. In other embodiments, the linked features are displayed in other portions of a display or in other displays. In one example, if multiple linked campaign datasets have features that result from a query, the features from a first campaign dataset are generated for display, such as in a list. In this example, linked feature references for the other campaign datasets are displayed as links. The user may select the link for the corresponding campaign dataset to display the features for that campaign dataset.

If a result is identified for one or more documents that are linked to the spatial layer campaign datasets, and/or linked campaign datasets, the corresponding documents 518 resulting from the query are generated for display or document data associated with the documents is generated for display. In one example, the documents are displayed in a display frame. In another example, each document is displayed with a linked document reference in a list. In this example, each linked document reference can be selected to display the corresponding document. In another example, other document data is generated for display, and the document data may be selected, exported, or displayed.

If a result is identified for one or more journal entries that are linked to the spatial layer, campaign datasets, and/or linked campaign datasets, the corresponding journal entries 520 resulting from the match are generated for display. In one example, the journal entries 520 are displayed in a display frame. In another example, each linked journal entry 520 is displayed with a linked journal entry reference in a list. In this example, each journal entry reference can be selected to display the corresponding journal entry. In another example, other journal entry data is displayed, and the journal entry data may be selected, exported, or displayed.

A user also may use the campaign datasets and/or linked campaign datasets within the definitions of user tools. The tools may include navigation, research, or other search tools or other tools that are published for use by a campaign management system 102 application. The campaign management system 102 application then can use these published tools to obtain information from spatial layers and campaign datasets.

For example, a query is performed for the spatially linked data. Both the spatial layer and the linked campaign dataset are queried with an input. The spatial layer is queried to identify spatial data that matches the input, if any. The linked campaign dataset is queried to identify data from the linked campaign dataset that matches the input, if any. In one embodiment, the spatial layer is queried first, and the linked campaign dataset is queried next. In another embodiment, the linked campaign dataset is queried first, and the spatial layer is queried next. In one embodiment, an SQL query is performed on the linked campaign data. In another embodiment, an SQL query is performed on the spatial layer. Other queries may be used in other embodiments.

In another example, a spatial query is performed for a spatial layer to identify spatial data that matches the input, if any. The campaign dataset is then queried to identify data from the campaign dataset that matches the results of the spatial query or input, if any. For example, a spatial query can be executed to locate all campaigns in Texas. In this example, the spatial query identifies all polygons that represent Texas and identifies all campaign polygons that are partially or wholly contained in the Texas polygon. Against those results, a data query may be made to determine message contents, journals, or contacts associated with the campaigns in Texas. In another example, a search could identify a selected activity in a selected geography. Data searches may be performed to identify, for example, titles, descriptions, message types, content, audience types, or other data. A search is performed on the campaign data, and a spatial search is performed to understand the geographically relationships of the campaign activities.

In one embodiment, the spatial layer is queried first with a spatial query, and the campaign dataset is queried next with a data query. In another embodiment, the campaign dataset is queried first with a data query, and the spatial layer is queried next with a spatial query. In one embodiment, an SQL query is performed on the campaign data. In another embodiment, an SQL query is performed on the spatial layer. Other queries may be used in other embodiments.

If a result is identified for the spatial layer, the query data associated with the result is generated for display, such as with a map image. If a result is identified for a campaign dataset and/or linked campaign dataset, the feature data associated with the result is generated for display. The matching feature data may be referred to herein as selected features. The selected features from the campaign dataset and/or linked campaign dataset are generated for display in one embodiment as a tabular list. In another embodiment, a result also identifies features, linked features, documents, linked documents, journal entries, linked journal entries, and/or other data and/or cross-reference data. The linked features, linked documents, linked journal entries, and/or other cross-reference data are generated for display in one embodiment. Non-linked features, documents, journal entries, and/or other data also are generated for display in one embodiment. Cross-reference data is linked document data, linked feature data, linked journal entry data, and other linked data associated with feature data returned in response to a query.

Linked campaign datasets can be used within tools as if the attributes of the linked campaign dataset were natural data attributes of a spatial layer. For example, a research tool might be created that highlights campaigns in a selected county. In this example, the research tool uses a linked campaign dataset on the event spatial layer to provide campaigns having a selected county and a campaign type because the county identification is not present in the data attributes of the event spatial layer. The tool actually uses data attributes of the linked campaign dataset to narrow the set of spatial data that results from the tool's query operation. Thus, the data attributes of the linked campaign dataset appear to the rest of the campaign management system 102 as if they were part of the native attributes of the spatial layer.

In one embodiment, when a published query tool is used, such as a research tool or a navigation tool, a map image illustrating the results of the query is generated for display. Optionally, a list of data attributes that resulted from the query operation also is generated for display, such as in a list, text, or image. These data attributes include attributes from the spatial layer and/or attributes from the campaign datasets.

In one example of a tabular display, each row of the table is a different feature, and each column depicts a different attribute of the feature. The table may include column headings to identify the feature attributes. A list of the linked campaign datasets associated with the feature's parent layer that have available data also is generated. The user can select any of the available linked campaign datasets to display a list of records from the selected linked campaign dataset.

Figure 6:
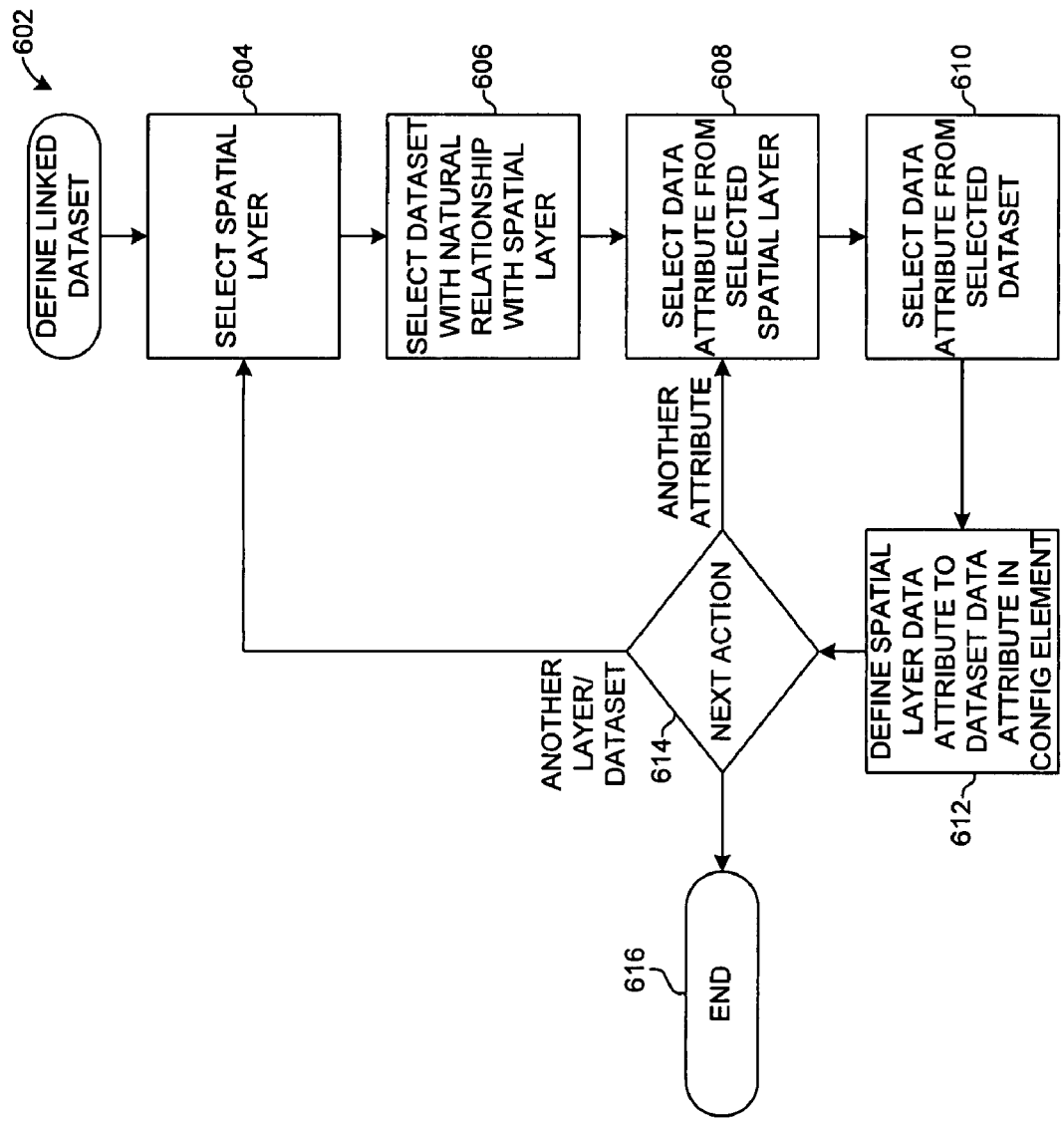
FIG. 6 is a flow diagram of a process for linking a spatial layer with campaign data in accordance with an embodiment of the present invention.

FIG. 6 depicts an exemplary embodiment of a linked campaign dataset definition process 602. A spatial layer is selected at step 604. A campaign dataset having a natural relationship with the selected spatial layer is selected at step 606. As used herein, datasets and/or spatial layers have a natural relationship when they have one or more common data attributes. A common data attribute is selected from the spatial layer at step 608. A common data attribute is selected from the campaign dataset at step 610. The selected spatial layer data attribute is defined to the selected campaign data attribute in a configuration file or other configuration element at step 612.

The next step is determined at 614. Steps 608-612 may be repeated to define another common data attribute for the selected spatial layer and the selected campaign dataset. Steps 604-612 may be repeated to define a common data attribute for another spatial layer and/or another campaign dataset. The process ends at step 616.

In one embodiment, after one or more linked campaign datasets are defined, SQL type statements are used to describe the query that spans the spatial layers and the linked datasets. The query is used to match an input for a query to the spatial layers and the linked datasets. In one example of this embodiment, SQL type statements describe multiple transactions used to query the spatial layers and the linked datasets. The statements use XML to describe how to select data fields for a query. The statements include a selection clause to identify elements that are wanted, a from clause to identify from what spatial layers and/or datasets the data is to be queried, a select clause to identify what criteria is used to select the data, an order clause to identify the order used to present data that matches the query, and a group clause to identify how common/like data is to be grouped, such as by rows. The statements are presented with database/data system neutral definitions and vendor neutral definitions.

In one embodiment, the base SQL statements for the queries, including queries for the research tool and the navigation tool, are templates defined in the configuration files. However, the SQL statements may be modified at runtime to account for optional user inputs that were not supplied in the configuration file. For example, if an SQL statement for a query is defined to expect three arguments from the user, but only two arguments are supplied, the third argument is removed from SQL statement at runtime, providing the third argument was defined as being optional.

Figure 7:
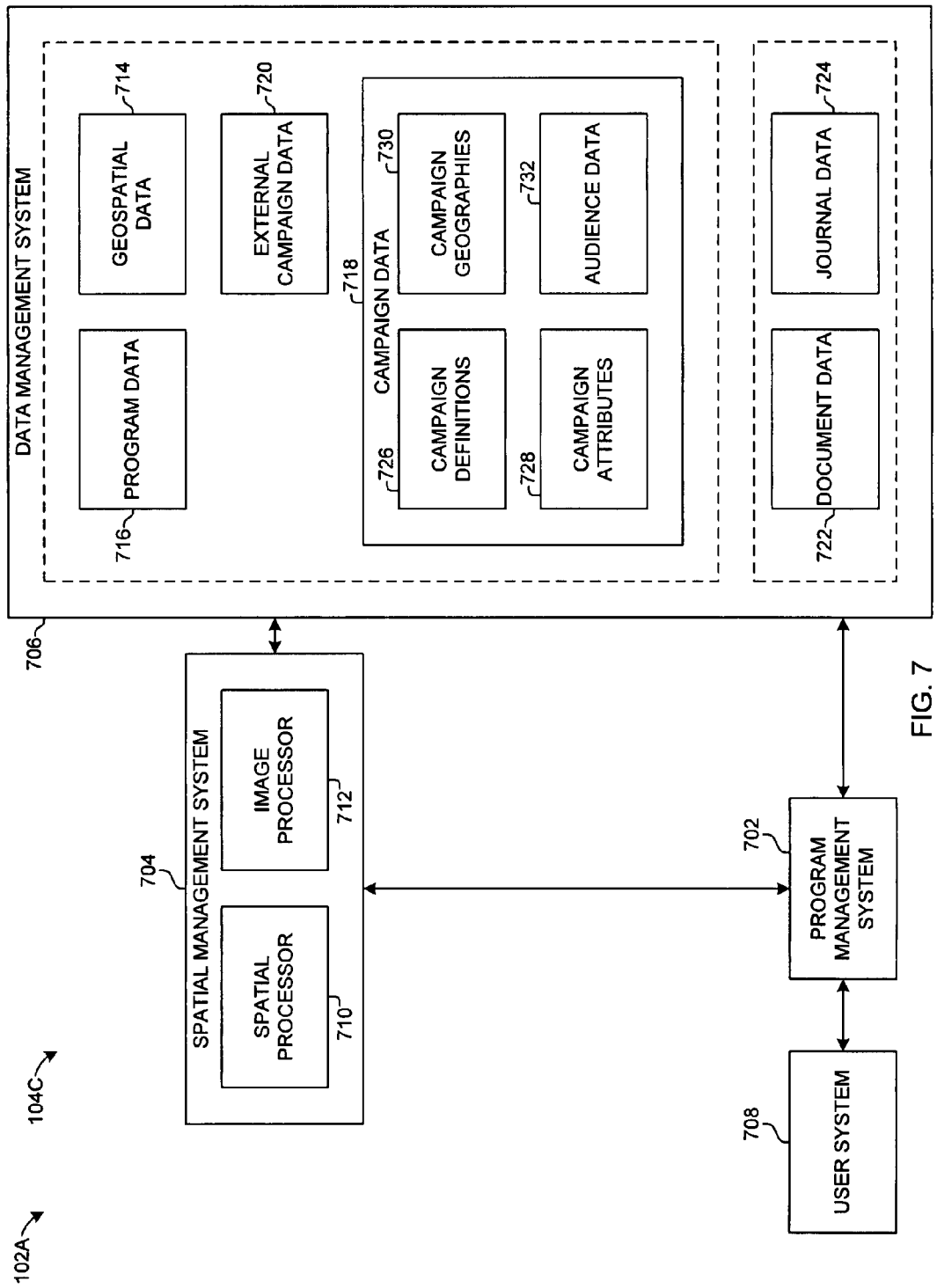
FIG. 7 is a block diagram of another campaign management system in accordance with an embodiment of the present invention.

FIG. 7 depicts an exemplary embodiment of a campaign processing system 104C. In the embodiment of FIG. 7, the campaign processing system 104C includes a program management system 702, a spatial management system 704, and a data management system 706. The program management system 702 communicates with a user system 708 via a connection, such as a wireless or wireline connection, including an internet connection, an intranet connection, another internet protocol connection, another network connection, a backplane, an internal personal computer connection, another internal computer or processor connection, or another connection.

The campaign processing system 104C may operate with one or multiple users on a one-to-one basis, a one-to-many basis, or a many-to-one basis. In one example, the campaign processing system 104C communicates with multiple user systems. In another embodiment, the campaign processing system 104C operates as a service bureau and communicates with one or more user systems and/or data systems. In another embodiment, the campaign processing system 104C operates as a web hosting system and communicates with one or more user systems and/or data systems. In another embodiment, the campaign processing system 104C operates as an internal system for a company to manage assets for the company. In another embodiment, the campaign processing system 104C operates entirely on a personal computer. In another embodiment, the campaign processing system 104C operates on or with a mobile device.

The program management system 702 receives communications from, and transmits communications to, the spatial management system 704 and the data management system 706 and processes the communications. The communications may be queries, data, signaling, or other communications. The program management system 702 receives, transmits, and processes geospatial data for one or more spatial layers and/or campaign data for one or more campaign datasets.

The program management system 702 communicates with the spatial management system 704 and/or the data management system 706 to obtain geospatial data and/or campaign data. In one example, the program management system 702 queries the spatial management system 704 and/or the data management system for features or data for selected criteria, such as for geospatial data and/or campaign data. The query may be for a search, a navigation, or another query. In this example, the program management system 702 receives from the spatial management system 704 and/or the data management system 706 data that matches or results from the query, including geospatial data and/or campaign data.

The program management system 702 receives communications from the user system 708, transmits communications to the user system, and manages the communications. The communications may be, for example, queries, data, signaling, and/or other communications. The communications also may be responses or requests, such as requests for program data, geospatial data, event data, interest area or other geography data, audience data, document data, journal data, and/or other campaign data. Other communications may include, for example, static content, such as hypertext markup language (HTML) communications, images, JavaScript communications, and data identifying styles. Still other communications may include non-static content, such as java server pages (JSPs), Servlets, flash content, and other content. The signaling may include, for example, instructions to render data, instructions to query or transmit data, instructions in response to a query or to transmit data, instructions to obtain access to the campaign management system 102A, or other instructions. In one embodiment, the program management system 702 communicates with the user system 708 via hypertext transfer protocol (HTTP). In another embodiment, the program management system 702 and the user system 708 are located in a single computer or processing system, such as a personal computer, a mobile device, or another processing system.

The program management system 702 renders one or more images, feature data, and/or other data, such as for a user interface, in some embodiments. In one embodiment, the program management system 702 formats the images and/or feature data in a form receivable by the user system 708. In another embodiment, the program management system 702 renders the images and/or feature data into an HTML communication in a format receivable by the user system 708. In some examples, the rendered communications to the user system 708 include links for documents and/or journal entries and/or the documents or journal entries themselves and/or other data. The functions of the program management system 702 may operate using one or more processors.

The spatial management system 704 receives queries and data from the program management system 702 and, if a match is identified, returns results matching the queries or data to the program management system. The results may include one or more images and/or feature data. In one example, a query includes data identifying a portion of a map that was selected or identified or at least some other spatial and/or campaign data that was selected. In another example, a map or other spatial data or campaign data is selected, including through a mouse click or other pointer or input selection, and other map or spatial data and/or campaign data is generated, such as for a zoom in or out, change of direction, change in geospatial data, identification of assets, campaign events, or other campaign data. The spatial management system 704 also queries the data management system 706 and receives results from the data management system if a match is identified. The spatial management system 704 may pass the results to the program management system 702, including the feature data and/or one or more images.

The feature data may include program data, geospatial data, event data, interest area or other geography data, audience data, document data, journal data, and/or other campaign data. In one embodiment, feature data includes campaign data identifying a campaign name, a campaign type, a description, message content, a contact name, an audience, a start and end date/time for the campaign, and a geography.

In one embodiment, the spatial management system 704 includes a spatial processor 710 and an image processor 712. In other embodiments, a single processor may process queries, data, and/or images. In still other embodiments, the functions of the spatial management system 704 may be included in one processor or multiple processors.

The spatial processor 710 receives and processes communications, such as queries and data, from the program management system 702 and the data management system 706. The spatial processor 710 transmits communications, such as queries and data, to the program management system 702 and the data management system 706.

In one embodiment, the spatial processor 710 receives queries and responds with feature data matching or otherwise resulting from the query. If no feature data resulting the query is identified, the spatial processor 710 indicates that there is no resulting data. In one example, when the spatial processor 710 receives a query from the program management system 702, the spatial processor queries the data management system 706 to obtain the requested spatial data and feature data. The spatial processor 710 receives a response from the data management system 706 with the requested spatial data and feature data or an indication that the feature data does not exist. The spatial processor 710 processes the spatial data and the feature data and transmits the processed data to the program management system 702.

In one embodiment, the spatial processor 710 identifies and generates one or more geocodes based upon a query, such as a search criteria. The geocodes may include a latitude and a longitude or other location identifiers that designate a geographic location. This embodiment is optional in some instances.

In this embodiment, the spatial processor 710 geocodes data submitted by the user system 708. The spatial processor 710 transmits the geocoded data to the program management system 702. In other embodiments, the spatial processor 710 spatially identifies coordinate and ordinate points and systems based on correlation to pixels from a displayed map. In this embodiment, the spatial processor 710 performs a spatial search based on data submitted by the user system. The spatial processor 710 transmits the resulting data to the program management system 702.

In one embodiment, the user system 708 transmits data for a campaign event, including an address for a training event. The spatial processor 710 receives the campaign event data from the program management system 702 and geocodes the campaign event data using the address data. The spatial processor 710 transmits the geocode for the campaign event data to the program management system 702.

In another example, a user system 708 initiates a query to determine what campaign events are located in a county and state. The user system 708 transmits the county and state as the search criteria for the query. The spatial processor 710 receives the county and state data from the program management system 702 and geocodes the county and state data. The spatial processor 710 transmits the geocode data for the county and state data to the program management system 702.

In another example, the user system 708 initiates a query to determine what campaign events are located in a city. The user system 708 transmits data identifying a point selection or an area selection from a displayed map. The point or area selection may be made through a mouse, touchpad, trackball, pointer, keyboard, or other input device or method. The spatial processor 710 receives the point or area selection and geocodes it. The spatial processor 710 transfers the geocode to the program management system 702.

In another embodiment, the user system 708 transmits data for a campaign event, including an address for a training event. The spatial processor 710 receives the campaign event data from the program management system 702 and executes a spatial query and a data query to identify the campaign event for the address. The spatial processor 710 transmits the results of the queries to the program management system 702.

In another example, a user system 708 initiates a query to determine what campaign events are located in a county and state. The user system 708 transmits the county and state as the search criteria for the query. The spatial processor 710 receives the county and state data from the program management system 702 and executes a spatial query and a data query to identify the campaign event for the county and state. The spatial processor 710 transmits the results of the queries to the program management system 702.

In another example, the user system 708 initiates a query to determine what campaign events are located in a city. The user system 708 transmits data identifying a point selection or an area selection from a displayed map. The point or area selection may be made through a mouse, touchpad, trackball, pointer, keyboard, or other input device or method. The spatial processor 710 receives the point or area selection and executes a spatial query and a data query to identify the campaign event for the point location. The spatial processor 710 transmits the results of the queries to the program management system 702.

The image processor 712 receives queries from the program management system 702. The image processor 712 transmits a response to the program management system 702 with the result of the query or an indication that the requested data does not exist. In one example, the response includes one or more images identifying geospatial data for an area corresponding to the query. The one or more images also may identify campaign data, such as one or more events, one or more campaigns or campaign types, one or more campaign attributes or definitions, audiences, and/or other campaign data.

The image processor 712 receives requests from the program management system 702 for images or other image data, and the image processor responds to the program management system with the corresponding images or other image data or an indication that the requested images or other image data do not exist. The image processor 712 generates images or other image data for geographic areas and locations and/or feature data. The images may identify geospatial data, including map data identifying geographic areas or locations for one or more campaigns or one or more campaign events, and other geospatial data. The images also may identify other campaign data, such as one or geographic areas for one or more campaigns, one or more campaign events, one or more audience members, one or more point features, one or more locations of interest, such as a building, one or more geographical features, other program data, and other feature data. A point feature indicates a location or area of a person, place, or thing, such as a campaign event, an audience member, including a contact, a business, a residence, a park, and other features. A point feature may be identified on a map image, other image, or other map data. In some instances, point features are identified with an icon or other symbol. In some embodiments, the point feature optionally may be a geocoded location. In other examples, the point feature is spatially determined, such as with reference to spatial coordinates, ordinates, or another method.

The image processor 712 queries the data management system 706 to obtain feature data, including spatial data, point feature data, campaign event data, campaign definition and attribute data, audience data, interest area data, and other campaign data. The image processor 712 receives a response with a result of the query or an indication that the requested data does not exist.

In one embodiment, the queries transmitted from the program management system 702 to the spatial processor 710 and/or the image processor 712 are SQL queries. In this embodiment, the responses transmitted from the spatial processor 710 and/or the image processor 712 to the program management system 702 are SQL responses.

In another embodiment, the queries transmitted from the spatial processor 710 and/or the image processor 712 to the data management system 706 are SQL queries. In this embodiment, the responses transmitted from the data management system 706 to the spatial processor 710 and/or the image processor 712 are SQL responses.

In one embodiment, the image processor 712 identifies campaign feature data and spatial data located within a range of a geocode or a spatial query input and generates one or more images, text, and/or other data representing the identified campaign feature data and/or spatial data. In one example, the image processor 712 generates one or more maps identifying a geographic area within a range of a query, such as a search or selection on a map, and transmits the maps to the program management system 702. In another example, the image processor 712 generates one or more maps identifying a geographic area for the specific query.

The maps may include multiple layers of campaign feature data, spatial data, point feature data, campaign event data, campaign definition and attribute data, audience data, interest area data, other campaign data, document data, and/or journal data. Feature data in this example refers to data selected for display. In one example, the map may identify geospatial data, including data identifying geographic areas for one or more campaigns, one or more campaign events, one or more audience members, one or more point features, one or more locations of interest, one or more geographical features, other program data, and other feature data. In this example, layers of data may be selected so they are displayed on the map. The layers include both spatial data and campaign data. If a campaign events layer is not selected, the campaign event data from the campaign datasets is not generated for display. Similarly, if a roads spatial layer is not selected, the spatial data identifying roads is not generated for display. The image processor 712 also generates images based on navigation criteria, such as a selection of a pan, zoom, a drag pan, or movement of a map in a direction.

The data management system 706 receives and processes communications, such as queries and/or data, from the program management system 702 and the spatial management system 704. The data management system 706 transmits communications, including spatial data and/or campaign data, to the program management system 702 and the spatial management system 704. The data management system 706 stores and retrieves spatial data and campaign data.

The data management system 706 may include one or more data storage systems, tables, databases, data structures, and/or volatile and/or nonvolatile memory. The data management system 706 manages geospatial data 714, program data 716, campaign data 718, external campaign data 720, document data 722, and/or journal data 724.

The geospatial data 714 may include geographic data, spatial data, point features data, geographical features data, or other geospatial data. The geospatial data 714 also may include geocoded or geocoding data, other geocode data, other coordinate or ordinate-based data, and image data.

The program data 716 may include campaign data, program system specifications, identifications of users, user information, associated parties, and other program data used to manage the campaign and the campaign management system.

In the embodiment of FIG. 7, campaign data 718 includes campaign definition data 726, campaign attributes data 728, campaign geographies 730, and campaign audience data 732. Other examples exist.

Campaign definition data 726 includes a name and description of the campaign. In one example, the campaign definition data 726 includes a campaign name, a campaign description, a campaign type, a start date for a campaign, an end date for a campaign, one or more target audiences, and one or more message contents for a campaign. Other examples exist. In another example, campaign types include direct mail, magazine, newspaper, print, radio, television, tradeshow/fair, training, attendance, meeting, surveys, billboards, bill stuffers, special interest group, point of sale, public relations, sales, marketing for products or services, informational segments, email, webcast, video, outreach programs, safety, and/or other campaign types. Other examples exist. Campaign definition data 726 may be included for one or more campaigns.

Campaign attributes data 728 describes the one or more details and measurements for a campaign. In one example, campaign attributes data 728 varies based upon a campaign type. In another example, a campaign attribute may include audience potential, vendor company, vendor contact, format, rating, target area, form, description, cost, frequency, channel, affiliate, theme, location, survey, number of surveys, group, meeting purpose, region, geographical feature, and/or other campaign attributes. Other examples exist.

Geographies data 730 may include one or more locations, regions, areas, and/or geographical features. In one example, geographies data 730 varies based upon a campaign type. In another example, geographies data 730 includes an address, a city, a place, a county, a state, a zip code, another region, another area, a location, a geographical feature, and/or another geography. In another example, geographies data also may include interest area data. Interest area data identifies one or more interest areas for one or more campaign events, point features, environmental points of interest, or other identifiers. In one embodiment, the interest area data identifies a region of interest for a marketing campaign or a sales campaign. In another example, the interest area data identifies a region or interest for a damage prevention campaign or an education campaign for a pipeline industry or another industry.

Audience data 732 may include a contact or audience name, a contact or audience type, a company name, a title, an address, a city name, a county name, a state name, a zip code, one or more phone numbers, a fax number, an email address, a region, a SIC code, statistical information, journal entry data, document data, and/or other information. The audience data 732 may include one or more contacts or audience members.

External campaign data 720 includes data linked to or associated with the geospatial data and/or campaign data in one embodiment. The external data 720 may include data that enables a user to identify characteristics of a region, location, and/or audience before and/or after a campaign. For example, external campaign data 720 may include survey data, census data, demographic data, accident reports, incident reports, measures of phone calls, web site contacts, in-person visits, sales information, regional data, other reports, and/or other information that identifies results of a campaign, a measurement of the scope of a campaign, and/or a reach, frequency, cost, return on investment, efficiency, and/or effectiveness of a campaign.

The document data 722 identifies data of one or more documents. The document data 722 may include documents, such as word processing documents, spreadsheet documents, images, HTML documents, portable document format (PDF) documents, audio documents, video documents, email, regulatory documents, or other documents, data from any of the foregoing, and/or other document data. The document data 722 may identify links to documents or provide other location identifiers to documents.

The journal data 724 includes journal entries, contact or audience names and identifiers, campaign data, links to documents, document identifiers, documents, or document data, and/or other data for a journal. The journal data 724 may relate to spatial data and/or campaign data, including data for campaign events, audience data, geographies, including interest area data, program data, and/or other relevant data for one or more campaigns.

Any of the data 714-732 in the data management system 706 may include geocode information or other spatial information for spatial searches. For example, the campaign data 718 may include a point feature or other geocoded or spatial data to identify the location or region of a campaign event.

The user system 708 receives communications, including data and/or signaling, and transmits communications, including data and/or signaling in some embodiments. In one embodiment, the user system 708 includes a browser that displays feature data and spatial data or other campaign data, including images, received from the program management system 702 and enables a user to enter data, including selecting portions of a map or other image. Although, other tools may be used to enter data and display data. In one embodiment, the user system 708 includes one or more processors and/or systems configured to communicate with the program management system 702. In another embodiment, the user system 708 shares one or more processors with other system components. In one example, the user system 708 is based on one or more processors or computers, such as a personal computer, a browser based device, a mobile device, including a wireless device, or another processing device. In one example of this embodiment, one or more components of the campaign processing system 104C are based on a computer, such as a personal computer, a mobile device, or another processing device. In another example, all of the components of the campaign processing system 104C are based on a computer, such as a personal computer, a mobile device, or another processing device. In one embodiment, the user system 708 is an input and/or output device.

In one embodiment, the campaign processing system 104C operates as follows. The user system 708 transmits a request to the program management system 702 for campaign data identifying a radio campaign within a selected zip code. The program management system 702 processes the communication.

The program management system 702 transmits a request to the spatial processor 710 to locate the specific type of campaign within the selected zip code. In this example, the zip code is a spatial layer, and the radio campaign data is in one or more campaign datasets. In one example, the spatial processor 710 processes the request, determines a spatial search query, and transmits the spatial search query to the data management system to locate the feature data for the search criteria. In this example, the search criteria include campaigns having a campaign type of radio and a spatial property within the selected zip code.

In another example, the spatial processor 710 processes the request and geocodes the search criteria. The search criteria in this example is the zip code. The spatial processor 710 transmits a request with the geocode data to the data management system 706 to locate the feature data meeting the selected criteria. In this example, the selected criteria include campaigns having a campaign type of radio campaign and a spatial property within the selected zip code.

The database management system 706 responds to the spatial processor 710 with the requested feature data. The spatial processor 710 responds to the program management system 702 with the feature data resulting from the request. In this example, the feature data includes a list of campaign events that have the radio campaign type within the selected zip code.

The program management system 702 processes the response from the spatial processor 710 and determines that a match for the feature data was located. The program management system 702 transmits a request to the image processor 712 for the image data that corresponds to the feature data. The image processor 712 queries the data management system 706 for the requested image data.

The data management system 706 processes the request and transmits a response to the image processor 712 with the image data that matches the request. The image processor 712 processes the image data and generates one or more map images to the program management system 702. In this example, the map images include a map image depicting the geographic area identified by the selected zip code and identifying the campaign symbology for the radio campaign events within the zip code, an overview map image identifying the selected zip code and the surrounding zip codes within the selected range, and a map legend identifying the feature data on the map image.

The program management system 702 transmits a query to the data management system 706 to obtain cross reference data associated with the radio campaign events. The cross reference data is document data, journal data, and/or other data associated with specific feature data returned from the spatial processor 710 and/or the image processor 712 in response to the queries. In this example, the cross reference data includes documents that are linked to the campaign events, journal entries linked to the campaign events, and/or other feature data returned in the response. The data management system 706 transmits a response to the query, which includes links to documents associated with each campaign event and a link to a list of journal entries associated with each campaign event. In other examples, the data management system 706 transmits the actual documents and journal entries to the program management system 702 in the response. In other examples, associated or linked document data and journal data is not present in the system, and no cross reference data exists.

In other examples, the program management system 702 transmits one or more separate queries to the data management system 706 for associated document data and journal data. In this example, the data management system 706 responds with document data, including specific documents linked to specific campaign events, and journal data, including specific journal entries and data identifying the users that added the journal entries. The one or more queries may be within the same query as a cross reference data query or separate queries. In other examples, associated document data and journal data are not present, and the program management system 702 does not transmit any queries for associated document data and journal data.

The program management system 702 processes the data received in the responses from the spatial management system 704 and the data management system 706. In one example, the program management system 702 generates the images received from the image processor 712, the feature data received from the spatial processor 710, and the cross reference data, including document data and journal data, received from the data management system 706 for display by the user system 708. In this example, the cross reference data includes links to linked document data and other links to linked journal data. In other examples, the cross reference data includes the document data and the journal data in one or more tabs on the display. In one example, the program management system 702 renders the data as a user interface displayable by the user system 708. In another example, the program management system 702 generates the data to a user interface for rendering or other display.

In another example, the user system 708 transmits a communication to the program management system 702 requesting all campaign events at an address or location. In this example, the program management system 702 is configured to return results within a selected range or distance of the address or location. The program management system 702 queries the spatial management system 704 to identify feature data within the selected range of the address or location.

The spatial management system 704 queries the data management system 706 to identify feature data within the selected range of the geocode. The data management system 706 returns the feature data matching the query to the spatial management system 704. The spatial management system 704 formats the matching feature data, if necessary, and transmits the feature data to the program management system 702.

The program management system 702 transmits another query to the spatial management system 704 requesting image data corresponding to the feature data. The spatial management system 704 transmits a response to the program management system 702 with the requested image data.

The program management system 702 transmits a request to the data management system 706 to obtain journal data and document data corresponding to the feature data. The data management system 706 responds to the program management system 702 with the journal data and document data.

The program management system 702 generates the feature data, the image data, the journal data, and the document data to the user system 708. In this example, a user interface is rendered with a map identifying a geographic area for the selected range around the address or location. In this example, the feature data includes campaign data for all campaign types in the geographic area, including each event for the campaign with the name of the campaign, a description of the campaign, start and end dates for the campaign, the campaign type, and the message content for the event. The campaign data is indicated on the map by selected campaign symbologies, including a selected color, symbol, and/or shading. For example, a first campaign type for a region or area may be indicated by a first color on a map or image. A second campaign type for the region or area may be identified by a second color or a first shading. Multiple campaign types for the region or area may be identified by a third color or a second shading. Another campaign type may be indicated by a symbol, such as a flag, a star, a pin, a circle, a point, a square, and/or another symbol. Other examples exist. Feature data includes spatial data in some examples.

In another embodiment, the program management system 702 generates map data identifying an area for a campaign to the user system 708. The map data includes spatial data. In some examples, the map data also includes campaign data and/or campaign symbology. In one example, other campaign data is generated for display, such as in a table, text, image, or result frame, as feature data, or in another form to identify campaign event data and other campaign data. In some examples, external data also is generated for display.

The user system 708 receives the map data and generates it for display. The user system 708 may generate the map data for display as a map image, for a user interface, or in another manner.

A selection is made on or for the map data by the user system 708. For example, a mouse click or other selection may be made somewhere on a generated map image or otherwise for the map data or feature data to select spatial data, campaign symbology, and/or campaign data. In another example, a mouse click or other selection may be made somewhere on a generated map image for zooming in or out or displaying other spatial data, campaign symbology, and/or campaign data. Alternately, an area on the map image may be selected, such as with a mouse, a touchpad, a keyboard, other input device, or other device. Alternately, other spatial data, one or more campaign symbologies, other campaign data, and/or other data may be selected. In one example, campaign data is generated for display with the spatial data, and a portion of the campaign data is selected.

In one example, the selection of one point on a map image or otherwise for the map data causes selection of an area. For example, a map of a state may be displayed to show the counties in the state. Selecting any point within the boundaries of a county causes selection of the county. In another example, selecting a point within the boundaries of a county causes a selected or an area within the county around or within the selected point. In another example, a group of counties in a state is displayed for a map image. Selecting any point on the map image causes a "zoom" level to occur for that point or an area for that point. In this example, the area of the resulting zoom level comprises the selection and the selected area. In another example, selecting a point on the map image causes selection of a location for the map data. For example, a specific city, cross street, address, geographic feature, or other location may be selected. In another example, an area on a map image is selected by placing a box, circle, oval, or other shape around the area. In this example, the area within the box, circle, oval, or other shape comprises the selection. Other examples exist.

The user system 708 transmits the selection or an indication or identification of the selection to the program management system 702. In this example, the selection or an indication or identification of the selection is the query or search criteria for the query. A separate entered address, city, state, other geography, xy coordinates, or other coordinates or ordinates are not transmitted or used in some examples of this embodiment. The program management system 702 transmits a request to the spatial processor 710 to locate campaign data and/or spatial data corresponding to the selection.

The spatial processor 710 processes the request and determines a search criteria for a query, such as a geocode, spatial search criteria, data search criteria, or other search criteria. The spatial processor 710 transmits a request with the search criteria data to the data management system 706 to locate the campaign and/or spatial feature data meeting the selected criteria. In one example, the spatial processor 710 is configured to return spatial data and campaign data corresponding to the selected criteria.

The database management system 706 responds to the spatial processor 710 with the requested feature data. The spatial processor 710 responds to the program management system 702 with the feature data resulting from the request. In this example, the feature data includes an identification of campaign events that have television and print ad campaign types within or at the selected area or location.

The program management system 702 processes the response from the spatial processor 710 and determines that a result with feature data was returned. The program management system 702 transmits a request to the image processor 712 for the image data that corresponds to the feature data. The image processor 712 queries the data management system 706 for the requested image data.

The data management system 706 processes the request and transmits a response to the image processor 712 with the image data for the request. The image processor 712 processes the image data and generates one or more map images to the program management system 702. In this example, the map images include a map image depicting the geographic area or location identified by the selection and identifying the campaign symbology for the television and print ad events within or at the selected area or location, an overview map image identifying the selected area or location and the surrounding area within a selected range, and a map legend identifying the feature data on the map image.

The program management system 702 transmits a query to the data management system 706 to obtain cross reference data associated with the television and print ad campaign events. The cross reference data is document data, journal data, and/or other data associated with the feature data returned from the spatial processor 710 and/or the image processor 712 in response to the queries. In this example, the cross reference data includes documents that are linked to the campaign events, journal entries linked to the campaign events, and/or other feature data returned in the response. The data management system 706 transmits a response to the query, which includes a list of journal entries associated with each campaign event and links to documents associated with each campaign event and/or each journal entry. In other examples, the data management system 706 transmits the actual documents and journal entries to the program management system 702 in the response. In other examples, linked documents and linked journal entries are not a part of the system, and no cross reference data exists.

In another example, the program management system 702 transmits one or more separate queries to the data management system 706 for associated document data and journal data. In this example, the data management system 706 responds with document data, including specific documents for specific campaign events and/or journal data, including specific journal entries and data identifying the users that added the journal entries. The one or more queries may be within the same query or separate queries. In other examples, associated document data and journal data is not present, and the program management system 702 does not transmit any queries for associated document data and journal data.

The program management system 702 processes the data received in the responses from the spatial management system 704 and the data management system 706. In one example, the program management system 702 generates the images received from the image processor 712, the feature data received from the spatial processor 710, and the cross reference data, if any, including document data and journal data, received from the data management system 706 for display by the user system 708. In this example, the cross reference data includes links to linked document data and other links to linked journal data. In other examples, one or more journal entries are identified for each campaign event, and one or more documents are identified for each journal entry. In other examples, the cross reference data includes the document data and the journal data in one or more tabs on the display. In other examples, cross reference data is not present. In one example, the program management system 702 renders the data as a user interface displayable by the user system 708. In another example, the program management system 702 generates the data to a user interface for rendering or other display. Other examples exist.

Figure 8:
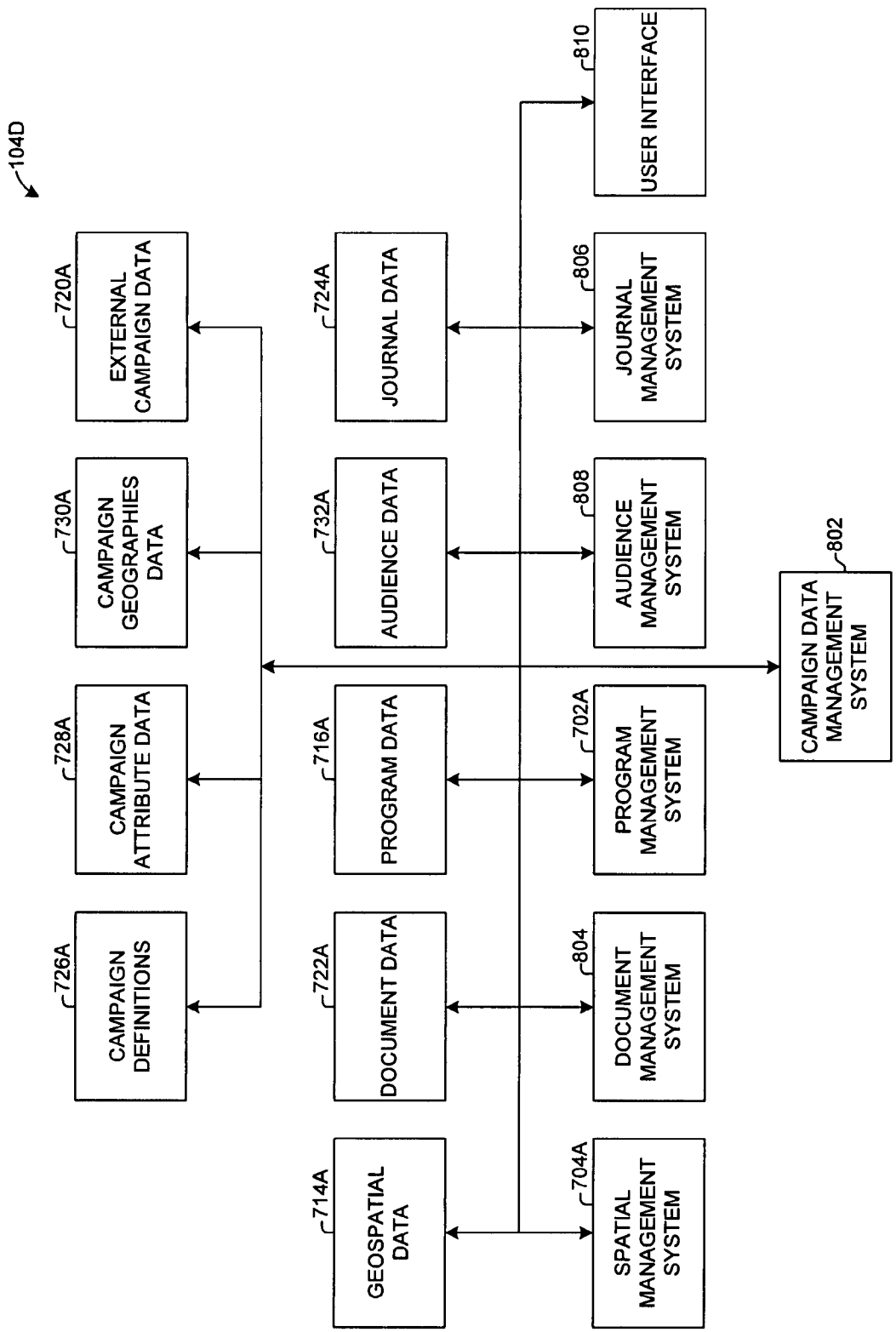
FIG. 8 is a block diagram of another campaign management system in accordance with an embodiment of the present invention.

FIG. 8 depicts another exemplary embodiment of a campaign processing system 104D. The campaign processing system 104D includes a program management system 702A, a spatial management system 704A, a campaign data management system 802, a document management system 804, a journal management system 806, an audience management system 808, and a user interface 810. The campaign processing system 104D also includes geospatial data 714A, program data 716A, document data 722A, journal data 724A, and audience data 732A.

The program management system 702A manages the program data 716A, including storage and retrieval of the program data, and communications to and from the user interface 810. The communications may be queries, data, signaling, or other communications. For example, the program management system 702A receives queries for data from the user interface 810 and transmits responses to the user interface. The responses may include feature data and/or image data, including map data.

The program management system 702A manages communications to and from the other components of the campaign processing system 104D. The communications may be queries, data, signaling, or other communications. For example, the program management system 702A initiates queries for feature data and image data, including map data, to other components of the campaign processing system 104D, and the program management system receives responses from the other components of the campaign processing system. The program management system 702A performs other functions similar to the program management system 702 of FIG. 7.

The program management system 702A generates one or more images and/or feature data, such as for or to the user interface 810. The program management system 702A formats the feature data and/or image data, including map data, in a form receivable and processable by the user interface 810. In some examples, the communications generated to the user interface 810 include maps, images, campaign data, spatial data, links for documents, document data, links to journal entries, journal entry data, and/or other data.

The spatial management system 704A manages the spatial data 714A, including storage and retrieval of the spatial data and querying the spatial data. The spatial management system 704A receives and processes communications, such as queries and data, from the program management system 702A and other components in the campaign processing system 104D. The spatial management system 704A transmits communications, such as query results and data, to the program management system 702A. The data may include feature data, maps, and/or image data.

The spatial management system 704A receives queries from the program management system 702A and, if a result is identified, returns results matching the queries to the program management system. The results may include one or more images and/or feature data. In some instances, the spatial management system 704A queries the other components of the campaign processing system 104D and retrieves data from the other components. This data may include spatial data, campaign data, document data, and/or journal data.

In one embodiment, the spatial management system 704A initiates spatial searches and/or data searches. In another embodiment, the spatial management system 704A geocodes data received from the program management system 702A and generates a search based on the geocoded data. The spatial management system 704A generates searches based on data received via the user interface 810, including spatial data, campaign data, queries, and other data. The spatial management system 704A also retrieves image data corresponding to feature data, spatial data, spatial searches, data searches, and/or geocoded data.

The image data may include map data identifying geographic areas or locations for one or more campaigns. The image data also may include a map image, an overview map image, a legend, one or more campaign symbologies, one or more point features, one or more audience members, and/or other spatial data and/or campaign data. The spatial management system 704A also performs functions similar to the spatial management system 704 of FIG. 7.

The campaign data management system 802 manages campaign data, including campaign definition data 726A, campaign attribute data 728A, campaign geographies data 730A, and external campaign data 720A. The campaign data management system 802 manages access, storage, retrieval, and operation of campaign data. The campaign data management system 802 also performs functions similar to the data management system 706 of FIG. 7.

The document management system 804 manages document data 722A. The document management system 804 enables a user to associate documents to campaign data, journal entries, and/or other feature or spatial data so that an associated document or other associated document data will be generated for display upon selection or display of selected data or upon selection of a link or other identifier of a document or document data.

In one example, a user interface 810 enables linking a document to selected feature data or an attribute of the feature data, such as to a campaign event or a campaign organization or an audience member or journal entry. When the event, organization, audience member data, or journal entry is generated for display, a link for the document also is generated for display. A user may select the link, and, in response, the document will be generated for display by the program management system 702A. Alternately, a user may link a document to selected feature data. When the feature data is generated for display, the document also will be generated for display.

In another example, document data from a document is linked to feature data. When the feature data is generated for display, the document data, not the document itself, is generated for display with the feature data.

The journal management system 806 manages journal data 724A. The journal management system 806 enables a user to enter new journal data, edit existing journal data, delete journal data, or link journal data to other data. In one example, journal data is received from or transmitted to the user interface 810. Journal data includes, for example, journal entries identifying one or more campaign events, messages, contents, message content types, a selected aspect of one or more campaigns, a location, geographic feature, region, area, or other spatial data, one or more audiences or audience members, including one or more contacts, other campaign data, program data, feature data, or other data. The journal data may include a user making an entry, another person or entity, an action taken, a user taking the action, a date the action was taken, other transaction data, and/or other data. An action may include, for example, transmitting, generating, or providing a campaign message to one or more audiences or audience members, contacting or otherwise communicating with a vendor or provider of the message, causing another campaign event to occur, or another action relevant to the campaign.

The journal management system 806 also tracks communications and information related to campaign events and contacts or other audience members or specific users. In one embodiment, if a communication is sent to a contact at a vendor, the journal management system 806 automatically generates a journal entry identifying the communication transmitted to the contact, the contact, the date and time the transmission was sent, and a comment or other entry identifying the context of the communication. In another embodiment, if an action is taken related to a campaign event, the journal management system 806 automatically generates a journal entry identifying the action taken for the event, the user taking the action, and the time and date the action was taken.

In one embodiment, the journal management system 806 attaches one or more journal entries to feature data, including campaign data and/or spatial data. For example, the journal management system 806 may attach a journal entry to an event point feature, a campaign event feature, or a location identified by a spatial feature. Other examples exist.

The audience management system 808 manages audience data 732A. The audience management system 808 receives and stores audience data 732A and retrieves audience data for display. In one example, the audience data 732A is entered using the user interface 810. In another example, the audience data 732A is generated for display to the user interface 810.

The audience management system 808 enables a user to enter new audience data, edit existing audience data, or delete audience data, including for one or more audiences or audience members. A contact is one type of audience member. The audience management system 808 also enables a user to link audience data to other campaign data and/or spatial data.

The user interface 810 generates data for display, including campaign data and spatial data. The user interface 810 generates image data, including a map image, an overview map image, a map legend, other images, an event or audience point feature, campaign symbology, and/or other spatial data and/or campaign data.

The user interface 810 also enables a user to enter data, including campaign data, spatial data, and queries. A query is transmitted to the program management system 702A to locate one or more selected campaigns, campaign events, locations, regions, areas, journals, documents, contacts, and/or other campaign data and/or spatial data. The query may include, for example, a request to locate a campaign by address, zip code, city, county, state, other location, company, contact name, phone number, journal entry, document entry, or another query type. In another example, a query includes a selection on a map or image, or a selection of other campaign data or spatial data.

One or more tools may be generated for display to the user. The user may select one or more of the tools to control the type of query that will be made. In one embodiment, queries are preconfigured and published in the form of a search tool and a navigation tool. One or more SQL queries may be tied to the search or navigation tools in one or more formats. For example, if the user selects a search tool, an SQL query may be made to a database to search for campaign data and spatial data matching the query input by the user and the selected search tool. In another example, if the user selects a navigation tool, an SQL query may be made to a database to search for campaign data and spatial data matching the query input by the user and the selected navigation tool.

The user interface 810 also enables a user to select spatial layers and other layers for display. The other layers may include campaign data layers that are generated for display, such as a campaign events layer that generates campaign symbology for one or more campaigns or an audience layer that generates point features identifying the location and/or features of one or more audience members.

The user interface 810 enables a user to link one or more sets of campaign data to one or more spatial layers and/or other layers and/or to one or more other sets of campaign data, such as linking document data to campaign data. The user interface 810 also enables a user to configure the campaign processing system 104D, such as to configure display aspects or data processing aspects, and configure and control user access to the feature data and image data.

In some embodiments, the program management system 702A controls access to the user interface 810 or other components of the campaign processing system 104D through one or more security features. The security features may include requiring a user to enter a valid user name and password and providing access to selected tools, campaign data, spatial data, and data layers based on a user's security access level. The security access level may be controlled, for example, using a user identification and/or a user password.

In one example, a user enters its user identification and password and is able to access a selected set of spatial data and campaign data for a campaign. Another user enters its user identification and password and is able to access a different selected set of spatial data and campaign data for the same campaign. Still another user enters its user identification and password and is able to access still another selected set of spatial data and campaign data, but for a different campaign.

In one embodiment, the campaign processing system 104D is configured in a service bureau-type system, and all of the users are able to access their selected sets of data through the program management system 702A by using their user identifications and passwords. In another embodiment, the campaign processing system 104D is configured in two internal systems, one for each company. In this embodiment, the first and second users access the selected data from one internal system, and the third user accesses the selected data from a second internal system. In another embodiment, the campaign processing system 104D is configured as a web hosting system or another system. In still another embodiment, the campaign processing system 104D is a configured in a single processing device, such as a single computer or mobile device.

Figure 9:
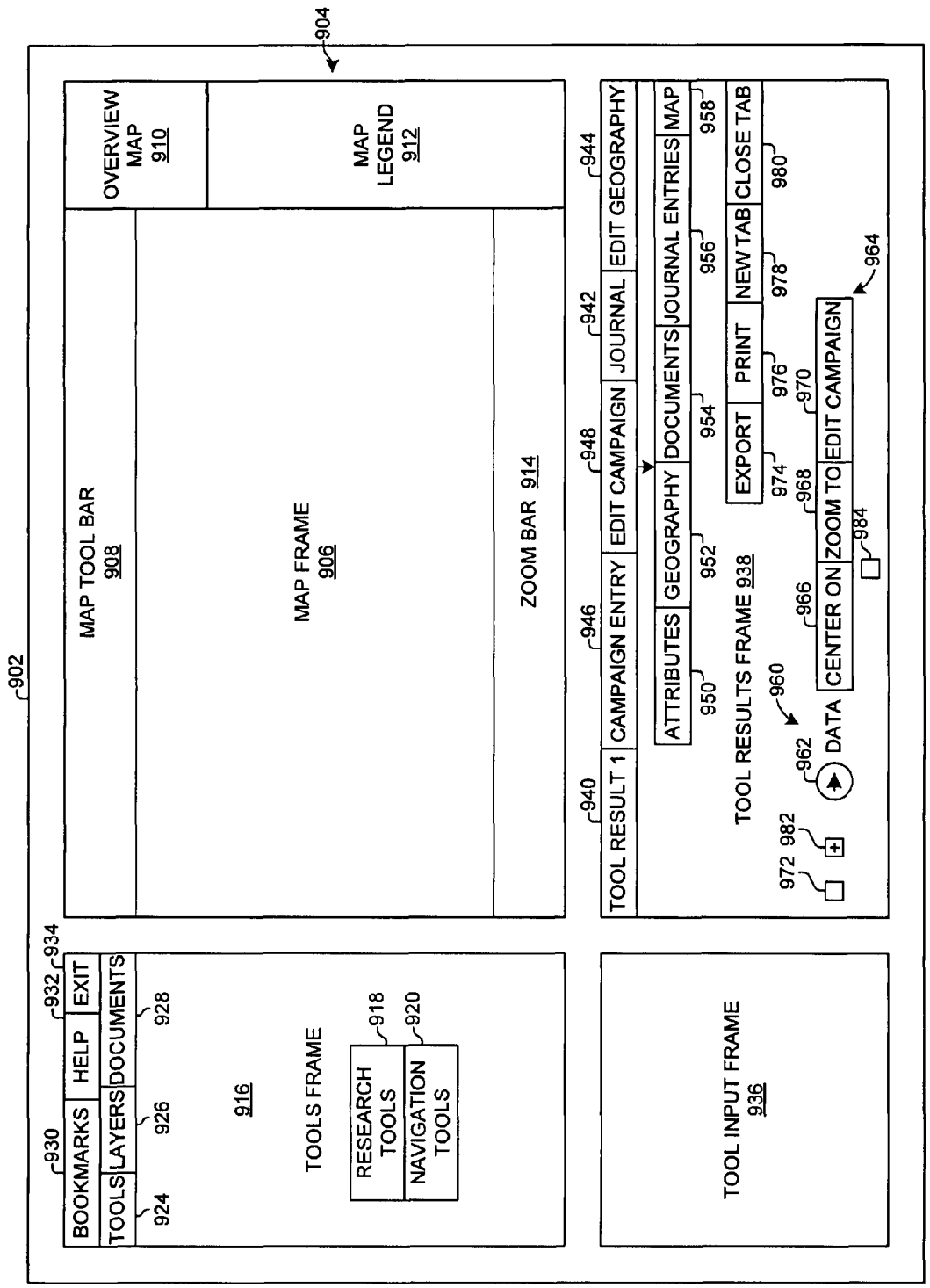
FIG. 9 is a diagram of a user interface for a campaign management system in accordance with an embodiment of the present invention.

FIG. 9 illustrates an exemplary embodiment of a user interface used to enter query criteria, select tools for queries, select map images, campaign data, and/or spatial data for queries, and generate spatial data and campaign data for display. The user interface may be used to configure tools, define linked datasets, and perform other operations.

The user interface 902 has a browser frame 904. The browser frame 904 in the example of FIG. 9 includes a map frame 906, a map tool bar 908, a thumbnail overview map 910, a map legend 912, and a zoom bar 914. In other examples, the browser frame 904 includes only the map frame 906. In still other examples, the browser frame 904 includes the map frame 906 and a combination of one or more of the map tool bar 908, the thumbnail overview map 910, the map legend 912, and the zoom bar 914.

The map frame 906 displays a map image or another image. The map image may include spatial data and/or campaign data, such as feature data. One or more point features, locations, regions, spatial data, and/or campaign data may be selected on the map frame 906 to cause generation of additional map displays or generation of other data. The map frame 906 provides image display and navigation capabilities for a map image, such as pan and zoom, based on input commands from an input device or other source, such as a keyboard, a mouse, a touch pad, a pointer, or another device. In some embodiments, the map frame 906 enables selection of a map image or other spatial data or campaign data to initiate a query or to operate as input data for a query.

The map tool bar 908 includes function buttons that control the behavior of the map image display generated to the map frame 906 and what other components of the browser frame 904 are available. In one embodiment, the map tool bar 908 includes buttons for turning the map legend on and off, turning the overview map on and off, turning the layer list on or off, and a refresh button that enables a user to force the current map in the map image to be redisplayed.

A drag pan button enables a user to drag the map image in the map frame in a selected direction, such as left, right, up, down, diagonally, or in another direction, to scroll the visible map in the map frame in a desired direction. In one example, a user may use a mouse, a touchpad, or another pointer or input device to select the map, drag the map in a desired direction, and release the map upon reaching a desired location. The map then will regenerate with new spatial data and campaign data for the selected geographic area.

A lasso button enables a user to mark a location on the map image. In one example, a user may mark a location on the map image using a mouse, a touchpad, or another pointer or input device. In another example, the lasso button enables a user to select an area using a circle, an oval, a square, a rectangle, or another area. Other examples exist. The selected area may be used for another operation, such as a zoom, identifying campaign data or spatial data within the selected lasso area for a query, data generation, a report, or another operation. In one example, the lasso feature enables selection of an area on the map in order to display information related to the campaigns within the area in the tool results frame. The lasso button enables a user to toggle the lasso feature on and off.

A print button enables a user to print the map image displayed in the map frame or to print other data. The print button also may enable a user to print the map image to an electronic document.

The thumbnail overview map 910 displays a smaller version of the map image display zoomed out so that the user can visually identify the approximate location of the map image display relative to other spatial features. In one example, the overview map 910 displays a map area of a selected county relative to several surrounding counties.

The map legend 912 identifies the spatial layers and data layers that currently are visible on the map image display. The map legend 912 also may depict colors, shading, symbols, or other feature designations for selected layers, features, or other data that is displayed. The map legend 912 may designate campaign symbology for selected data, features, and/or layers in some embodiments. The campaign symbology designates color identifiers, shade identifiers, pattern identifiers, symbols, and/or other campaign symbology for campaign events, including areas and locations for events. The symbology may include symbols designating a center or other point or location for an area. A symbol for a location may indicate a point identifier for an area covered by one or more campaign events.

The zoom bar 914 enables a user to zoom the map image display area in or out relative to the current map image display area. The current relative zoom level may be indicated by a color or shape on the zoom bar, such as an arrow, a square, a dot, or a circle or in another manner. The user may select a location on the zoom bar 914 to zoom in or out.

The user interface 902 optionally includes a tools frame 916. In one embodiment, the tools frame 916 includes a research tool 918 to enable an input for a query for a search of campaign data and a navigation tool 920 to enable an input for a query for a navigation search for one or more geographic areas, regions, geographic features, or locations. A location or area of an image in the map frame 906, other spatial data, or campaign data also may be selected for an input, query, search, research, or navigation.

One or more research tools, one or more navigation tools, or other search tools may be used for a single query. A search is a query that is executed each time a user selects a search tool and selects a "Search" or "Filter." This results in the execution of the search tool's query with the results being displayed as map data, such as a map image, and as other feature data, such as campaign data in tabular form, text, or another form. In one example, a research tool 918 locates campaigns, and the navigation tool 920 is used to locate geographic areas, regions, geographic features, or locations. In this example, when either the search tool 918 or the navigation tool 920 is used, a map identifying a set of campaign data that match the search criteria is generated for display in the map frame 906. Also, a list of the feature data associated with the located campaign data is displayed. The user can pan the map or perform other search operations. A location or area of an image in the map frame 906, other spatial data, or campaign data also may be selected for an input, query, search, research, or navigation. Navigation and other tools may be optional in some embodiments.

The tools frame 916 also may include a tools utility 924 and a layers utility 926 to enable toggling between selections of tools and layers. Layers may be selected for spatial data and campaign data.

The tools frame 916 also may include a documents utility 928 that enables a user to display documents that are associated with campaign data or spatial data. In one example, when the documents utility 928 is selected, a screen is displayed that enables the user to select a campaign event and/or one or more campaign or spatial feature data attributes or other campaign data to which the document will be associated, including other document data, map data, journal data, or other data, and to associate the document to the selected feature. Once associated, the document can be displayed with the feature data and displayed when the feature data is selected, displayed when a link, icon, or other selection is selected, or displayed in another fashion.

In one example, the user also may select whether a link, icon, or other display method will be used to display the document to the user. In another example, the user may associate the document directly to a feature or an attribute, such as a contact name or campaign type displayed in a table or to a journal entry, so that when the user selects that displayed feature or attribute, the document is displayed. In another example, linked documents are indexed so that they may be searched using a query.

In one embodiment, when the documents utility 928 is selected, a document tree structure is displayed that enables a user to access and view document data, including copies of documents. In one example, document identifiers, such as document names, are generated for display. A user may select the document identifier, and in response, the document is generated for display. In one example, the documents utility 928 enables a user to view program summary and audit documents.

The tools frame 916 also may include a bookmarks utility 930 that enables a user to bookmark a favorite map location. In one example, when the bookmarks utility 930 is selected, a dialogue box is presented that enables the user to enter a desired name for the location identified by a map image in the map frame 906 and to save the map image as a favorite for future reference. The bookmarks utility 930 is optional.

The tools frame 916 also may include a help utility 932 that presents the user with on-line help. In one example, when the help utility 932 is selected, a user is presented with a content help screen from which the user can select help topics of choice.

An exit utility 934 enables the user to exit a particular screen or tab, such as a journal entry or campaign entry or edit screen. Alternately, the exit utility 934 enables a user to exit the application.

The tool input frame 936 enables a user to input query data. The query may be performed on spatial data and/or campaign data. The spatial data may be organized in a spatial layer and include, for example, an address, a street, a county, a city, a state, a location, an area, or another spatial identification or designation. The data for the query may include, for example, a standard industry classification (SIC) code, a campaign type, a campaign date, an event or event type, a message content, a journal type entry, statistical selection data, a campaign organization name, an audience type or name, an address, a county, a city, a state, a zip code, a cross street, a location, an area, or other data applicable to the application in which the tool input frame 936 is located.

The user interface 902 also includes a tool results frame 938 in which the campaign data and/or spatial data is displayed. In one example, query results for feature data are provided in the tool results frame 938. Data may be displayed in the tool results frame 938 as feature attribute data, such as tabular information, text data, document data, image data, or other data. The feature data generally is displayed in the tool results frame 938 in response to a query, including a selection of spatial data or campaign data in the map frame 906. In some examples, the tool results frame 938 is generated without a map frame 906, or the map frame does not exist.

The tool results frame 938 of FIG. 9 includes utilities for tool results 940. One or more tool result utilities or tabs may be displayed.

The tool results frame 938 also may include a journal utility 942 that enables a user to insert, edit, or otherwise manage journal data. In one example, when the journal utility 942 is selected, a screen is displayed that enables the user to insert new journal data for the campaign management system 102. In another example, when the journal utility 942 is selected, a screen is displayed that enables a user to enter a name, date, and campaign type for a campaign. In another example, when the journal utility 942 is selected, a screen is displayed that enables the user to insert other journal data. In some instances, documents are linked to journal entries through the journal utility 942.

An edit geography utility 944 enables a user to view and/or edit geography data for one or more campaigns. The geography utility 944 displays the geography data.

A campaign entry utility 946 enables a user to enter campaign definition and other campaign data. The campaign entry utility 946 is used to enter campaign data for a new campaign and/or edit campaign data for an existing campaign, including an organization name, a name for the campaign, a start date and an end date for the campaign, a campaign type, a description of the campaign, a target audience type, and a message content.

An edit campaigns utility 948 enables a user to view and/or edit existing campaign data. The edit campaign utility 948 includes an attributes utility 950 enables a user to view and edit campaign attributes. A geography utility 952 enables a user to view and edit campaign geographies. A documents utility 954 enables a user to view and edit linked documents. A journal entries utility 956 enables a user to view and edit linked journal entries. A map utility 958 enables a user to view and edit maps associated with the campaign. One or more of the utilities 942-958 are optional for some embodiments.

Feature data 960 is displayed in the tool results frame for each feature returned as a match to the search criteria, selection, or other query. The feature data may include campaign data and/or spatial data.

In one embodiment, a menu icon 962 is displayed for each row of data. If the user selects the menu icon 962, a features menu 964 is displayed to the user. One or more features, each with a menu icon 962, may be displayed to a user in response to a query or other operation. The menu icon 962 and features menu 964 are optional for some embodiments.

Each feature and menu icon 962 returned from the query or other operation can have a context sensitive menu associated with it for some embodiments. The context of the menu is based on the configuration of the tool or layer for which the operation is performed. The menu is context sensitive because the operations within the menu apply to the feature that is represented by the row of data. The features menu 964 enables a user to perform selected functions on the feature data. In one example, the features menu 964 includes a center on option 966 to center on an event in the map, a zoom to option 968 to zoom the map into a close area around an event displayed on the map or on other feature data, and an edit campaign option 970 to edit campaign data in the selected feature row.

The user may select one or more of the export records checkboxes 972 for one or more rows of data (i.e. features). The user then may select the export button 974. When the export button 974 is selected, the selected feature data displayed in the tool result tab 940 of the tool results frame 938 is generated to a file having a selected file type, such as a spreadsheet, a word processing file, a PDF file, an image file, or another file type.

A print button 976 causes the feature data displayed in the tool results frame 938 to be printed, either to a printer or to an electronic file.

A new tab button 978 enables users to make a copy of the current tab or conduct a new search. The close tab button 980 closes the current tool result tab. A close others button (not shown) closes all tabs except the current tool result tab. A close all button (not shown) closes all tool result tabs. One or more of the buttons 974-980 and/or the close buttons are optional for some embodiments. An expander 982 enables a user to expand a view to display multiple journal entries for a campaign event. A separate expander 984 may be used to expand a view to display multiple documents associated with a journal entry.

The tools frame 916, the tool input frame 936, and/or the tool results frame 938 are optional in some embodiments. In other embodiments, the user interface 902 may include one or more of the map frame 906, tools frame 916, tool input frame 936, and/or tool results frame 938. In one example, the user interface 902 includes the map frame 906 and the tool results frame 938 only on the map frame and some other screen, tab, or location to display campaign data and/or spatial data. In other examples, only the tool results frame 938 is used.

The campaign management system 102 may be configured to limit access to any of the features, utilities, tabs, buttons, and/or menus based upon security settings for a particular user. The security settings may be controlled, for example, by a user's identification and password. In one embodiment, if a user is not authorized to perform a certain operation, such as edit campaign attributes, the menu option or utility for that operation is not displayed.

FIGS. 10-52 illustrate exemplary embodiments of user screen views for a user interface in accordance with an embodiment of the present invention. The exemplary screen views depict a user interface for an application used with a campaign management system and/or a campaign processing system. Other screens or user interfaces may be used.

In the embodiment of FIGS. 10-52, the user screens include a browser frame in which a map frame is generated. The map frame optionally may include a map tool bar, an overview map, a map legend, and a zoom bar. The user screens also optionally may include a tools frame that enables a user to select one or more research tools, navigation tools, and/or other search tools. A tool input frame also optionally may be provided. In some examples of the user screens, the tool input frame or the map frame is collapsed.

The user screens also may include a tool result frame. The tool result frame displays and enables selecting, editing, and entering selected features, campaign data, spatial data, and/or other data, documents, journal entries, geographies, linked features, linked documents, and linked journal entries. In some embodiments, the tool result frame is collapsed. Other features are depicted by the examples and the user interface screens in FIGS. 10-52.

FIG. 10 depicts an exemplary embodiment of a login screen. A user enters a username and password to gain access to the campaign management system, the campaign data, and spatial data. The login screen is optional for some embodiments.

Figure 11:
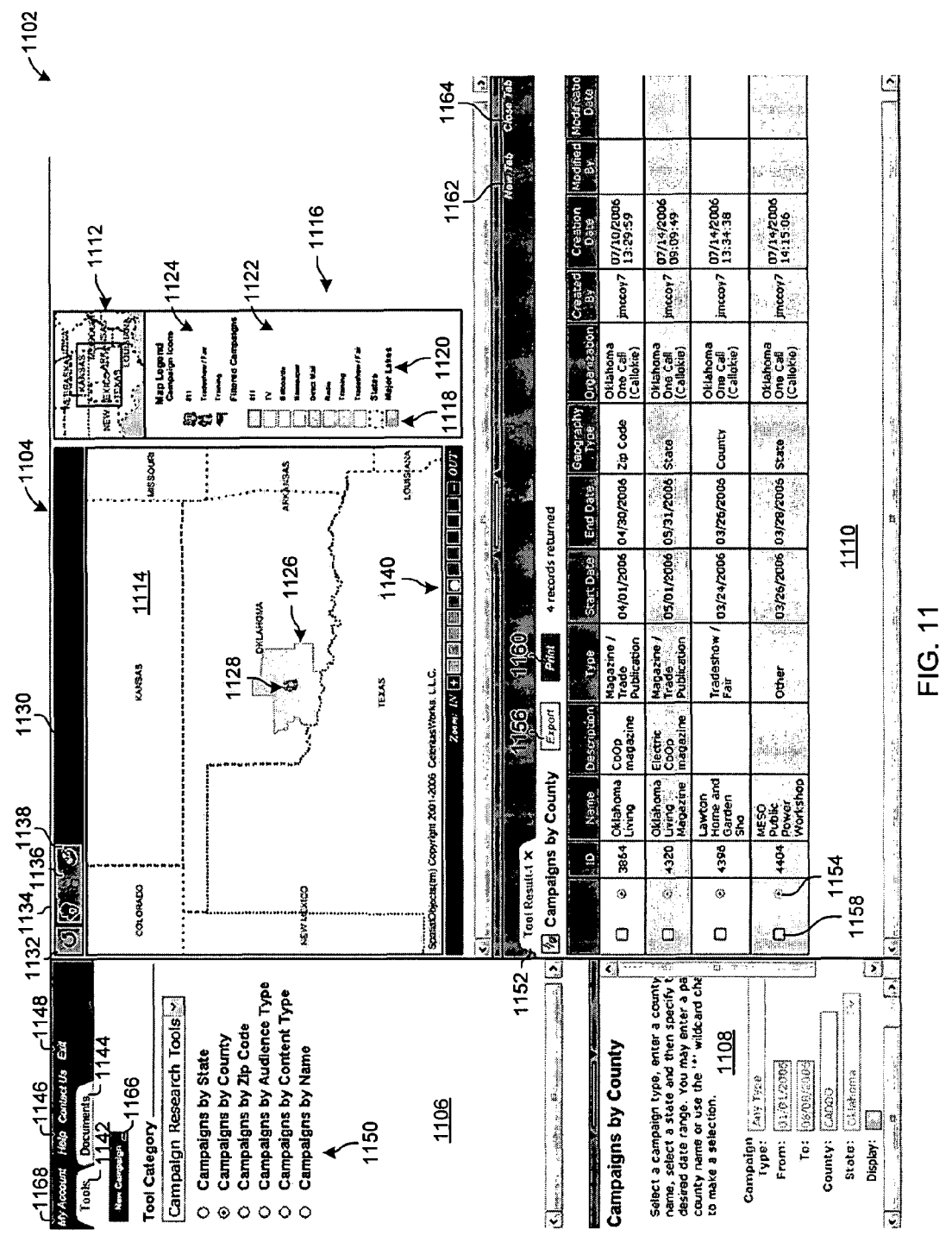

FIG. 11 depicts an exemplary embodiment of a user screen generated for display after a user logs into the login screen or if the login screen is not otherwise generated. In this embodiment, the campaign is a one call information and safety campaign, and the campaign management system manages dig safe and safety messages and other campaign data for the campaign. In this embodiment, each user has access to campaign related data based on the user's profile. Other embodiments and other examples exist.

In the example of FIG. 11, the user screen 1102 includes a map frame 1104, a tools frame 1106, a tool input frame 1108, and a tool results frame 1110. Other examples of user interface screens may include greater, fewer, or different options for maps, features, tools, searches, navigation, and/or data from queries.

In the example of FIG. 11, several tools are associated with the map frame 1104. An overview map 1112 displays a smaller version of the map image 1114 from the map frame 1104 relative to a surrounding geography. The overview map 1112 is zoomed out so that the user can visually identify the approximate location of the map image 1114 displayed in the map frame 1104 relative to other spatial features. The overview map 1112 also may be referred to as a thumbnail map. The overview map 1112 is optional in some embodiments.

A map legend 1116 identifies the data layers that are visible on the map image 1114 in the map frame 1104. The map legend 1116 designates unique campaign symbology 1118 for selected data, features, and/or layers in some embodiments. In the example of FIG. 11, the campaign symbology 1118 designates color identifiers, shade identifiers, pattern identifiers, and/or symbols for campaign events 1120, including areas 1122 and locations 1124 for events. The symbology may include symbols designating a center or other point or location for an area or location. A symbol for a location 1124 may indicate a point identifier for an area covered by one or more campaign events. In the example of FIG. 11, the location symbols 1124 correspond to a campaign event identified at a location 1128 on the map image 1114, and the symbol (i.e. color coding) for one or more events occurring over an area 1122 correspond to campaign events occurring in an area 1126 on the map image.

A map tool bar 1130 also is associated with the map frame 1104. In the example of FIG. 11, the map tool bar 1130 includes a refresh button 1132 that enables a user to force the current map in the map image 1114 to be redisplayed. A drag pan button 1134 enables a user to drag the map image 1114 in the map frame 1104 in a selected direction, such as left, right, up, down, diagonally, or in another direction, to scroll the visible map in the map frame in a desired direction. In one example, a user may use a mouse, a touchpad, or another pointer or input device to select the map, drag the map in a desired direction, and release the map upon reaching a desired location. The map then will regenerate with new spatial data and campaign data for the selected geographic area.

A lasso button 1136 enables a user to mark a location on the map image 1114. In one example, a user marks a location on the map image 1114 using a mouse, a touchpad, or another pointer or input device. In another example, the lasso button 1136 enables a user to select an area using a circle, an oval, a square, a rectangle, or another area. Other examples exist. The selected area may be used for another operation, such as a zoom, identifying campaign data and/or spatial data within the selected lasso area for a query, selection, report, or other operation. In one embodiment, the lasso feature enables selection of an area on the map in order to display information about all of the campaigns within the area in the tool results frame 1110. The lasso button 1136 enables a user to toggle the lasso feature on and off.

A print button 1138 enables a user to print the map image 1114 displayed in the map frame 1104. The print button 1138 also may enable a user to print the map image to an electronic document.

A zoom bar 1140 enables a user to zoom the map image display area in or out relative to the current map image display area. The user can select a location on the zoom bar 1140 to zoom in or out. The user also may select a zoom in button or a zoom out button to zoom in or out relative to the current map image displayed in the map frame 1104.

The tools frame 1106 includes a tools utility 1142, a documents utility 1144, a help utility 1146, and an exit utility 1148. The tools frame 1106 also includes a layers utility (not shown) to select one or more layers for display or operation and a bookmark utility (not shown) to bookmark one or more maps or geographic areas.

Figure 19:
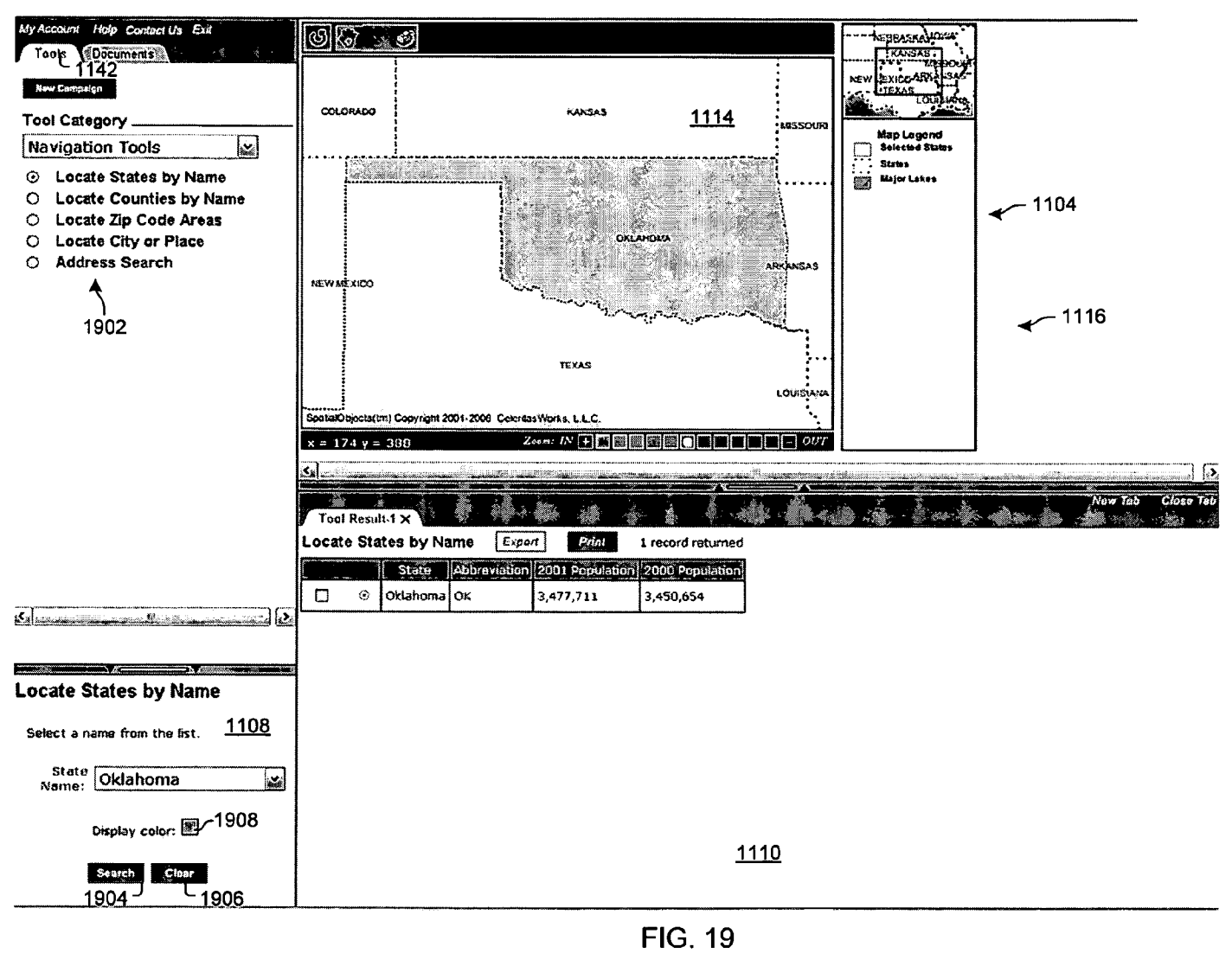

The tools utility 1142 includes one or more search tools, including one or more research tools 1150 and one or more navigation tools (see FIG. 19). In the example of FIG. 11, the research tools enable a user to locate campaigns by state, county, zip code, audience type, content type, and/or name. Other research tools or greater or fewer research tools may be included in other embodiments. Other tools or greater or fewer tools may be included in the tools utility 1142.

The documents utility 1144 enables a user to view and edit linked documents. The documents utility 1144 also enables a user to link documents to campaign events, journal entries, and other campaign data.

The help utility 1146 includes one or more help topics, such as for navigation tools, research tools, working with tabs in the tool results frame, creating a new campaign, viewing and editing campaign details, viewing documents, mapping tools, and/or other help topics. Other examples exist.

The exit utility 1148 enables the user to exit a particular screen or tab, such as a journal entry, campaign entry, or edit screen. Alternately, the exit utility 1148 enables a user to exit the application.

The tool input frame 1108 enables a user to enter search criteria for a query to identify geospatial data and/or campaign data. In this embodiment, a locate campaigns by county research tool is selected, and the associated entries for the tool input frame 1108 are displayed. In this example, a user may enter search parameters of a search criteria for a campaign type, a campaign occurring between from and to dates, a county, and/or a state. In one embodiment, a default display color is selected to identify feature data (i.e. campaign data and/or spatial data) that matches the search criteria on a resulting map image. In other embodiments, a user selects the display color used to identify feature data that matches the search criteria on a resulting map image. As used herein, search criteria includes query criteria entered by a user in one or more search entries, drop-down lists, or other entries for a research tool, a navigation tool, and/or another query tool. Search criteria also includes selecting geospatial data and/or campaign data on the map image 1114 and/or other campaign data and/or spatial data. Search criteria also includes selecting one or more items from the tool results frame 1110. In one example, once the user enters the search parameters, the user may select a "search" button (not shown). Alternately, the user may clear the search parameters by selecting a "clear" button (not shown). (See FIG. 19.) In another example, the query is initiated when the user selects campaign data and/or spatial data on the map image 1114.

The tool results frame 1110 displays feature data, including attributes, from one or more layers. The feature data can be displayed in the form of text, images, graphics, documents, journal entries, linked data, and/or other data.

A query operation generally results in the display of a map image and campaign data. The campaign data is displayed in a tool result tab 1152 of the tool results frame 1110, and the map image is displayed in the map frame 1104. Spatial data, document data, and/or journal data also may be displayed in the tool result tab 1152 or otherwise in the tool results frame 1110. One or more tool result tabs may be displayed. For example, a first search result can be displayed in a first tool result tab. A second search result for a second query can be displayed in a second tool result tab. Additional results from additional queries of searches can be displayed in other tool result tabs. Users can select the first tool result tab 1152 to go back to viewing the results from the first search, including the map image, the campaign data, and other data. Users can select the second tool result tab to return to viewing the results from the second search, including the map image, the campaign data, and other data.

In the example of FIG. 11, data matching the query is displayed in a tabular form, such as in rows, and headings are identified for columns. In this example, the event identified by the row of data with the 3864, Oklahoma Living, CoOp Magazine, and the magazine/trade publication type is an example of a feature, and ID, name, description, and type are examples of attributes.

A menu icon 1154 is displayed for each row of data. If the user selects the menu icon 1154, a features menu (see FIG. 13) is displayed. In the example of FIG. 11, each feature is displayed in a separate row, and each feature has an associated menu icon. Menu icons are optional for some data and some embodiments.

An export button 1156 is included in the tool result tab 1152, and export records checkboxes 1158 are included for each row of feature data. The user may select one or more of the export records checkboxes 1158 for one or more rows of data (i.e. features). The user then may select the export button 1156. When the export button 1156 is selected, the selected feature data displayed in the tool result tab 1152 of the tool results frame 1110 is generated to a file having a selected file type, such as a spreadsheet, a word processing file, a PDF file, an image file, or another file type. The export button 1156 and/or one or more export records check boxes 1158 are optional for some embodiments.

The tool result tab 1152 also includes a print button 1160. When the print button 1160 is selected, the feature data displayed in the tool results frame 1110 is printed, either to a printer or to an electronic file.

A new tab button 1162 enables users to make a copy of the current tab or conduct a new search. Selecting the close tab button 1164 closes the current tool result tab. A close others button (not shown) closes all tabs except the current tool result tab. A close all button (not shown) closes all tool result tabs.

A new campaign button 1166 enables users to add campaigns to the campaign management system through a set of campaign entry screens. One or more attributes may be added for one or more campaigns.

A user account utility 1168 enables the user to modify user contact information or to change user password information. When the account utility 1168 is selected, the user is prompted to modify or add entries to user contact information, journal information, password information, or other user information. The account utility 1168 is optional.

Figure 12:
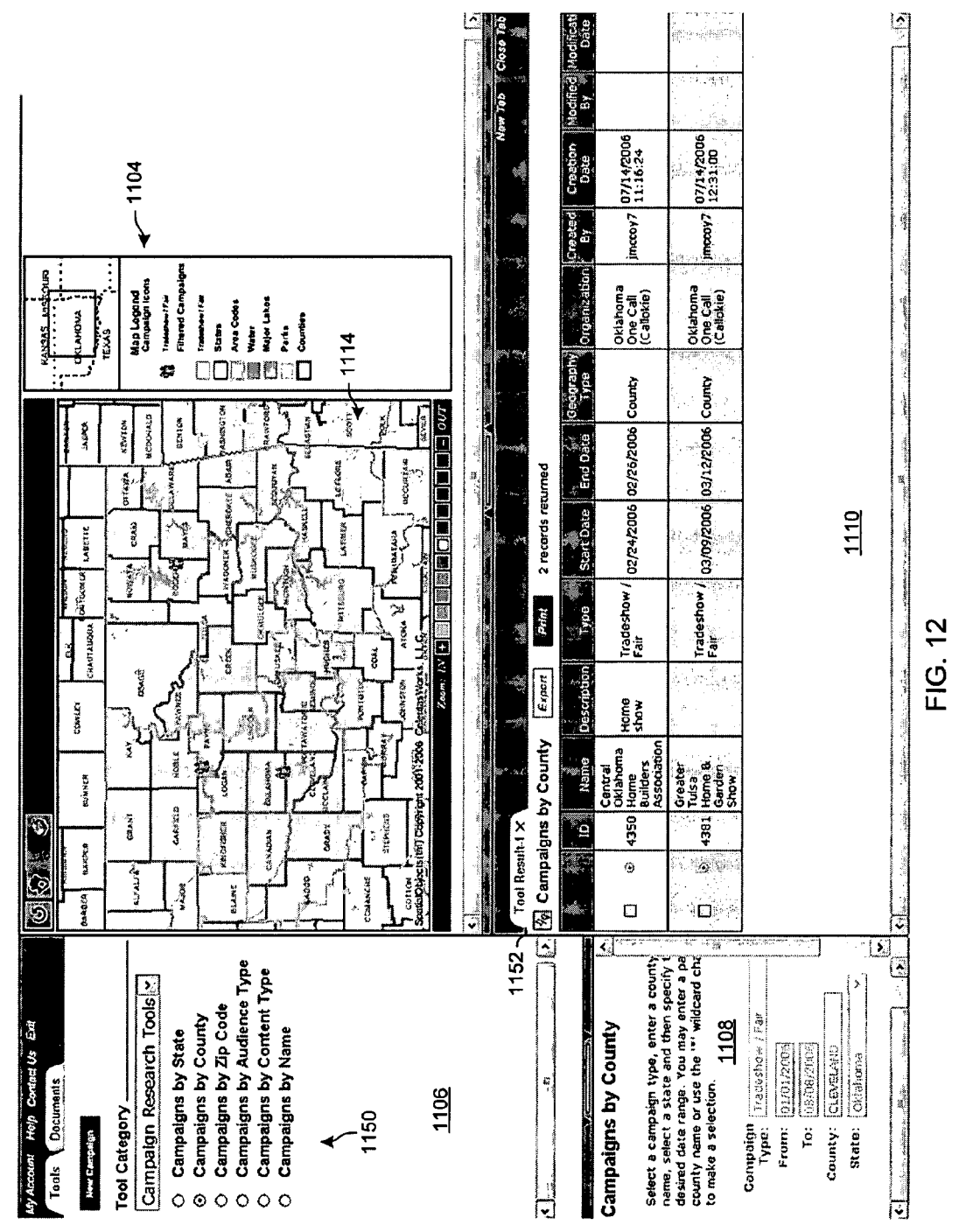

FIG. 12 depicts an exemplary embodiment of a user screen in which the map image 1114 is zoomed. The research tool 1150 in the tools frame 1106 is used to identify campaigns by county. The campaign type in the tool input frame 1108 indicates that a campaign is to be made for events having a search is to be made for events having a campaign type of tradeshow/fair. The map image 1114 in the map frame 1104 depicts the search results and identifies data matching the selected campaign type and county. The tool result tab 1152 in the tool results frame 1110 identifies the campaign data (feature data) that matches the search criteria for the campaign type and county. In this example, the search results returned two campaign events matching the campaign type of tradeshow/fair in the geography of Cleveland County. In these examples, the terms search and query are used interchangeably.

Figure 13:
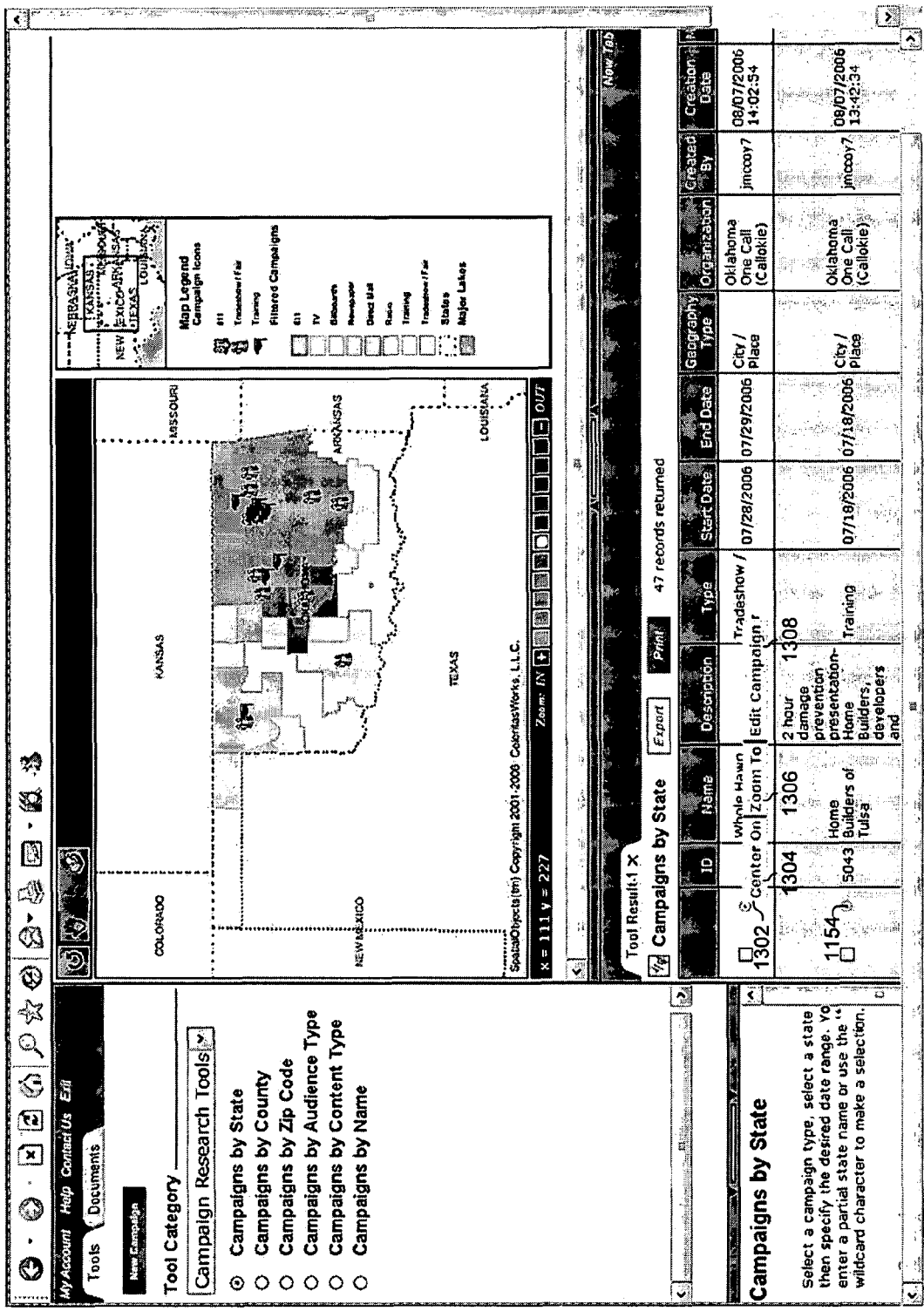

FIG. 13 depicts an exemplary embodiment of a features menu 1302 generated for display when a user selects the menu icon 1154, such as by placing a cursor or other pointer over the menu icon and/or selecting the entry. The features menu 1302 enables a user to perform selected functions on the feature data.

In the embodiment of FIG. 13, the features menu 1302 includes a center on option 1304, a zoom to option 1306, and an edit campaign option 1308. With the center on option 1304, the user can center on an event in the map. With the zoom to option 1306, the user can zoom the map into a close area around an event displayed on the map or on other feature data. With the edit campaign option 1308, the user can edit campaign data in the selected feature row.

Figure 14:
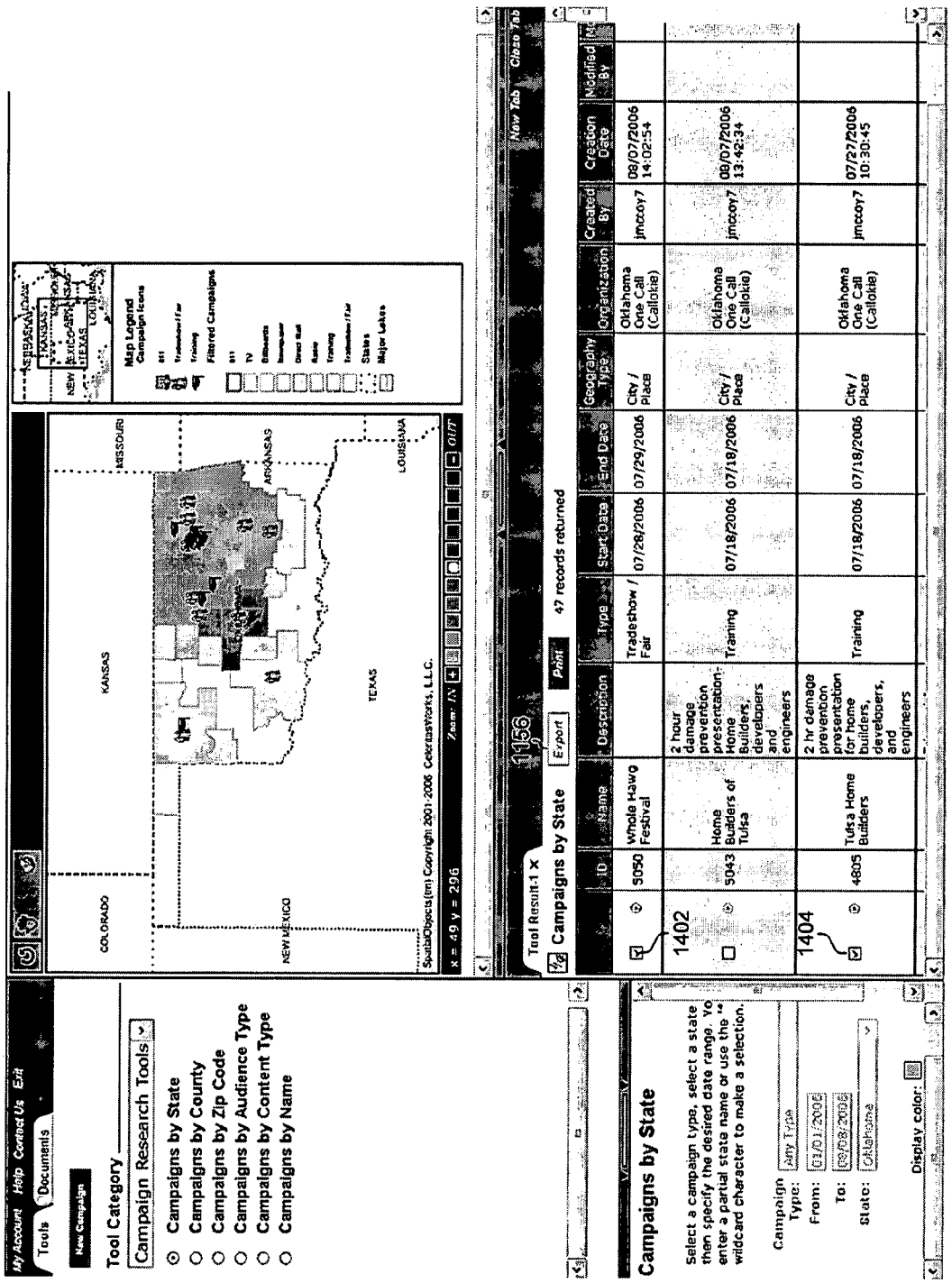
Figure 15:
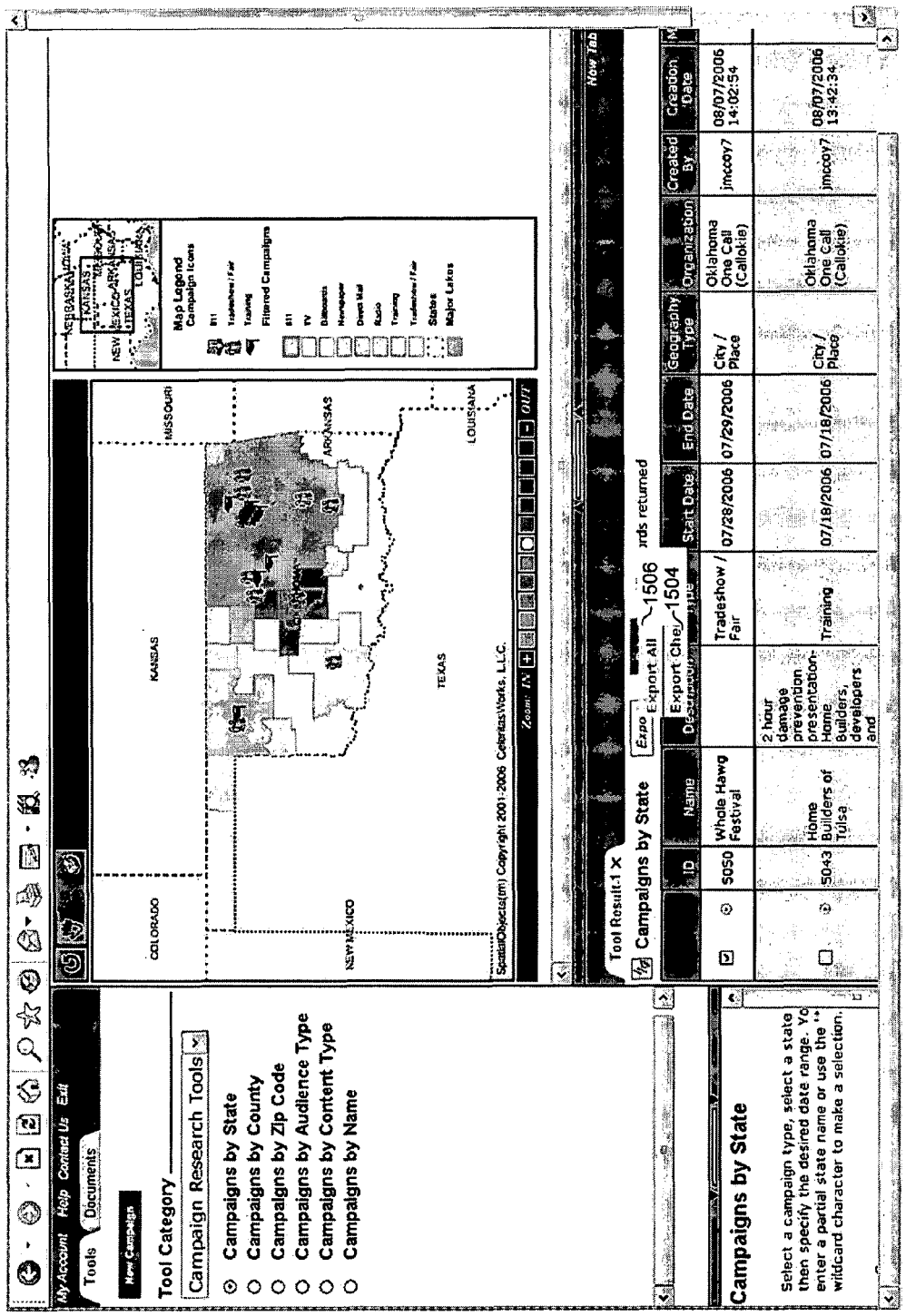

FIGS. 14 and 15 depict an exemplary embodiment of user screens in which records are selected for export. In the example of FIG. 14, two export records check boxes 1402 and 1404 are checked. The user then selects the export button 1156.

As depicted in the example of FIG. 15, when the export button 1156 is selected, an export all button 1502 and an export checked button 1504 are displayed. In the example of FIG. 15, the export checked button 1504 is selected.

Figure 16:
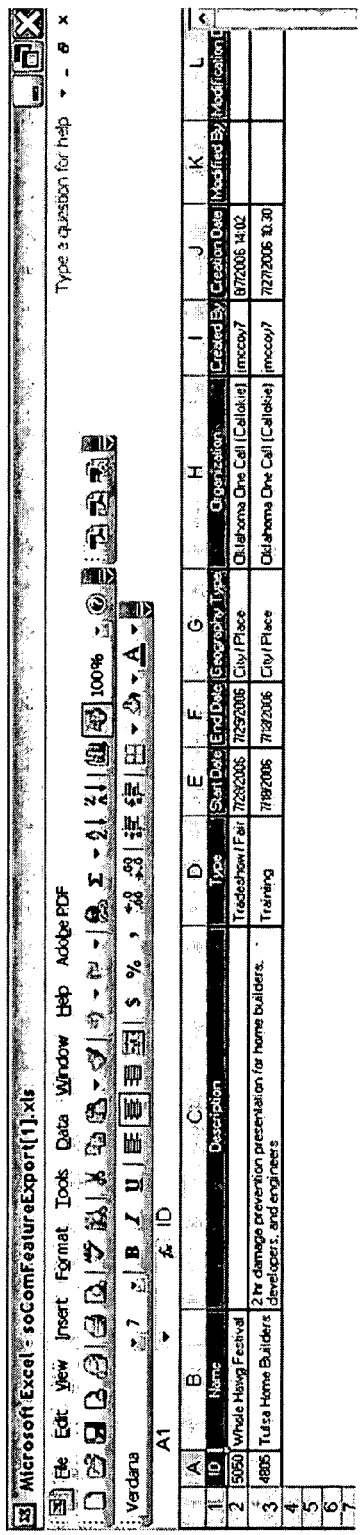

FIG. 16 depicts an exemplary embodiment of records exported to an electronic file. In the example of FIG. 16, the two records selected in FIGS. 14 and 15 for export are exported to a spreadsheet. In other examples, campaign data and other data, including text, graphics, images, and other data, and including geospatial data and campaign data, are exported to one or more file types, including a spreadsheet, a word processing file, a PDF file, an image file, and/or other file types.

Figure 17:
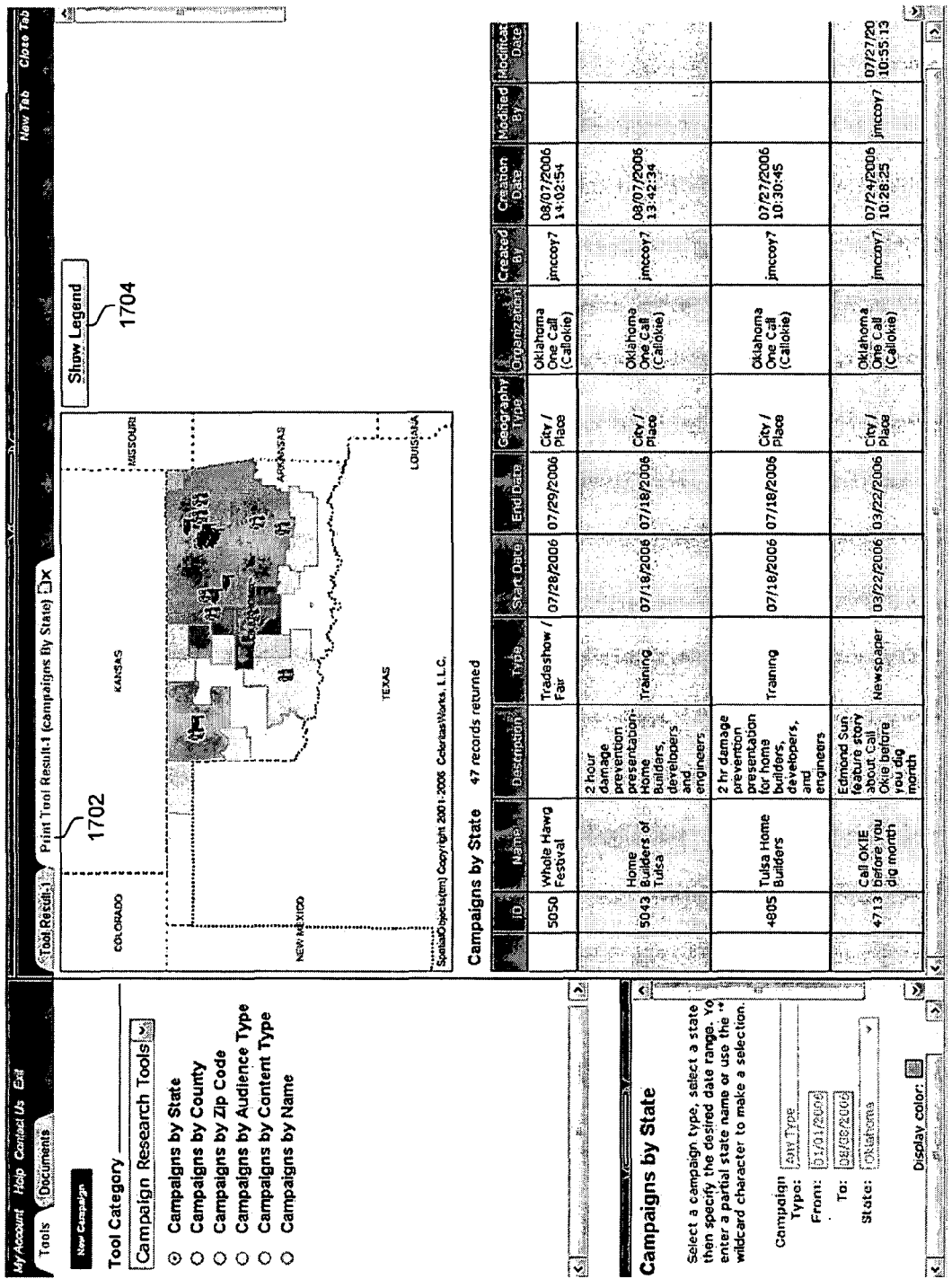

FIG. 17 depicts an exemplary embodiment of a print function. The print function enables a user to print the map image and the data displayed as a result of a search operation. The print function is used by selecting the print button 1138 or the print button 1160 (See FIG. 11). In the example of FIG. 17, the map and data to be printed are displayed in a print tool result tab 1702. The user may print the legend with the map if desired by selecting the print legend button 1704. The user may also choose to print the map without the legend. The user may opt to print the map and campaign data to a printer or other device or to an electronic file.

Figure 18:
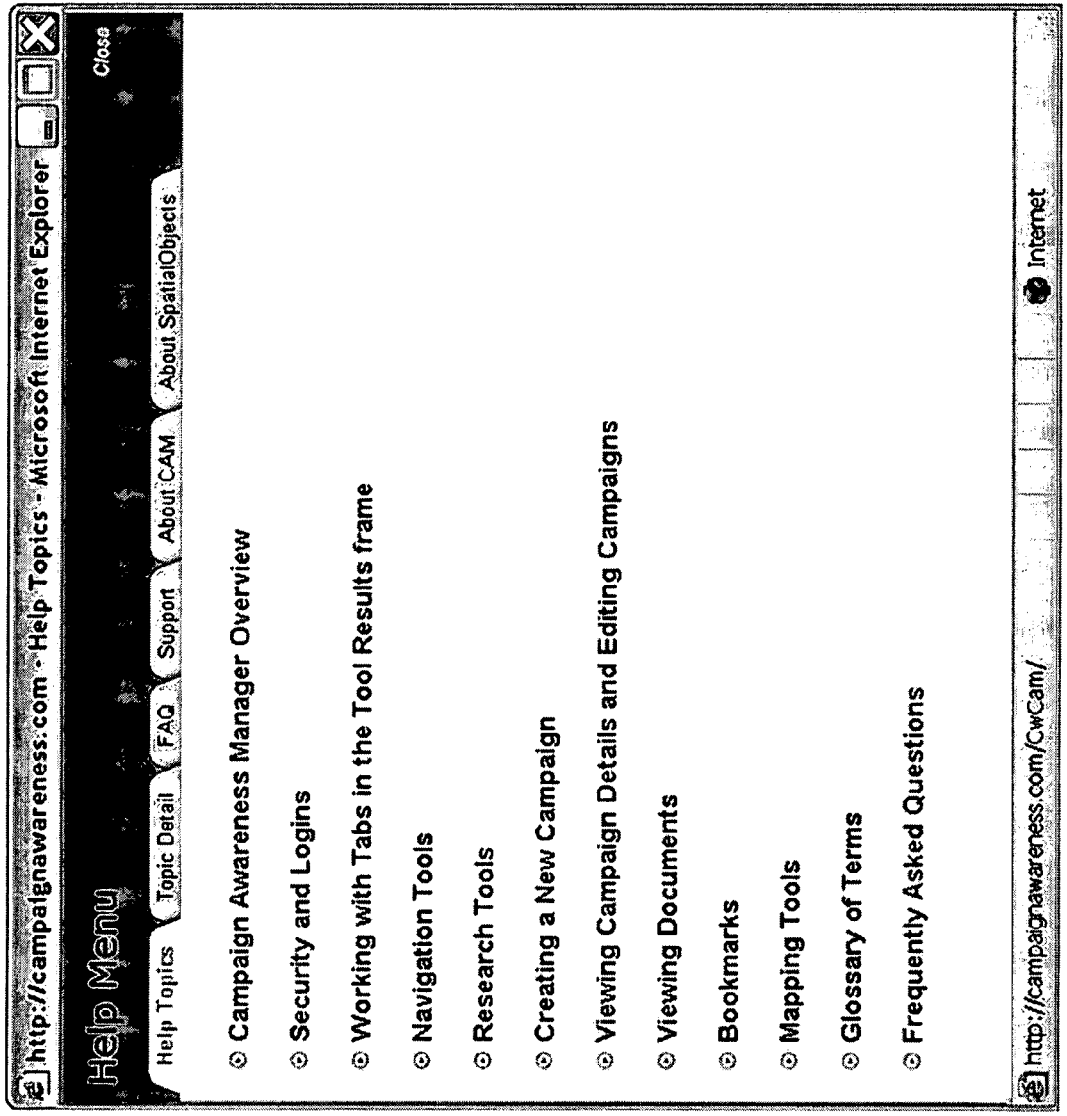

FIG. 18 depicts an exemplary embodiment of an online help menu. The help menu includes one or more help topics, such as for navigation tools, research tools, working with tabs in the tool results frame, creating a new campaign, viewing and editing campaign details, viewing documents, mapping tools, and/or other help topics. Other examples exist.

FIG. 19 depicts an exemplary embodiment of navigation tools 1902 in the tools utility 1142. In the example of FIG. 19, the navigation tools 1902 include a locate states by name, locate counties by name, locate zip code areas, locate city or place, and an address search. Other examples exist.

As shown in the tool input frame 1108, the search input selections and entries may change based upon the selected navigation tool. The locate states by name search enables a user to locate one or more desired campaign records within the selected state. In the example of FIG. 19, a user selects the locate states by name navigation tool, enters the search criteria in the tool input frame 1108, and selects the search button 1904. The user also may select the clear button 1906 to clear any selections or entries made in the tool input frame 1108. In some instances, the user may select a different display color 1908 for the geospatial data and campaign data identified in the map image 1114 that matches the search criteria.

After the user selects the search button 1904, the campaign management system geocodes the search criteria and locates the geocoded search criteria. In this example, the campaign management system geocodes the state name and locates the state matching the state name. If the geocoded search criteria is located, the geospatial data and the campaign data matching the search criteria are generated for display as a map in the map frame 1104. The map legend 1116 indicates the layers of geospatial data and/or campaign data that are selected for display in the map image 1114. The map legend 1116 identifies selected states, the outlining of other states, and major lakes.

The tool results frame 1110 identifies data corresponding to the search criteria. In this example, information for the State of Oklahoma is generated to the tool results frame 1110.

Figure 20:
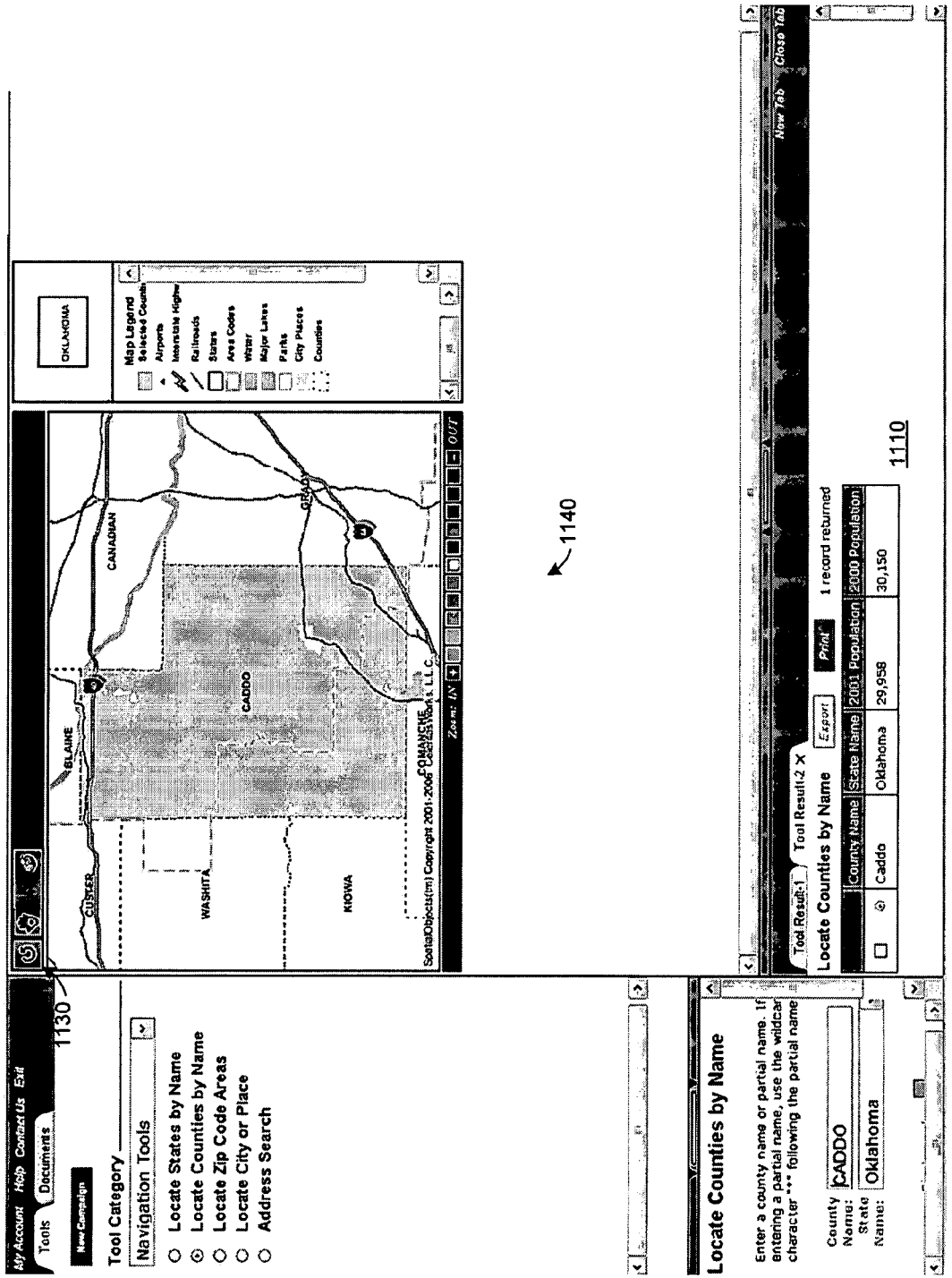

FIG. 20 depicts an exemplary embodiment of a user screen in which a locate counties by name navigation tool is used. The locate counties by name navigation tool enables a user to locate one or more campaign records for a county and identify geospatial data and campaign data in the map image for the selected county. In the example of FIG. 20, a user selects the locate counties by name navigation tool, enters the search criteria in the tool input frame 1108, and selects the search button.

After the user selects the search button, the campaign management system geocodes the search criteria and locates the geocoded search criteria. If the search criteria is located, the geospatial data and/or the campaign data matching the search criteria are generated for display as a map or other image in the map frame 1104. The matching data includes data from the disparate campaign datasets that were spatially linked to the spatial layers, and the geospatial data includes data within the selected geography entered as the search criteria.

In this example, a county and state were entered as the search criteria. The located county is identified in the map in the selected display color, and the located county is centered in the map. The geospatial data may be manipulated using the map tool bar 1130 or the zoom bar 1140. The campaign data corresponding to the search criteria is displayed in a tool result tab of the tool results frame 1110. If the geocoded search criteria is not located, an error message is displayed, and a new search criteria may be entered.

Figure 21:
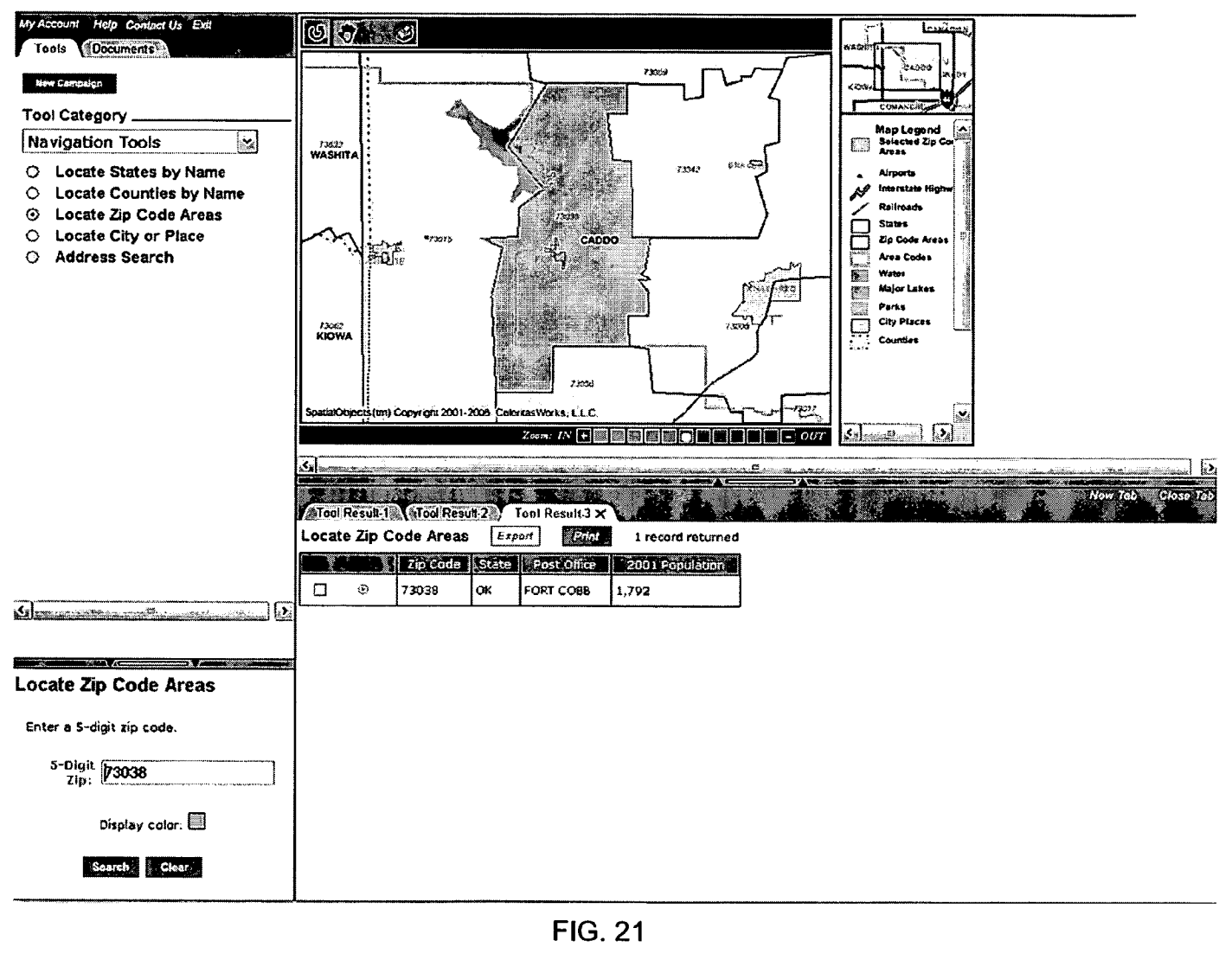

FIG. 21 depicts an exemplary embodiment of a user screen in which a locate zip code areas navigation tool is used. The zip code area navigation tool enables a user to locate one or more campaign data records or other data for the selected zip code. In this example, a user selects the locate zip code areas navigation tool in the tools frame 1106 and enters the zip code in the tool input frame 1108. The display color used to identify matching feature data on the map image also may be selected in the tool input frame 1108. The user enters the search criteria and selects the search button to initiate the search.

After the user selects the search button, the campaign management system determines the search criteria and locates the campaign data and/or spatial data corresponding to the search criteria. In some instances a spatial search, data search, and/or geocoding and geocode search is performed. If the search criteria is located, the geospatial data and/or the campaign data matching the search criteria are generated for display as a map or other image in the map frame 1104. Where campaign datasets are spatially linked to spatial layers, the matching data may include data from the disparate campaign datasets that were spatially linked to the spatial layers, and the geospatial data includes data within the selected geography entered as the search criteria. The campaign data corresponding to the search criteria is displayed in a tool result tab of the tool results frame 1110. If the search criteria is not located, an error message is displayed, and a new search criteria may be entered.

Figure 22:
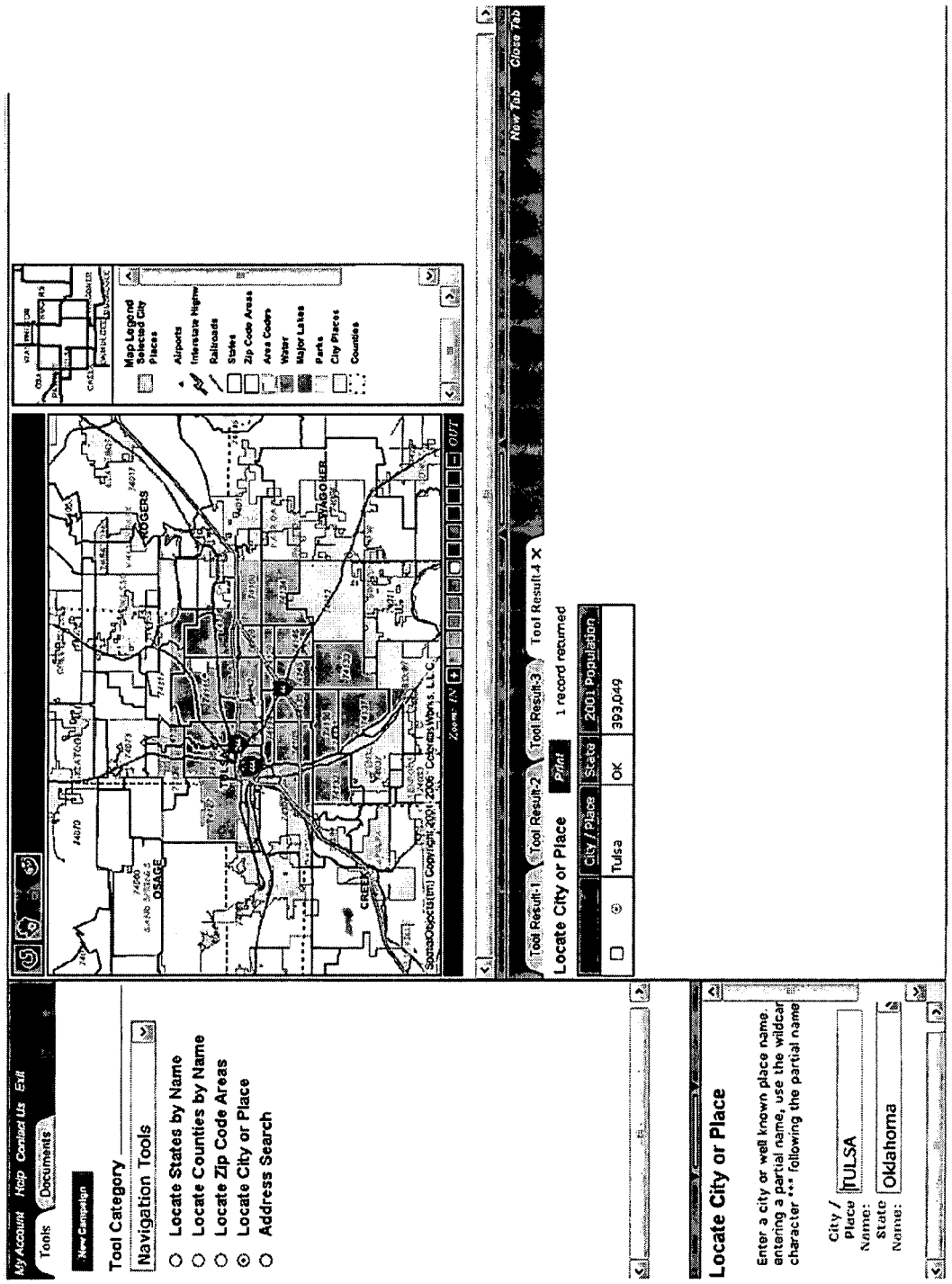

FIG. 22 depicts an exemplary embodiment of a navigation tool for locating a city or place. The user selects the locate city or place navigation tool in the tools frame 1106 and enters a city or place in the tool input frame 1108. The display color used to identify matching feature data on the map also may be selected in the tool input frame 1108. The user enters the search criteria and selects the search button to initiate the search.

After the user selects the search button, the campaign management system generates a search using the search criteria. In some instances a spatial search, data search, and/or geocoding and geocode search is performed. If the search criteria is located, the geospatial data and/or the campaign data matching the search criteria are generated for display as a map or other image in the map frame 1104. Where campaign datasets are spatially linked to spatial layers, the matching data may include data from the disparate campaign datasets that were spatially linked to the spatial layers, and the geospatial data includes data within the selected geography entered as the search criteria. The campaign data corresponding to the search criteria is displayed in a tool result tab of the tool results frame 1110. If the search criteria is not located, an error message is displayed, and a new search criteria may be entered.

Figure 23:
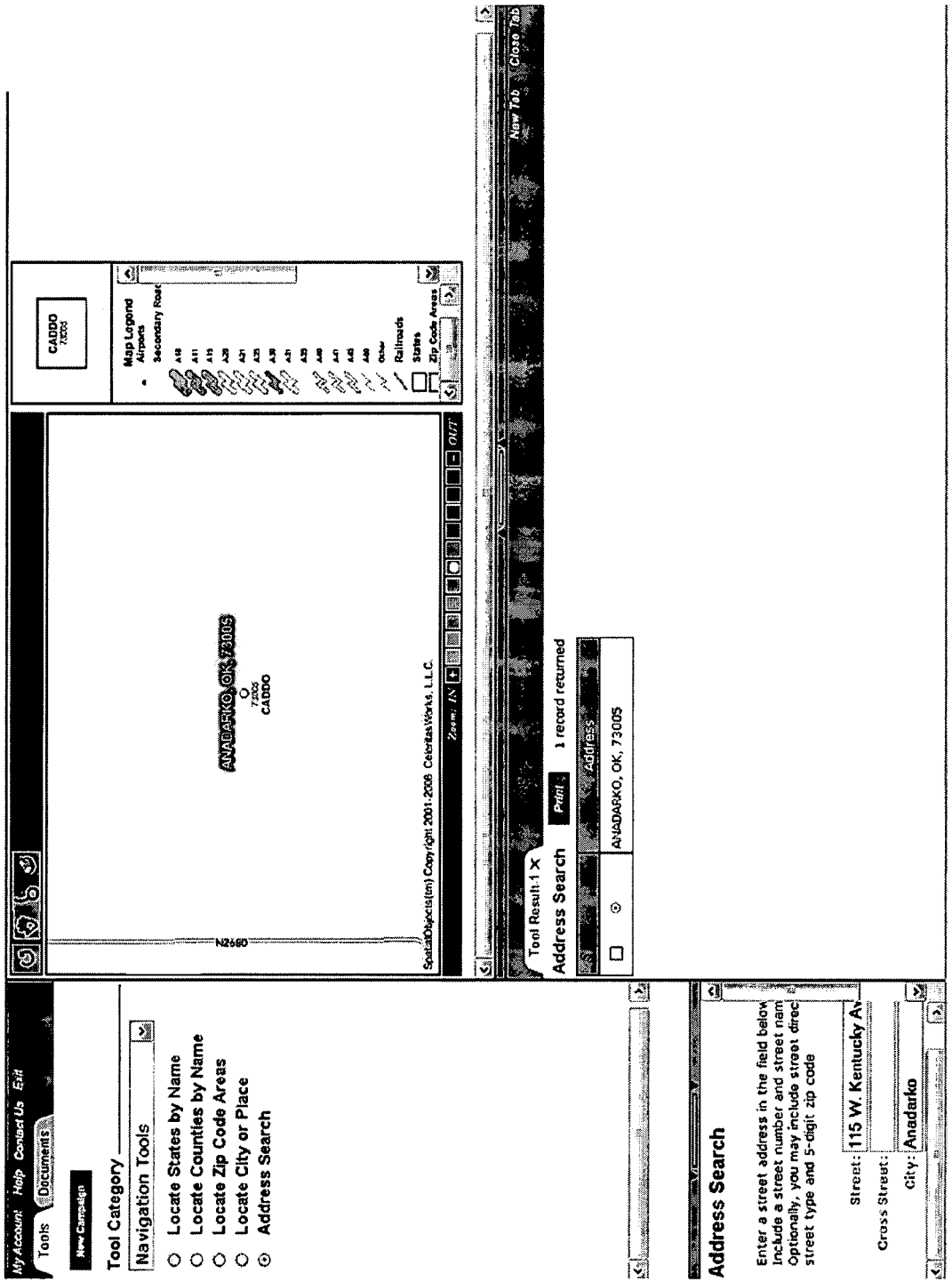

FIG. 23 depicts an exemplary embodiment of a navigation tool for an address search. The user selects the address search navigation tool from the tools frame 1106 and enters an address in the tool input frame 1108. The display color used to identify matching feature data on the map also may be selected in the tool input frame 1108. The user enters the search criteria and selects the search button to initiate the search.

After the user selects the search button, the campaign management system determines the search criteria and locates the campaign data and/or spatial data corresponding to the search criteria. In some instances a spatial search, data search, and/or geocoding and geocode search is performed. If the search criteria is located, the geospatial data and/or the campaign data matching the search criteria are generated for display as a map or other image in the map frame 1104. Where campaign datasets are spatially linked to spatial layers, the matching data may include data from the disparate campaign datasets that were spatially linked to the spatial layers, and the geospatial data includes data within the selected geography entered as the search criteria. The campaign data corresponding to the search criteria is displayed in a tool result tab of the tool results frame 1110. If the search criteria is not located, an error message is displayed, and a new search criteria may be entered.

Figure 24:
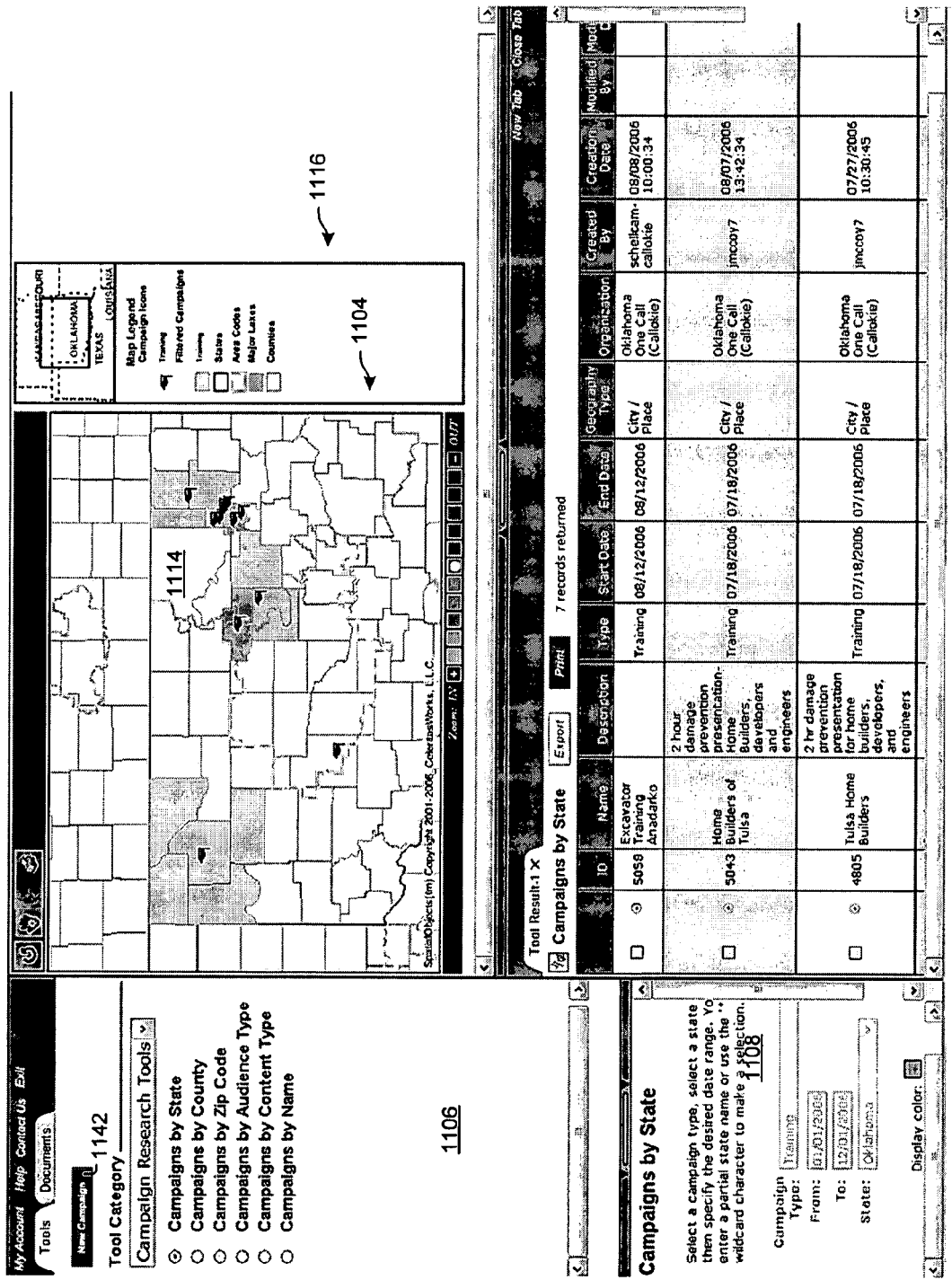

FIG. 24 depicts an exemplary embodiment of a campaign research tool for identifying campaigns by state. The user selects the campaigns by state research tool from the tools frame 1106. In the tool input frame 1108, the user selects a campaign type from the campaign type drop-down list, enters or selects a from date and a to date, and selects a state from the drop-down list or otherwise enters the state name. The user selects the "apply filter" button (not shown). The apply filter button causes the geographic management system to initiate the query using the search criteria identified in the tool input frame 1108.

After the user selects the search button or apply filter button, the campaign management system determines the search criteria and locates the campaign data and/or spatial data corresponding to the search criteria. If the search criteria is located, the geospatial data and/or the campaign data matching the search criteria are generated for display as a map or other image in the map frame 1104. Where campaign datasets are spatially linked to spatial layers, the matching data may include data from the disparate campaign datasets that were spatially linked to the spatial layers, and the geospatial data includes data within the selected geography entered as the search criteria. The campaign data corresponding to the search criteria is displayed in a tool result tab of the tool results frame 1110. If the search criteria is not located, an error message is displayed, and a new search criteria may be entered.

In the example of FIG. 24, the map legend 1116 includes spatial layers showing states, area codes, major lakes, and counties. The map legend 1116 also includes campaign symbology, including a campaign icon or symbol for training events and color code symbology depicting training.

The map image 1114 in the map frame 1104 identifies cities or places with training events during the selected timeframe. The map image 1114 also identifies geographic areas having training events during the selected timeframe by color coding the areas. Specific events capable of being identified by a location are identified on the map image 1114 by the campaign icons or symbols for training.

Campaign data matching the search criteria in the tool input frame 1108 is displayed in the tool result tab 1152 of the tool results frame 1110. In the example of FIG. 24, campaign events having a training campaign type that occurred in Oklahoma during the year 2006 are generated as feature data. Other examples exist.

Figure 25:
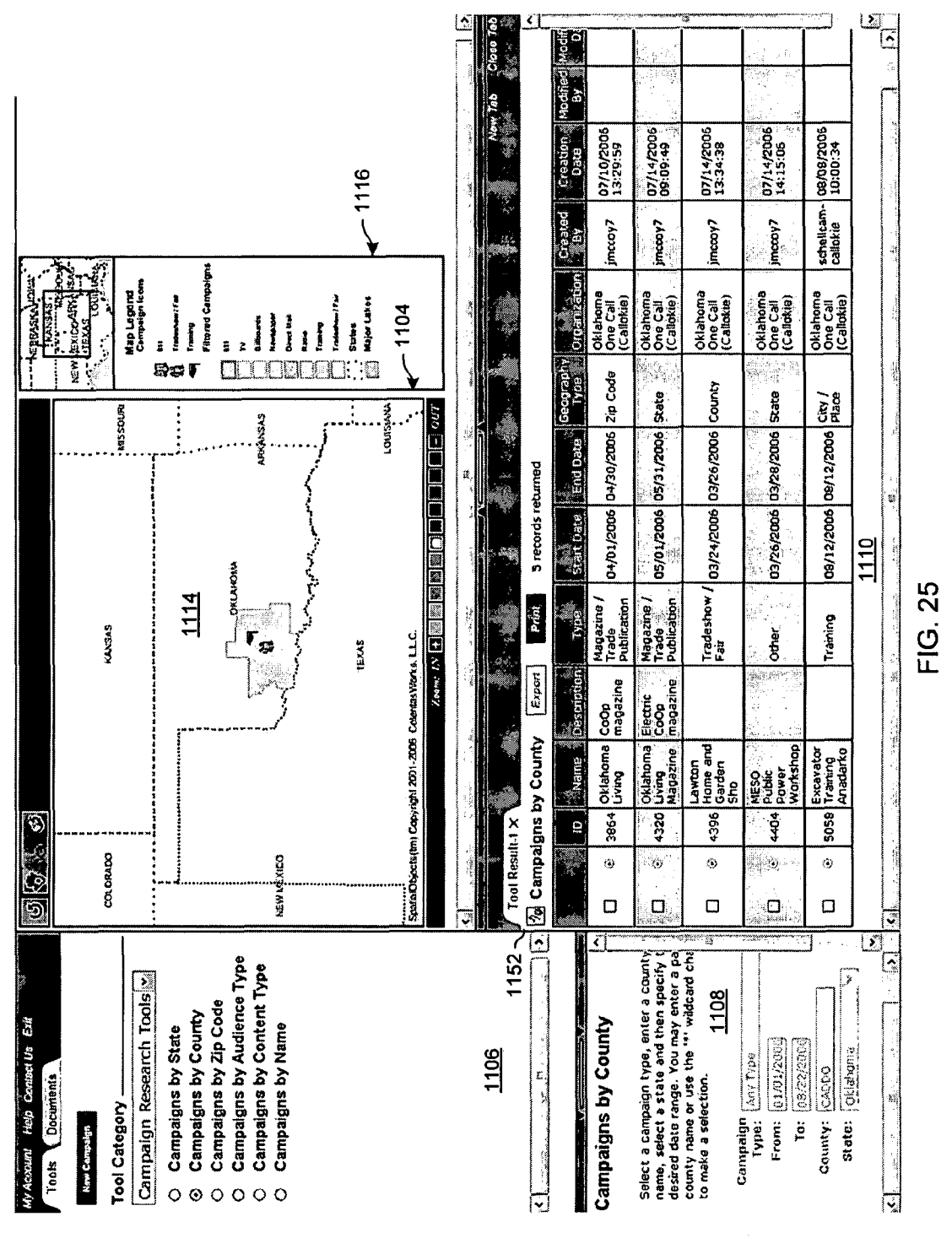

FIG. 25 depicts an exemplary embodiment of a research tool for identifying campaigns by county. The user selects the campaigns by county research tool from the tools frame 1106. The user selects a campaign type from the campaign type drop-down list, enters or selects a from date and a to date, enters a county name or a partial name using a wild card character, and selects a state from the state drop-down list or otherwise enters the state name. The display color used to identify matching feature data on the map also may be selected in the tool input frame 1108. The user selects the "apply filter" button (not shown) to initiate the query.

After the user selects the "apply filter" button, the campaign management system determines the search criteria and locates the campaign data and/or spatial data corresponding to the search criteria. In some instances a spatial search, data search, and/or geocoding and geocode search is performed. If the search criteria is located, the campaign management system retrieves campaign data corresponding to the search criteria, and the geospatial data and/or the campaign data matching the search criteria are generated for display as a map or other image in the map frame 1104. Where campaign datasets are spatially linked to spatial layers, the matching data may include data from the disparate campaign datasets that were spatially linked to the spatial layers, and the geospatial data includes data within the selected geography entered as the search criteria. The campaign feature data corresponding to the search criteria is displayed in a tool result tab of the tool results frame 1110. If the search criteria is not located, an error message is displayed, and a new search criteria may be entered.

In the example of FIG. 25, the map legend 1116 identifies spatial layers, including states and major lakes. The map legend also identifies multiple campaign symbols. Campaign icons or symbols include 811, tradeshow/fair, and training. Other campaign symbology includes color code symbology for campaign types covering geographic areas, including 811, TV, billboards, newspaper, direct mail, radio, training, and tradeshow/fair. In one example, the campaign icons or symbols are indicated for campaign events capable of being designated by a location, such as an address, coordinates, the center or a point in a geographic area, or other location identifiers. The color code symbology, which could include shading, patterns, highlighting, color codes, or other symbology, is used to designate campaign events occurring in, over, or through a geographic area. In the example of FIG. 25, the map image 1114 includes campaign icons or symbols identifying tradeshow/fair and training events capable of being identified by a location. The map image 1114 also includes color code campaign symbology identifying campaign events directed toward the geographic area for a county. Other examples exist.

The campaign data that matches the search criteria identified in the tool input frame 1108 is generated for display in the tool results frame 1110. Campaign records and data matching the campaign type of "any" in Caddo, Okla. during the identified time frame are displayed in the tool result tab 1152 of the tool results frame 1110.

Figure 26:
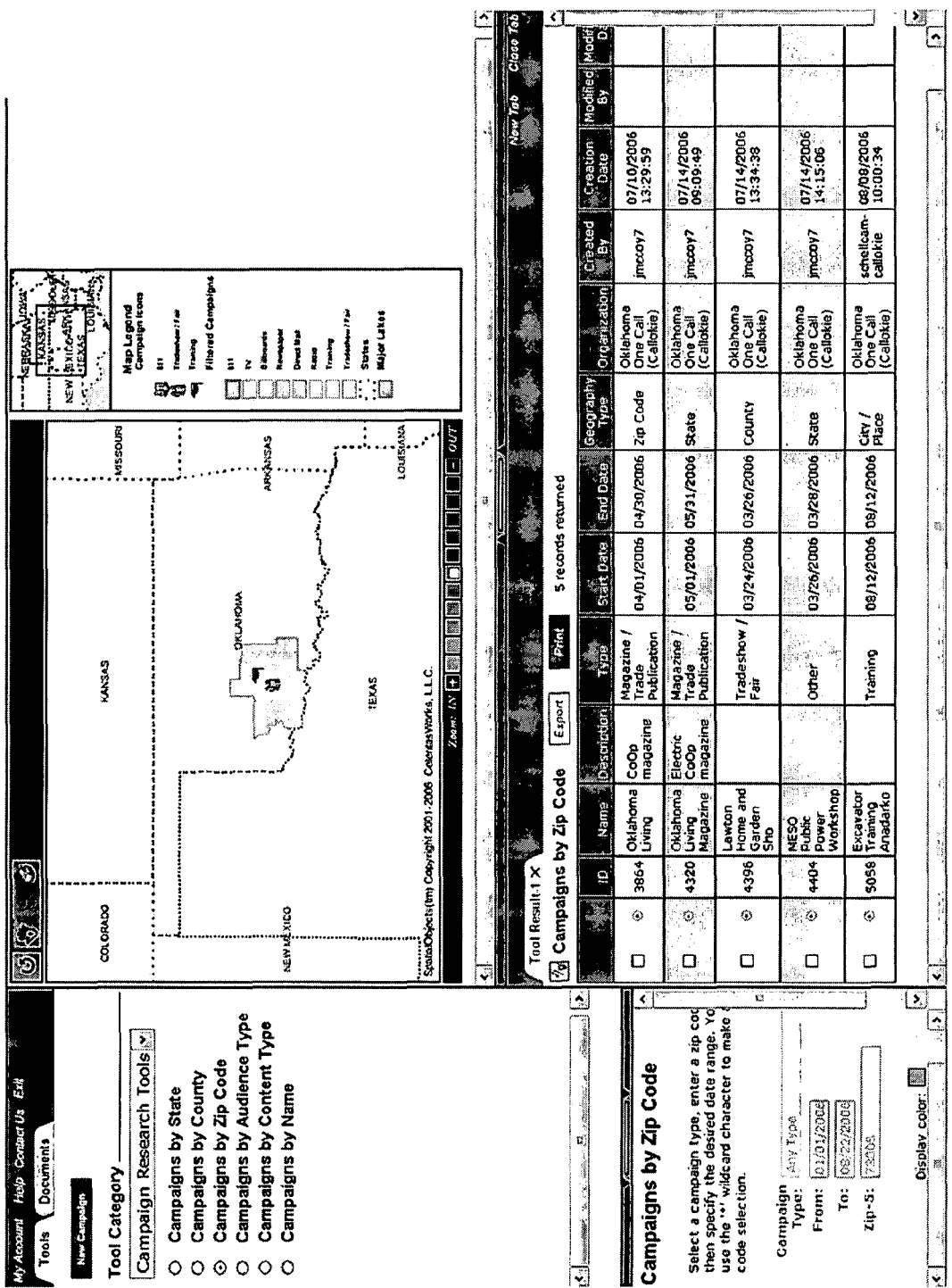

FIG. 26 depicts an exemplary embodiment of a campaign research tool for identifying campaigns by zip code. The user selects the research tool for campaigns by zip code, selects a campaign type from the campaign type drop-down list, enters or selects a from date and a to date, and enters a zip code. The display color used to identify matching feature data on the map also may be selected. The user selects the "apply filter" button to initiate the query.

After the user selects the "apply filter" button, the campaign management system determines the search criteria and locates the campaign data and/or spatial data corresponding to the search criteria. In some instances a spatial search, data search, and/or geocoding and geocode search is performed. If the search criteria is located, the campaign management system retrieves campaign data corresponding to the search criteria, and the geospatial data and/or the campaign data matching the search criteria are generated for display as a map or other image in the map frame 1104. Where campaign datasets are spatially linked to spatial layers, the matching data may include data from the disparate campaign datasets that were spatially linked to the spatial layers, and the geospatial data includes data within the selected geography entered as the search criteria. The campaign data corresponding to the search criteria is displayed in a tool result tab of the tool results frame 1110. If the search criteria is not located, an error message is displayed, and a new search criteria may be entered.

Figure 27:
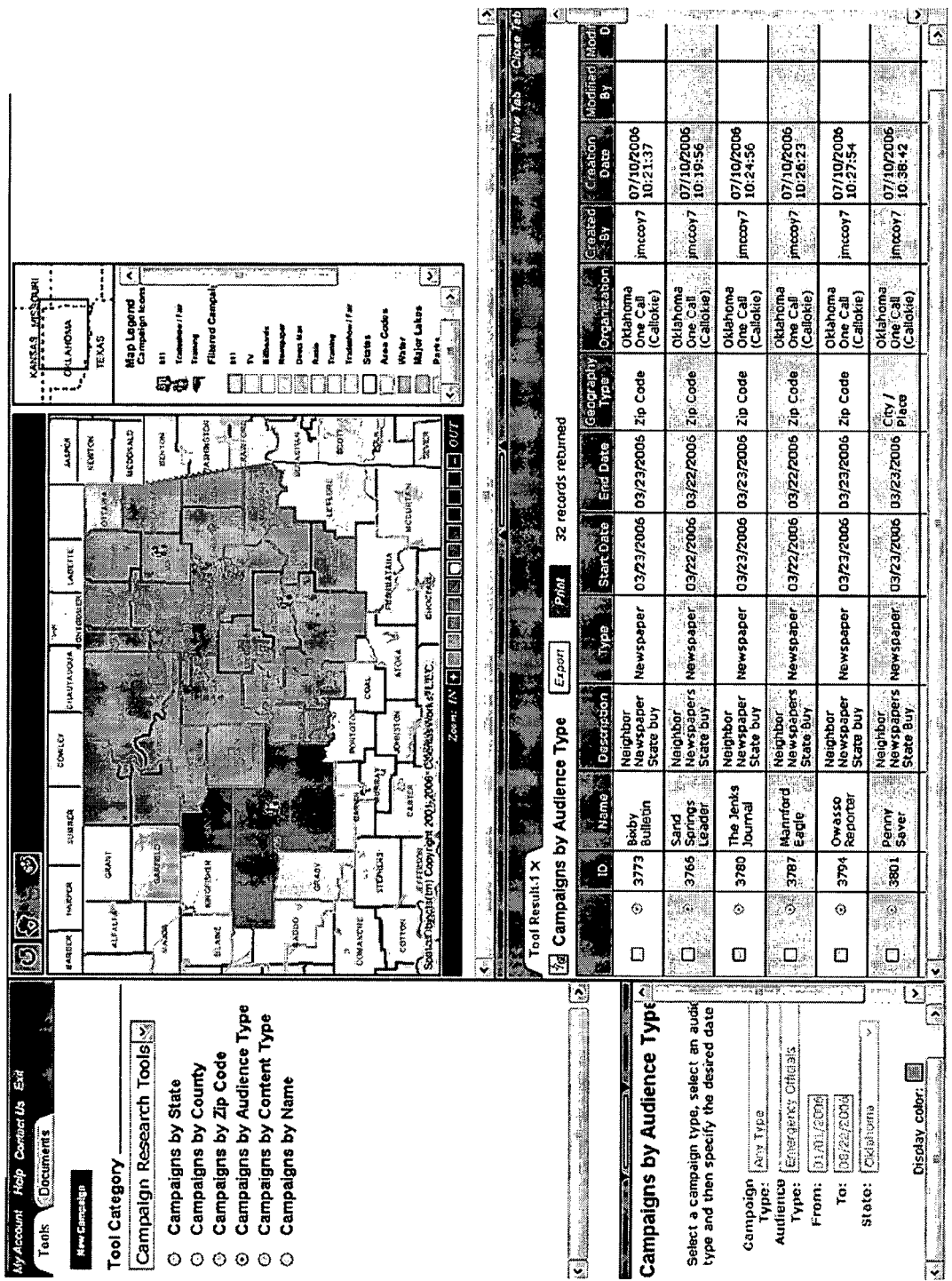

FIG. 27 depicts an exemplary embodiment of a research tool for identifying campaigns by audience type. The user selects the campaigns by audience type research tool. The user selects a campaign type from the campaign type drop-down list, selects an audience type from the audience type drop-down list, enters or selects a from date and a to date, and selects a state from the state drop-down list. The display color used to identify matching feature data on the map also may be selected. The user selects the "apply filter" button to initiate the query.

After the user selects the "apply filter" button, the campaign management system determines the search criteria and locates the campaign data and/or spatial data corresponding to the search criteria. In some instances a spatial search, data search, and/or geocoding and geocode search is performed. If the search criteria is located, the campaign management system retrieves campaign data corresponding to the search criteria, and the geospatial data and/or the campaign data matching the search criteria are generated for display as a map or other image in the map frame 1104. Where campaign datasets are spatially linked to spatial layers, the matching data may include data from the disparate campaign datasets that were spatially linked to the spatial layers, and the geospatial data includes data within the selected geography entered as the search criteria. The campaign data corresponding to the search criteria is displayed in a tool result tab of the tool results frame 1110. If the search criteria is not located, an error message is displayed, and a new search criteria may be entered.

Figure 28:
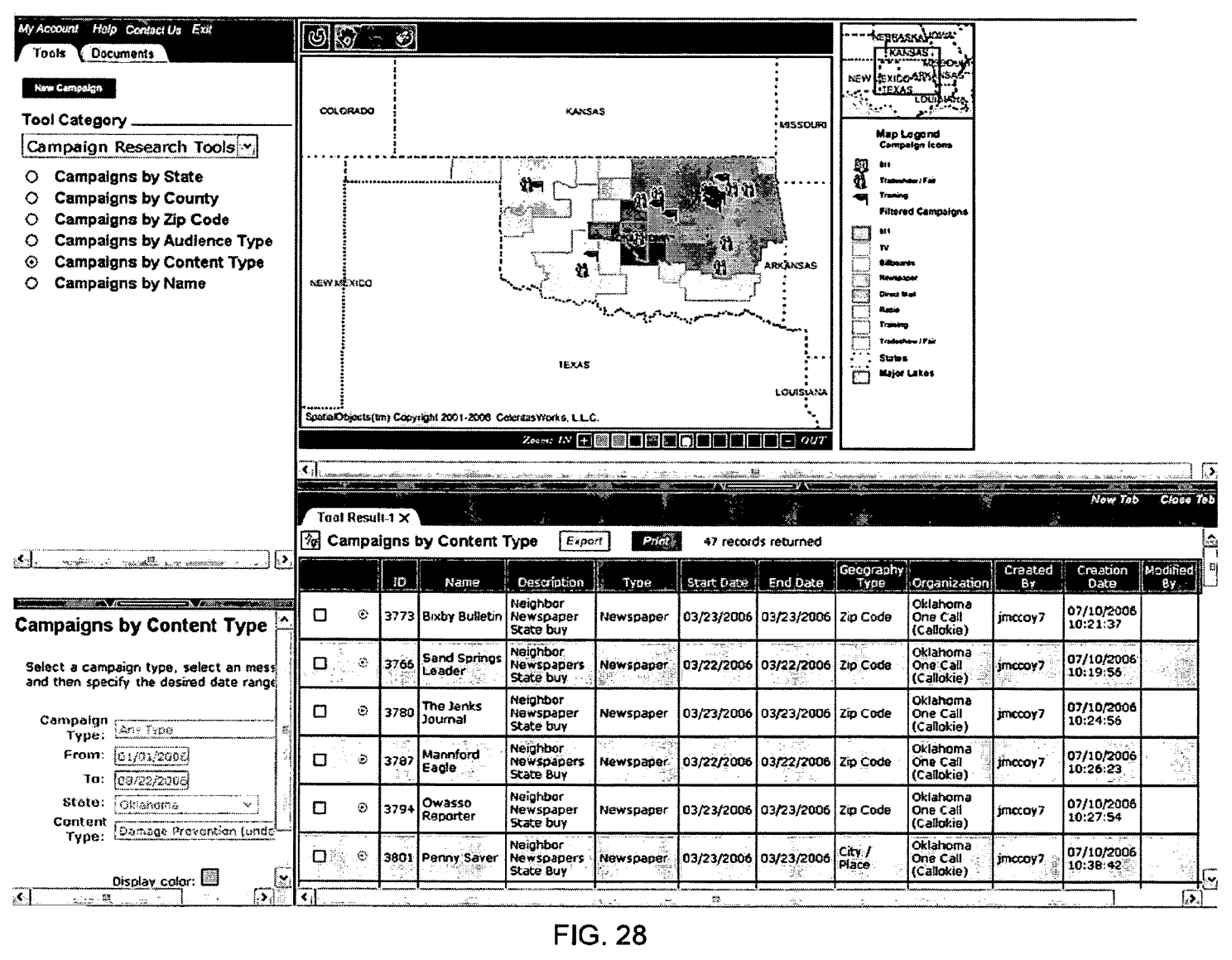

FIG. 28 depicts an exemplary embodiment of a research tool used to identify campaigns by content type. The user selects the campaigns by content type research tool, selects a campaign type from the campaign type drop-down list, enters a from date and a to date, and selects a state drop-down list. The user also selects a content type from the content type drop-down list. The display color used to identify matching feature data on the map also may be selected. The user selects the "apply filter" button to initiate the query.

After the user selects the "apply filter" button, the campaign management system determines the search criteria and locates the campaign data and/or spatial data corresponding to the search criteria. In some instances a spatial search, data search, and/or geocoding and geocode search is performed. If the search criteria is located, the campaign management system retrieves campaign data corresponding to the search criteria, and the geospatial data and/or the campaign data matching the search criteria are generated for display as a map or other image in the map frame 1104. Where campaign datasets are spatially linked to spatial layers, the matching data may include data from the disparate campaign datasets that were spatially linked to the spatial layers, and the geospatial data includes data within the selected geography entered as the search criteria. The campaign data corresponding to the search criteria is displayed in a tool result tab of the tool results frame 1110. If the search criteria is not located, an error message is displayed, and a new search criteria may be entered.

Figure 29:
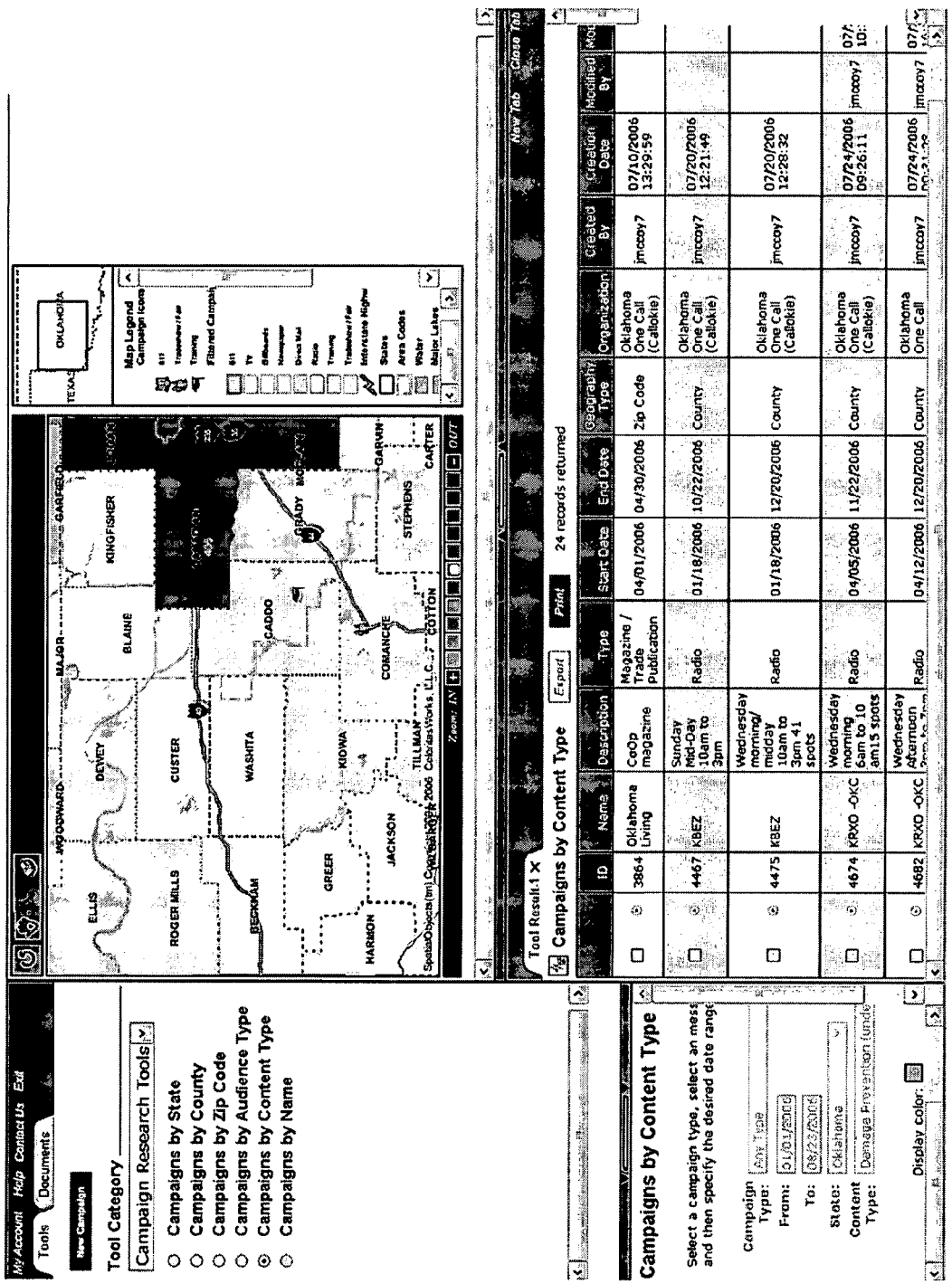

FIG. 29 depicts an exemplary embodiment of a zoom level for a campaigns by content type search. In the example of FIG. 29, the user zoomed into an area identified in the map image 1114. The feature data identified in the tool results frame 1110 corresponds to the area identified in the map image 1114. Thus, the campaign feature data generated to the tool result frame 1110 corresponds to the additional search query of the zoomed-geographic area identified in the map image 1114. In this example, the search criteria includes the inputs provided in the tool input frame 1108 and the area specified in the map frame 1104. The search criteria results in the campaign data that is generated to the tool results frame 1110. In another example, the search criteria includes only the input provided by zooming in or out of the map image 1114 or selecting the map image, such as with a mouse, pointer, or other input, including selecting an area with the lasso or rubber-band zoom. This input results in campaign data generated to the tool results frame 1110. This input also may result in another map or image displayed as the map image 1114. This function exists for other or all operations of the user interface in some embodiments.

Figure 30:
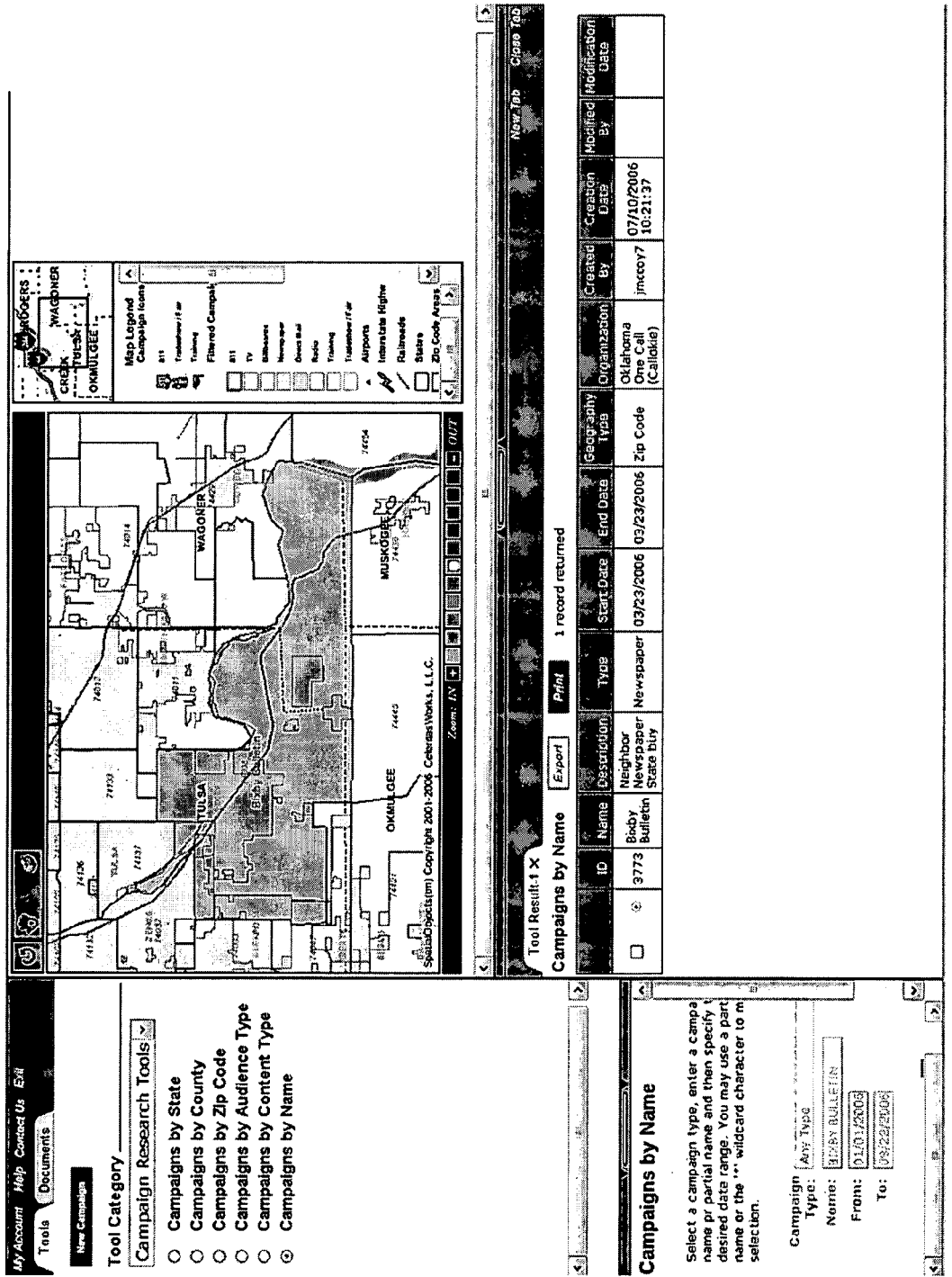

FIG. 30 depicts an exemplary embodiment of a research tool used to identify campaigns by name. A user selects the campaigns by name research tool, selects a campaign type from the campaign type drop-down list, enters a name or partial name, such as by using a wild card character, and selects or enters a from date and a to date. The display color used to identify matching feature data on the map also may be selected. The user selects the "apply filter" button to initiate the query.

After the user selects the "apply filter" button, the campaign management system determines the search criteria and locates the campaign data and/or spatial data corresponding to the search criteria. In some instances a spatial search, data search, and/or geocoding and geocode search is performed. If the search criteria is located, the campaign management system retrieves campaign data corresponding to the search criteria, and the geospatial data and/or the campaign data matching the search criteria are generated for display as a map or other image in the map frame 1104. Where campaign datasets are spatially linked to spatial layers, the matching data may include data from the disparate campaign datasets that were spatially linked to the spatial layers, and the geospatial data includes data within the selected geography entered as the search criteria. The campaign data corresponding to the search criteria is displayed in a tool result tab of the tool results frame 1110. If the search criteria is not located, an error message is displayed, and a new search criteria may be entered.

Figure 31:

FIG. 31 depicts an exemplary embodiment of a campaign entry screen for entering a campaign definition and campaign data. The campaign entry screen is used to enter campaign data for a new campaign and/or edit campaign data for an existing campaign.

In the example of FIG. 31, the campaign entry screen enables a user to select an organization name from an organization drop-down list. In other examples, a user may enter the organization name. In one example, the organization name is a name of the person, company, or other entity that is directing, providing, organizing, managing, or initiating a campaign. Other examples exist.

The user also may enter a name for the campaign. In some instances, the name for a campaign may be selected from a drop-down list. Other examples exist.

The user also may enter a start date and an end date for the campaign. In one example, the user manually enters the start date and the end date. In another example, the user selects the start date and end date from a selectable calendar 3102 or other selection mechanism.

The user may enter a campaign type in some examples. In the example of FIG. 31, the user selects the campaign type from a drop-down list. The campaign type is configurable for various users in some examples. Thus, multiple different types of campaigns may be identified or defined for some embodiments. In the example of FIG. 31, the campaign type includes direct mail, magazine, newspaper, print, radio, television, webcast, email, internet, tradeshow/fair, training, surveys, billboards, bill stuffers, special interest group, point of sale, public relations, and/or other. Other examples exist.

The user also may enter a description of the campaign or any campaign attributes. In this example, the user may enter text for the description. In other examples, the user may select a description from a drop-down list or another entry method.

The user also may select a target audience type. In the example of FIG. 31, the target audience type may be selected from a list of audience types. The audience types in the example of FIG. 31 include affected public, emergency officials, excavator, public official, school, internal, employee, member, locators, general public, demographic, area resident, area business, occupation, title, and/or other audience types. Other examples exist. A user may add or remove selected audience types for a campaign.

A user also may select a message content from the available content types. Message content and content types are configurable in some examples based upon the type of campaign. In the example of FIG. 31, the message content types include call before you dig, damage prevention, underground damage prevention, above ground damage prevention, public awareness, awareness of hazards, earthquake preparedness, emergency preparedness, incident, response notification, training, informational segment, 811, hurricane restoration, pipeline safety, advertisement, product information, service information, sales message, general communication, and/or other message content types. A user may add or remove selected message content types to or from the campaign. Other examples exist.

FIG. 32 depicts an exemplary embodiment of a user screen used to enter attribute values for a campaign. The campaign attributes are user defined in some embodiments. The campaign attributes can vary depending upon the campaign type. In the example of FIG. 32, the campaign attributes include a cost, audience potential, frequency/channel, format, vendor company and contact, rating, and other. Other examples exist for other embodiments. The user can enter values for one or more of the defined attributes for the campaign type in FIG. 32. In some examples, one or more of the attributes may require values, while other attributes may be optional.

In other embodiments, a campaign attribute may include audience potential, vendor, company, contact, format, rating, target area, form, description, cost, frequency, channel, affiliate, theme, location, survey, number of surveys, group, meeting purpose, region, location, geographic feature, and/or other campaign attributes. Other examples exist.

Figure 33:
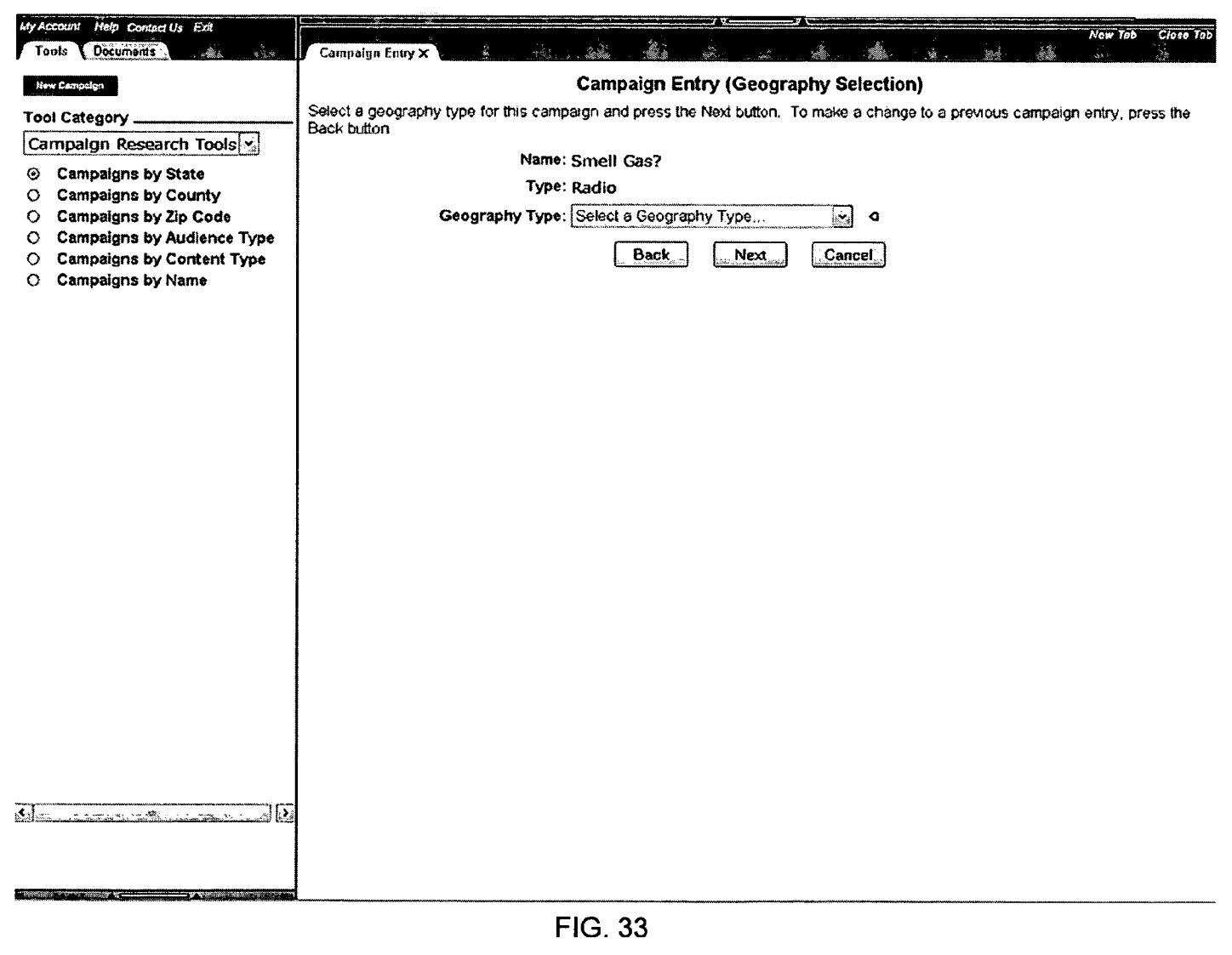

FIG. 33 depicts an exemplary embodiment of a user screen for entering or selecting a geography for a campaign. In this example, the campaign has one or more associated geographies, including a location, a region, and/or a geographic feature. The user selects the geography type from the drop-down list in the example of FIG. 33. In other examples, a user may enter a geography type or otherwise provide the geography. The available geography types in the example of FIG. 33 include an address, a city, a place, a county, a state, and/or a zip code. The geography types may be different for other examples, and the geography types may vary based upon a campaign type and/or the campaign attributes in some embodiments. In other examples, the geography includes an address, a cross street, a city, a place, a county, a state, a zip code, a region, an area, a location, a geographic feature, and/or another geography.

Figure 34:
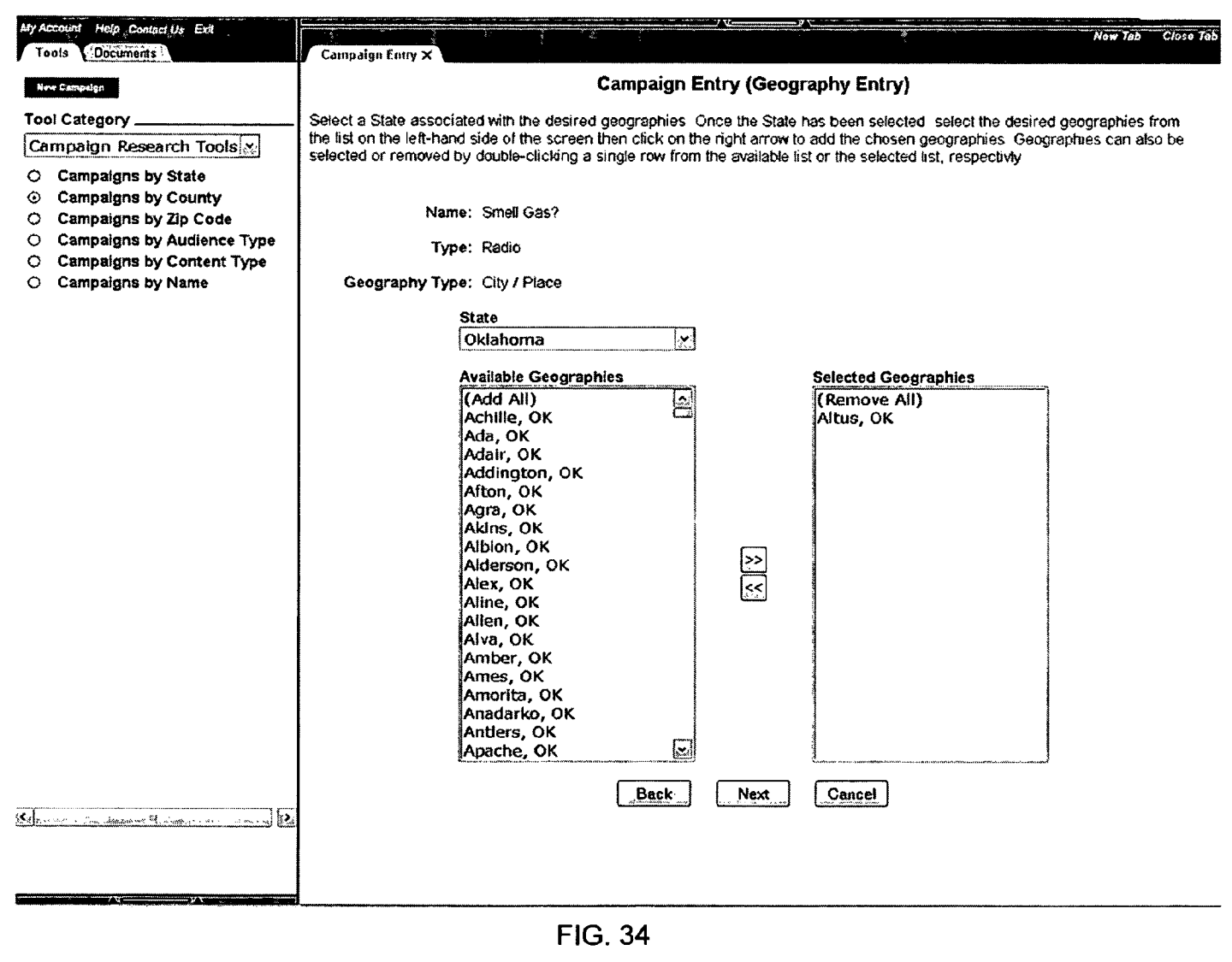

FIG. 34 depicts an exemplary embodiment of a user screen used to identify a set of selected geographies based upon the geography type selected in the example of FIG. 33. In this example, campaigns associated with geographies based on cities, places, counties, states, and/or zip codes include a geography entry screen to select further geography attributes. For example, the user may select a state from the state drop-down list. The user also may select a city or place from the city/place drop-down list. Other geographies may be available based upon the geography type selected in the example of FIG. 33. One or more geographies may be selected for a campaign or removed from a campaign.

Figure 35:
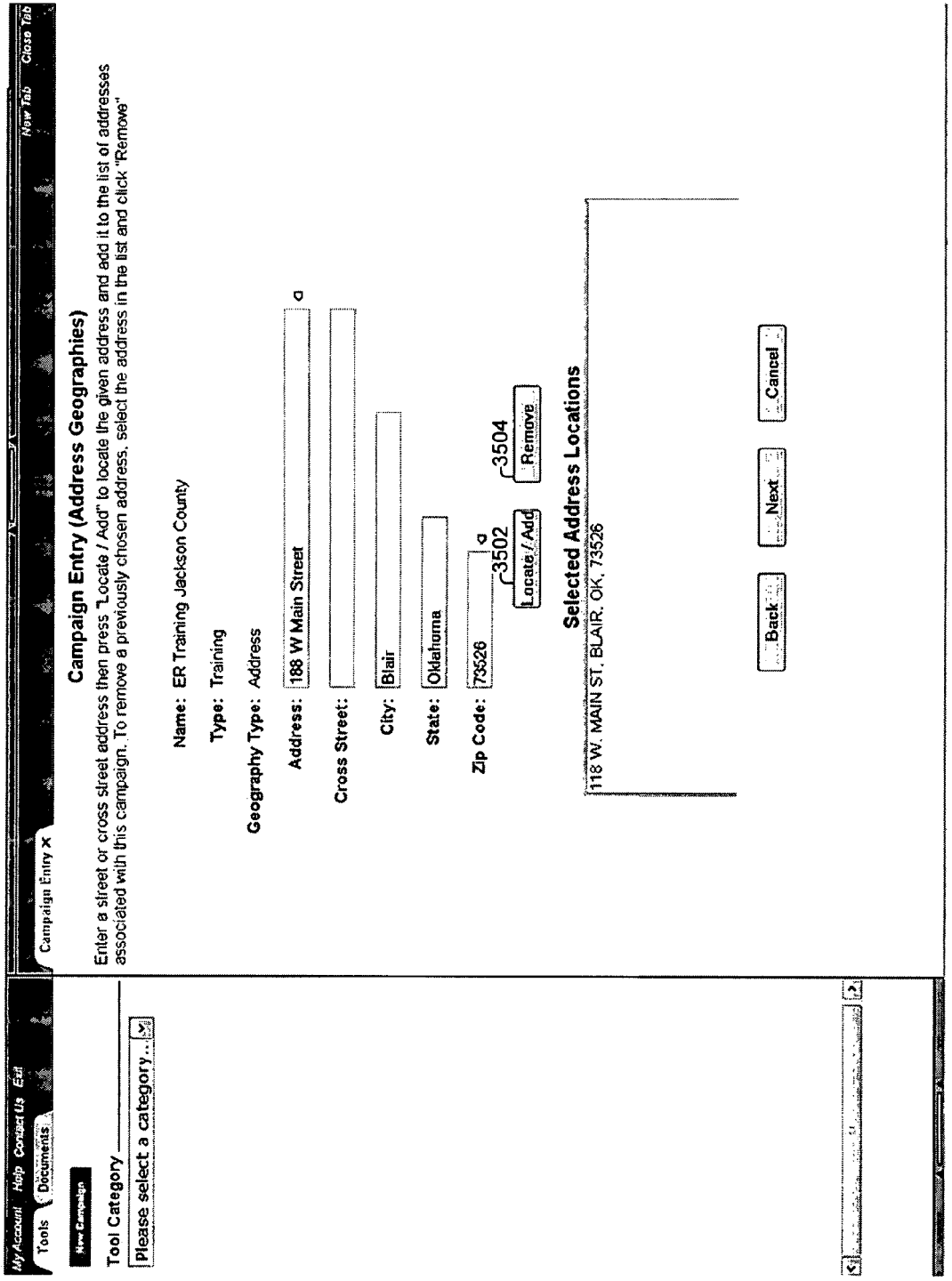

FIG. 35 depicts an exemplary embodiment of a user screen that allows a user to identify a set of selected geographies based upon a geography type previously selected. In the example of FIG. 35, campaigns associated with geographies based on addresses include an address geography entry screen. The user may enter an address, a cross street, a city, a state, and/or a zip code. One or more attributes may be required, and one or more attributes may be optional. Users may enter one or more addresses. The user may select the "locate/add" button 3502 to geocode the address. When the user selects the locate/add button 3502, the campaign management system attempts to geocode the address. If the street address cannot be geocoded, the address entry will be geocoded by zip code in one example. A user can delete one or more addresses from the "selected address locations" by selecting an address and then selecting the "remove" button 3504.

Figure 36:
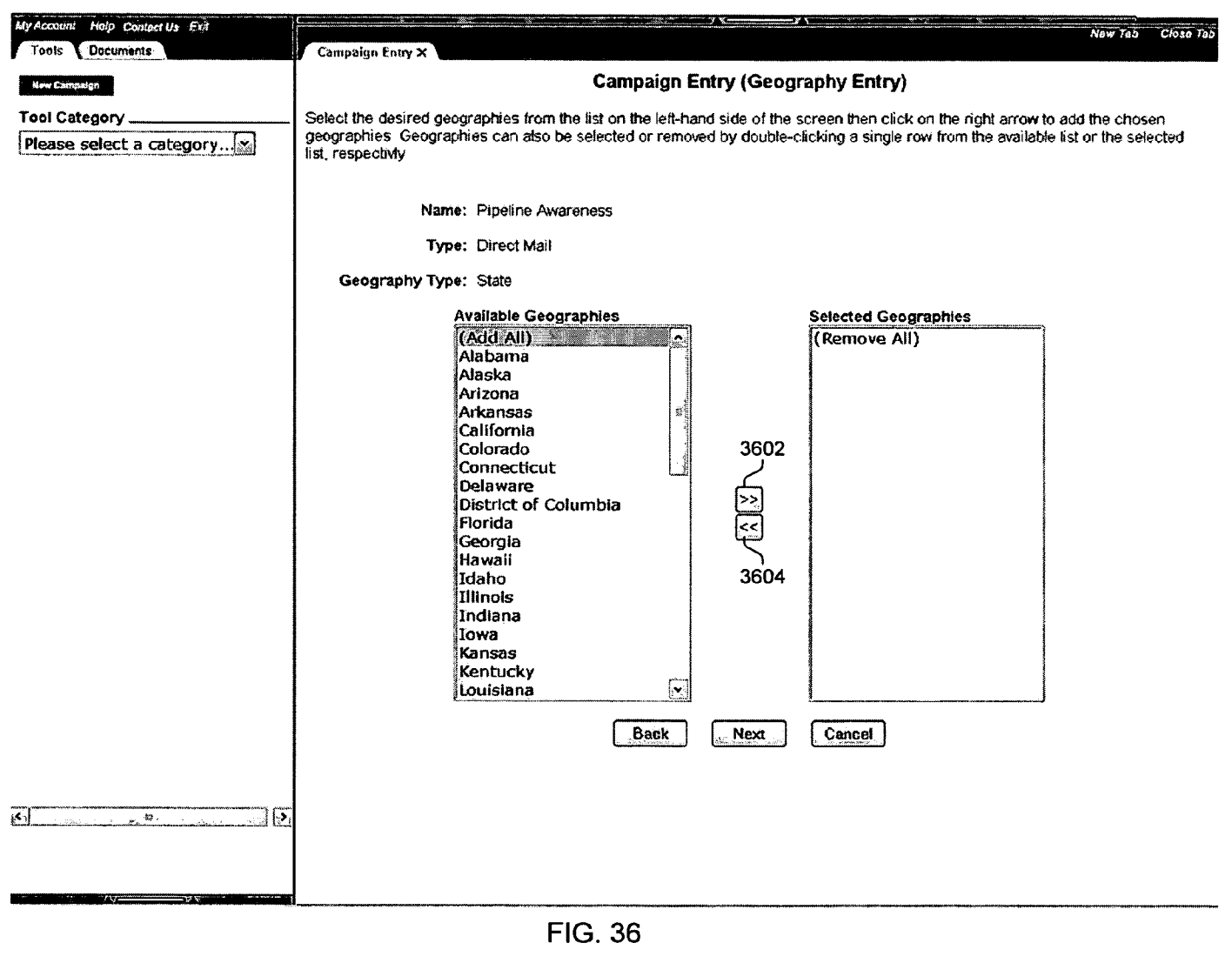

FIG. 36 depicts an exemplary embodiment of a user screen that enables a user to identify a set of selected state geographies to be associated with a campaign when the campaign is associated with a geography based on states. In the example of FIG. 36, the specific geography entry is selected from the state drop-down list. In other examples, territories also may be included in the available geographies. For other examples not based upon the United States, the state, territory, jurisdiction, or other geographic area may be identified for the particular country, treaty area, or other geographic area. In the example of FIG. 36, a user may select the specific geography and add the selected geography to the campaign by selecting the right arrow add button 3602. One or more selected geographies may be removed from the campaign by selecting the geography in the "selected geographies" list and selecting the left arrow remove button 3604.

Figure 37:
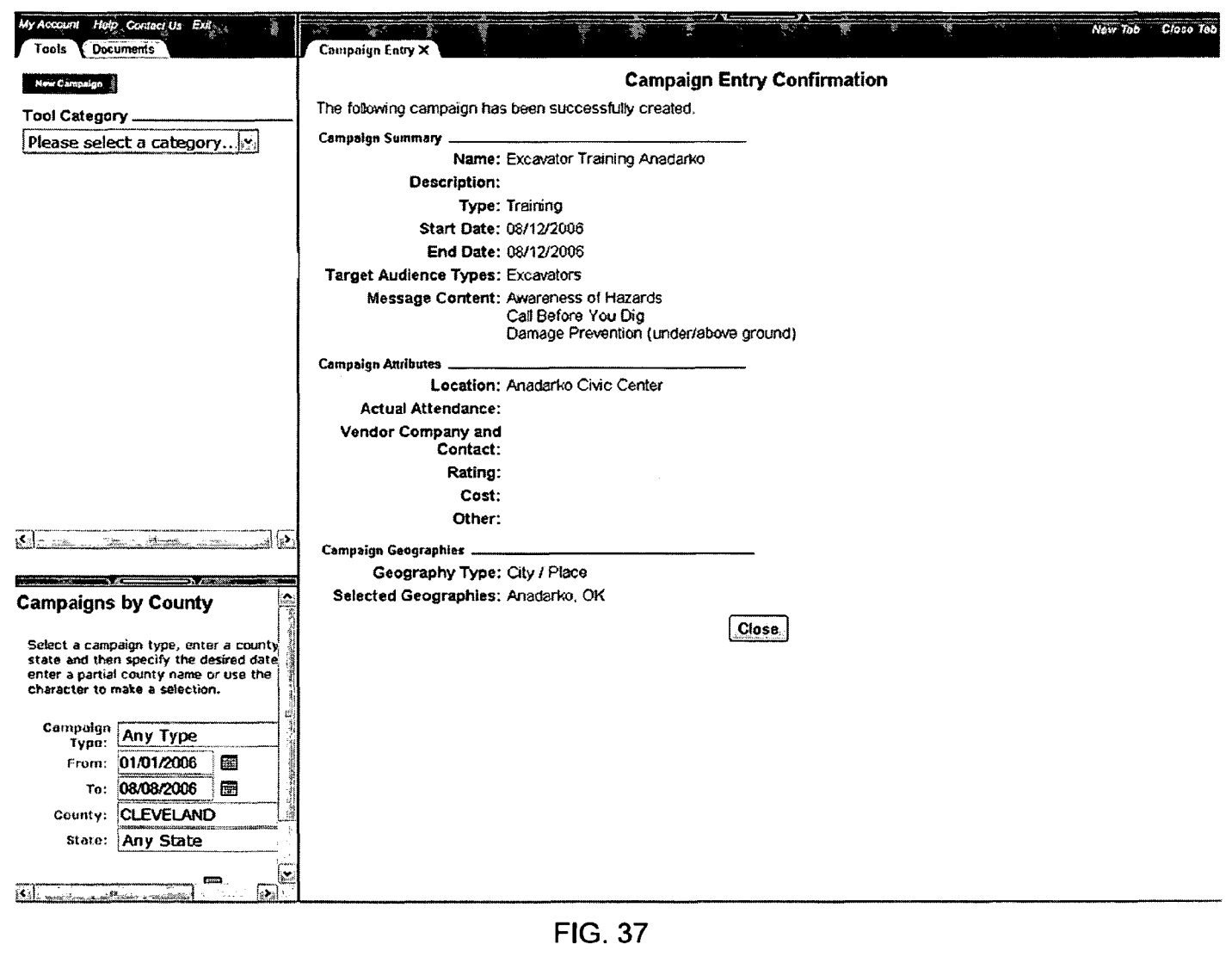

FIG. 37 depicts an exemplary embodiment of a campaign entry confirmation screen. A campaign entry confirmation screen may be generated in some embodiments when a user has completed entering the attributes for a campaign. The campaign entry confirmation screen enables a user to confirm the campaign data entered for a campaign, including the campaign definition (name, description, type, start date, end date, target audience type, and message content), campaign attributes (location, actual attendance, vendor company and contact, rating, cost, and other), and geographies (geography type and selected geographies). In other examples, the campaign entry confirmation may identify the specific campaign definition, campaign attributes, and campaign geographies for that campaign and the values associated with the campaign definition, campaign attributes, and campaign geographies.

Figure 38:

FIG. 38 depicts an exemplary embodiment of a campaign view screen used to view and/or edit campaign data. Values for the campaign data also maybe entered and/or edited.

The campaign view may include campaign data for campaign definitions, campaign attributes, campaign geographies, and/or campaign data. In the example of FIG. 38, the campaign view screen enables a user to view and edit the organization, name, campaign type, campaign description, campaign audience, campaign message content and type, a start date for the campaign, and/or an end date for the campaign. Other examples exist.

The campaign view screen also may enable a user to otherwise view or edit attributes, geographies, documents, journal entries, and/or maps for the campaign or otherwise associated with the campaign. In one embodiment, the campaign view screen includes an attributes utility 3802, a geography utility 3804, a documents utility 3806, a journal entries utility 3808, and a map utility 3810. The attributes utility 3802 enables a user to view and edit campaign attributes. In addition, the attributes utility 3802 enables a user to edit the geography by selecting the edit attributes button 3812. In one example, if the user selects the edit attributes button 3812, the campaign management system enables the user to edit the attributes with one or more screens the same as or similar to FIG. 32 or in another manner. The geography utility 3804 enables a user to view and edit campaign geographies. The documents utility 3806 enables a user to view and edit linked documents and other document data. The journal entries utility 3808 enables a user to view and edit linked journal entries and other journal data. The map utility 3810 enables a user to view and edit maps associated with the campaign.

A user also can make journal entries for a campaign by selecting the add journal entry button 3814 and/or link a document to the campaign by selecting the attach document button 3816. The user may print a campaign by selecting the print campaign button 3818, save a campaign by selecting the save campaign button 3820, delete a campaign by selecting the delete campaign button 3822, or cancel the edits and/or viewing by selecting the cancel button 3824.

Figure 39:
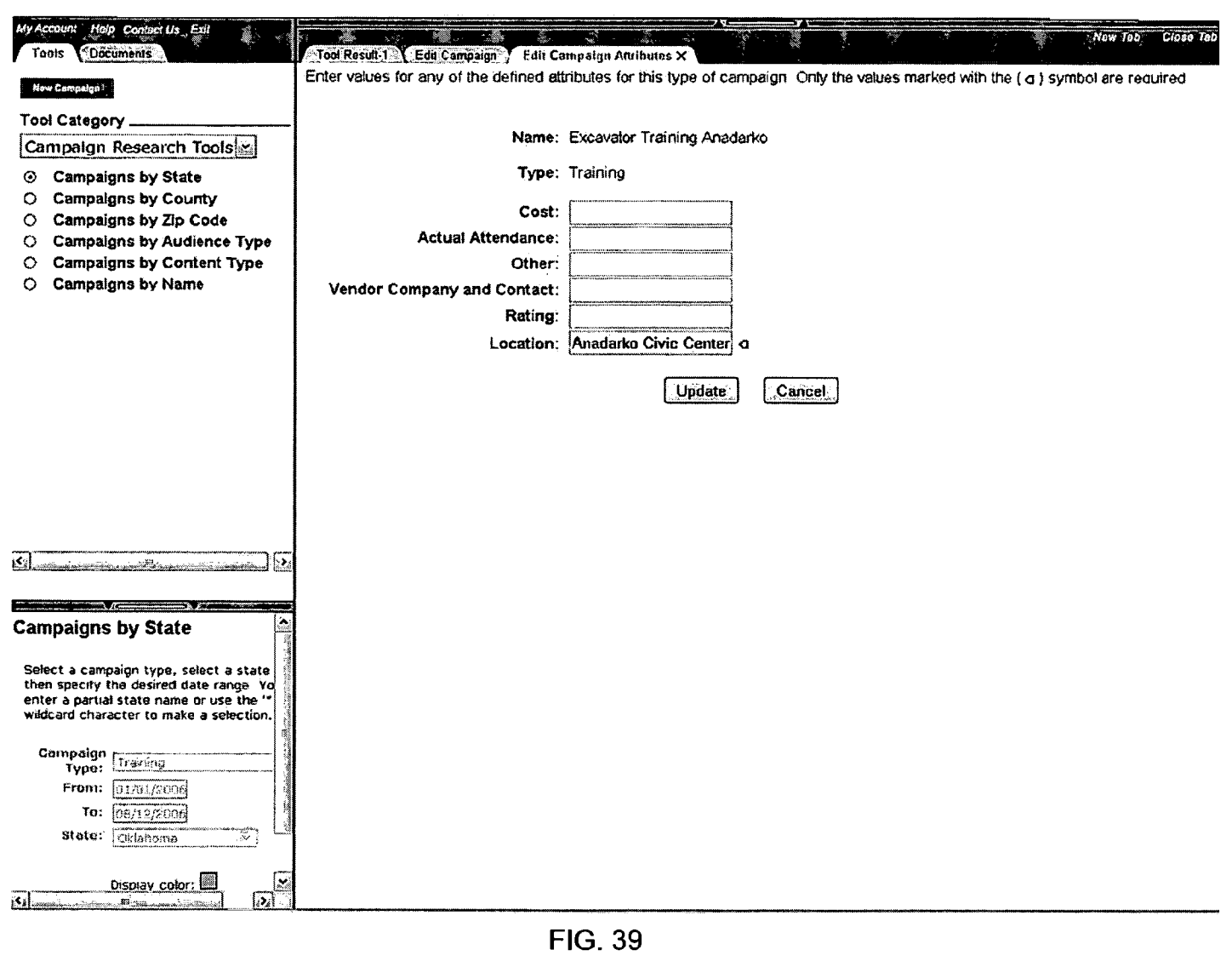

FIG. 39 depicts an exemplary embodiment of an edit campaign attributes utility. In one example, the user may access the edit campaign attributes utility by selecting the edit attributes button 3812 on the campaign view screen (see FIG. 38). In some examples, the user enters the values or entries for the campaign attributes. In other examples, the user selects values or entries for the campaign attributes from drop-down lists or other selections. In one example, the contents of the campaign attributes will vary depending on the campaign type selected for the campaign being managed. In another example, some campaign attributes require a value or entry, and other campaign attributes are optional. In the example of FIG. 39, the user updates the campaign attributes when complete by selecting the update button.

Figure 40:
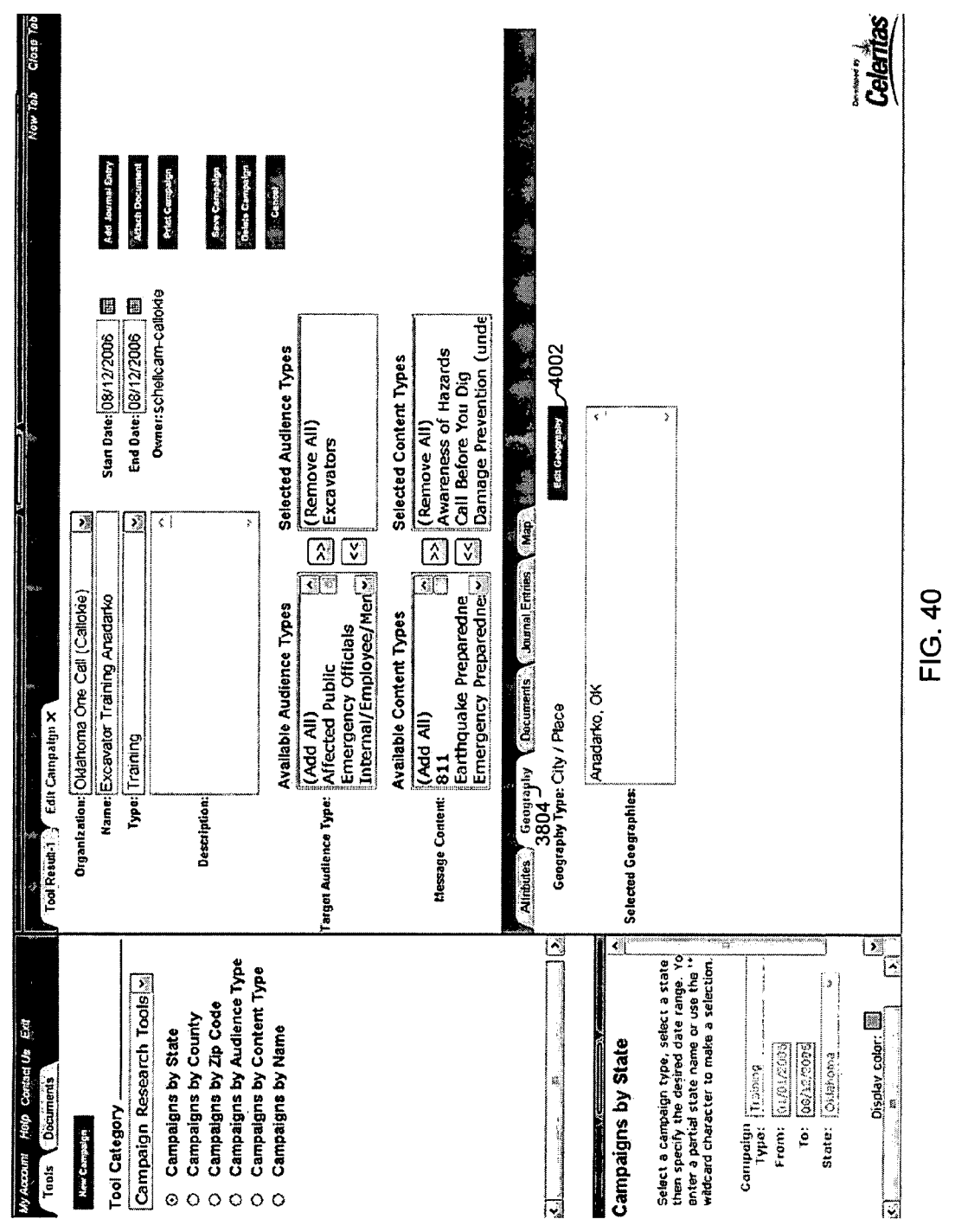

FIG. 40 depicts an exemplary embodiment of a geography utility 3804. The geography utility 3804 enables a user to view and/or edit geography data for the campaign. The geography utility 3804 displays the geography data. In addition, the geography utility 3804 enables a user to edit the geography by selecting the edit geography button 4002. In one example, if the user selects the edit geography button 4002, the campaign management system enables the user to edit the geography with screens the same as or similar to one or more of FIGS. 33-36 or in another manner.

Figure 41:
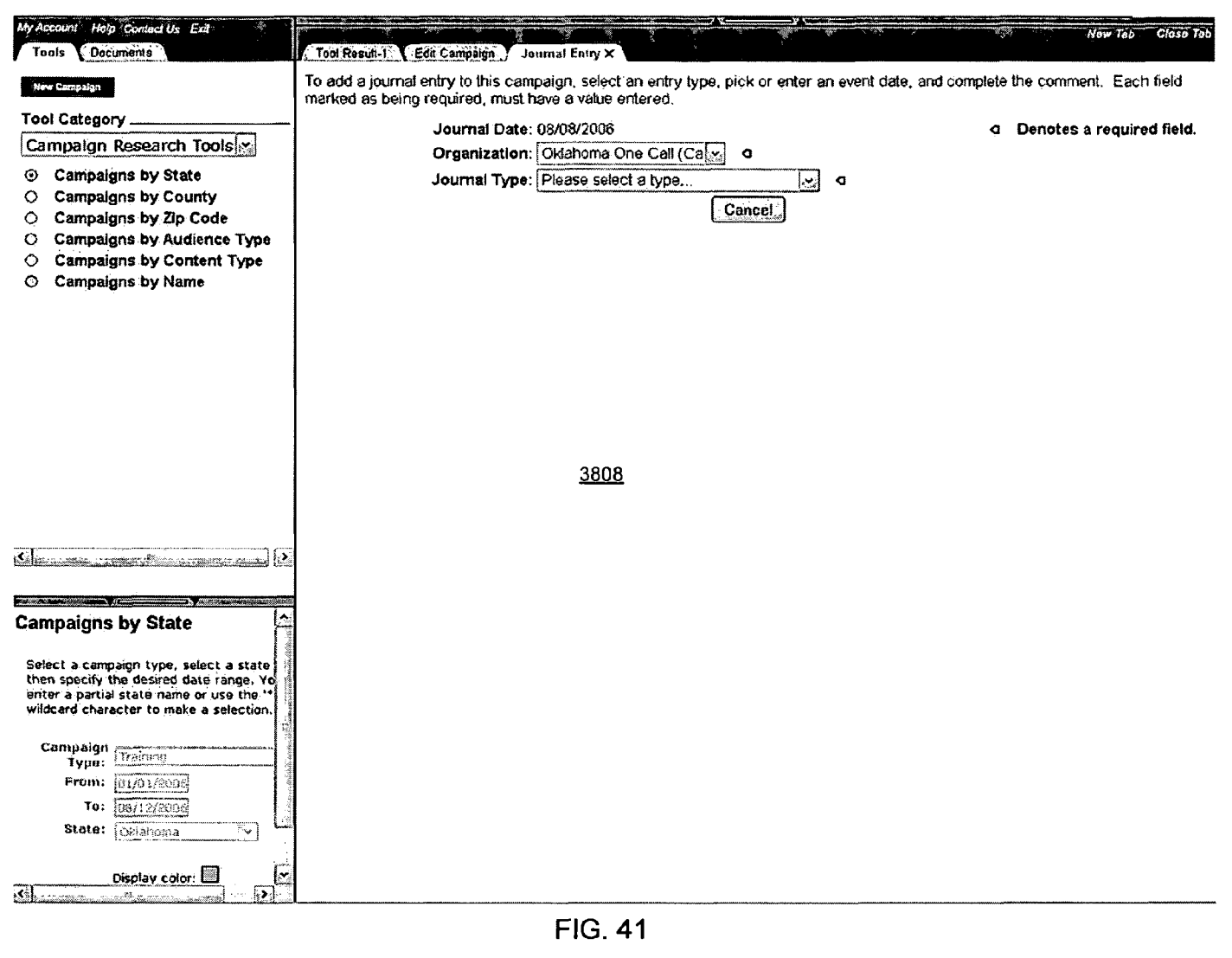

FIG. 41 depicts an exemplary embodiment of a journal entry utility 3808. The journal entry utility 3808 is used to add a journal entry to a campaign. The user may select the journal entry utility by selecting the add journal entry button 3814 (see FIG. 38) in some examples.

In the example of FIG. 41, the campaign management system assigns the current date for the "journal date" when the journal entry is made. In other examples, the user may select the journal date from a calendar or other selection mechanism or enter the journal date. The user also enters or selects an organization identified for the campaign and a journal type. In other examples, the user may enter a journal type, or the journal type may not be included. In other examples the user may enter or select an organization, or the organization may not be included. In one embodiment, the journal entry types include a note, a memo, a letter, an email, a phone call, a linked document, a video, a graphic, audio, a meeting, another communication, information, an advertisement, and/or another journal entry type. Other examples exist.

Figure 42:
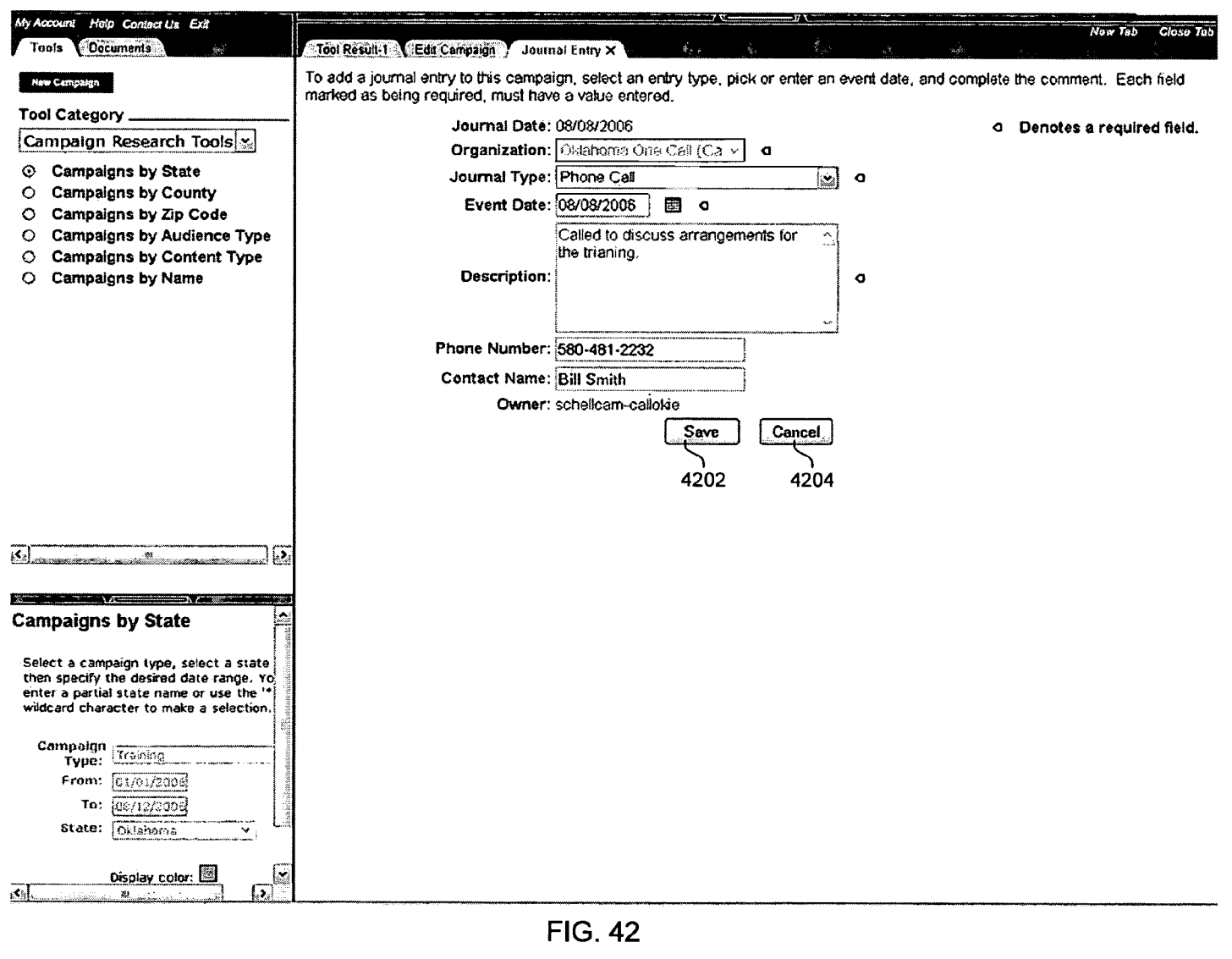

FIG. 42 depicts another embodiment of a journal entry utility. In the example of FIG. 42, additional journal entry data is entered or selected. The user enters or selects an event date. The event date is a date a campaign event occurred for which the journal entry is being made. In some examples, the user enters the event date. In other examples, the user selects the event date from a calendar or other entry mechanism. The user also enters a description in this embodiment. In other embodiments, the user may select a description from a dropdown list or another entry mechanism. The user also enters a phone number and a contact name. In other examples, one or more data entries may be required, and one or more data entries may be optional. In still other examples, different types of journal entry data may be requested or identified. In some instances, the journal entry attributes and default entry options vary based upon the journal entry type. For example, a journal entry type for a phone call may include journal entry attributes for a phone number and a contact name. In another example, an email journal entry type may include journal entry attributes for an email address. In another example, a letter journal entry type may include an attribute for an address. Other journal entry types may not include default journal entry attributes. Other examples exist. Once complete, the user selects the save button 4202. The user also can cancel the journal entry by selecting the cancel button 4204.

Figure 43:
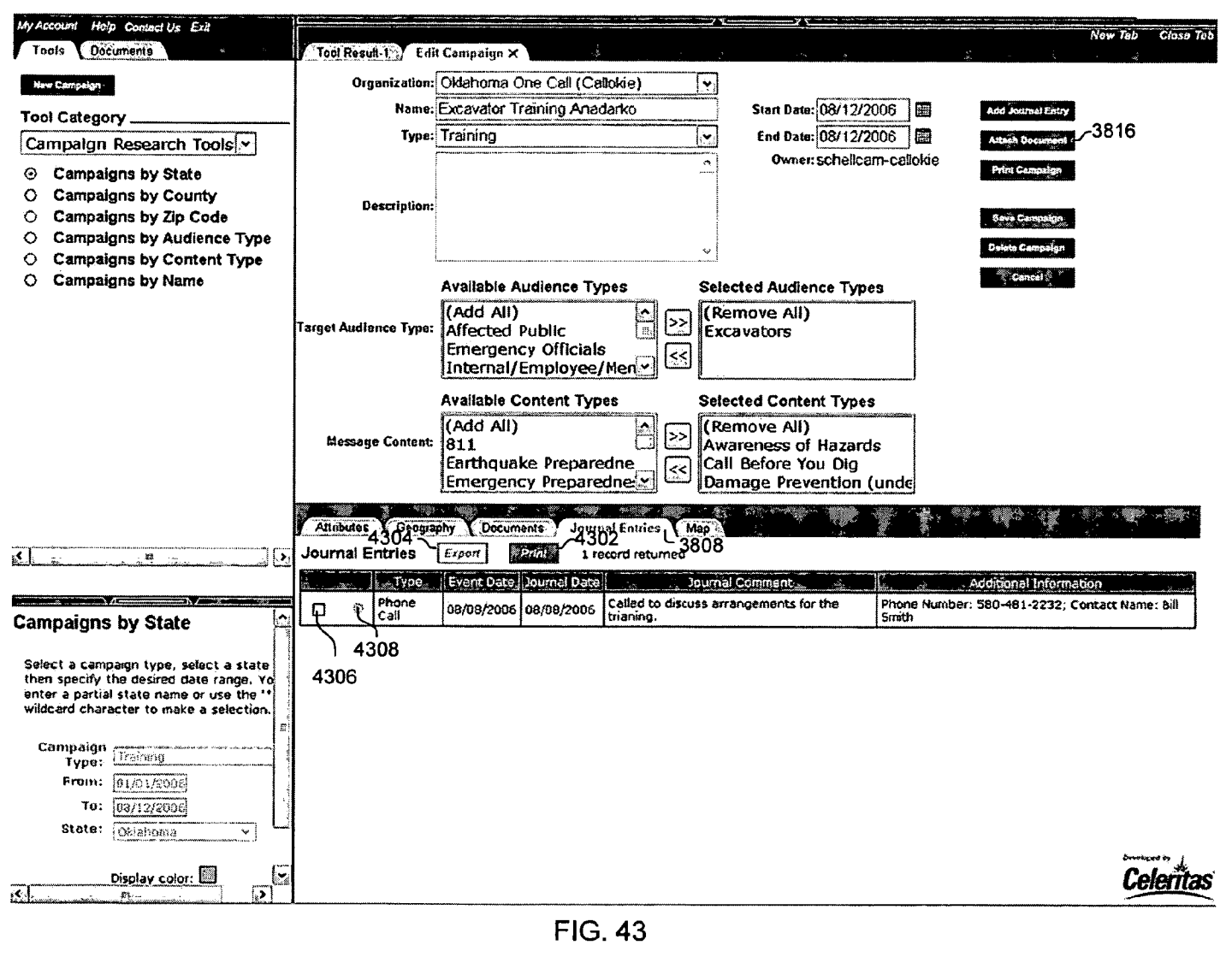

FIG. 43 depicts an exemplary embodiment of a journal entries utility 3808. The journal entries utility 3808 displays journal entries linked to the campaign in the tool results frame 1110. The journal entries utility 3808 also enables a user to print the journal entries using the print button 4302 and export the journal entries using the export button 4304. In one example, the journal entries may be exported to a spreadsheet. In another example, the journal entries may be exported to another type of electronic file, including a word processing document, a PDF document, an image file, or another file type. The journal entries each include an export records checkbox 4306 that enable a user to select whether or not the journal entry is exported.

The journal entries utility 3808 also includes a menu icon 4308 that enables a user to edit or delete a journal entry. The journal entries utility 3808 produces screens the same as or is similar to the journal entry screens of FIGS. 41-42 when the user selects the edit journal entry utility from the menu icon 4308. A user can also attach one or more documents to the journal entry using the attach documents button 3816. Other examples exist.

Figure 44:
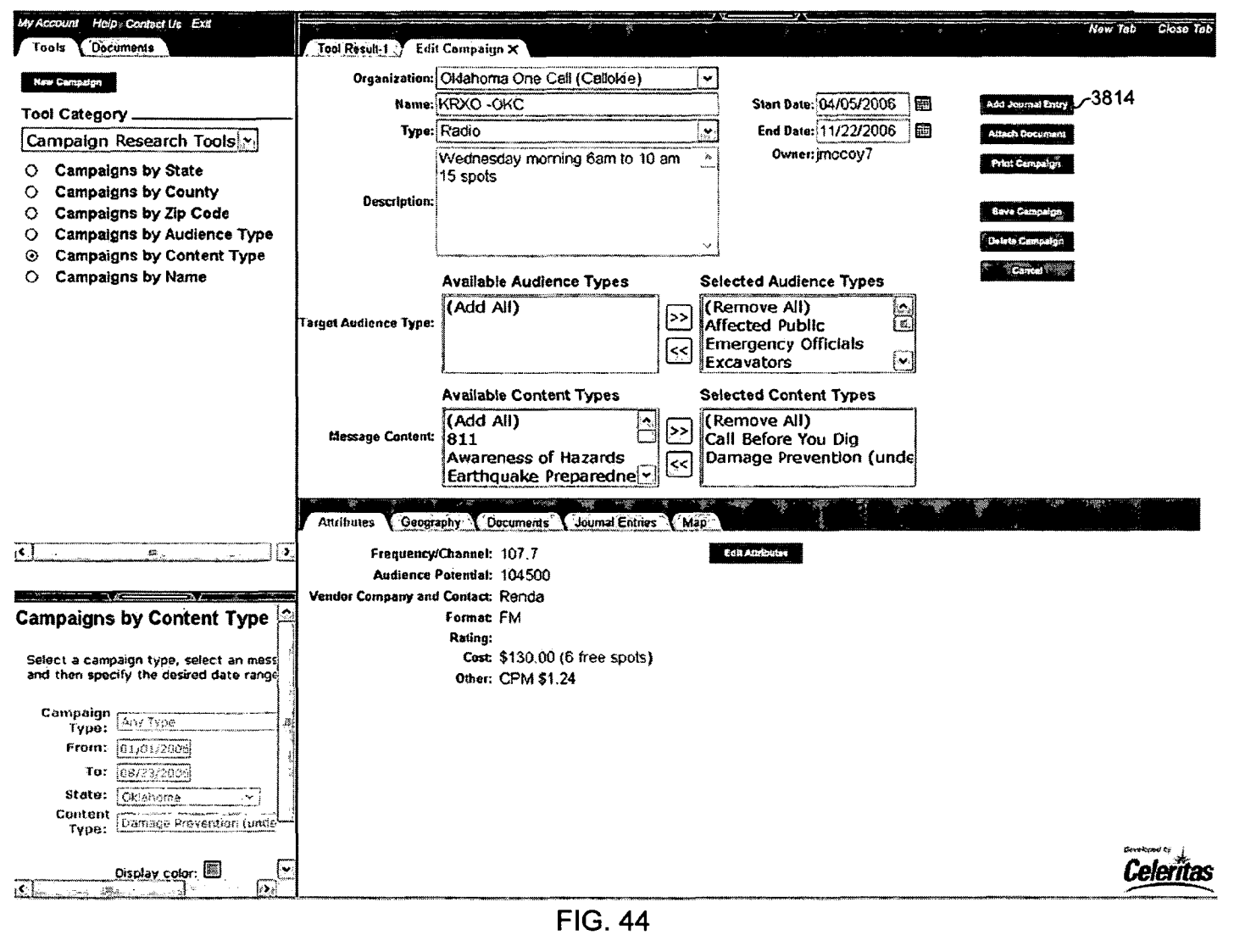
Figure 45:
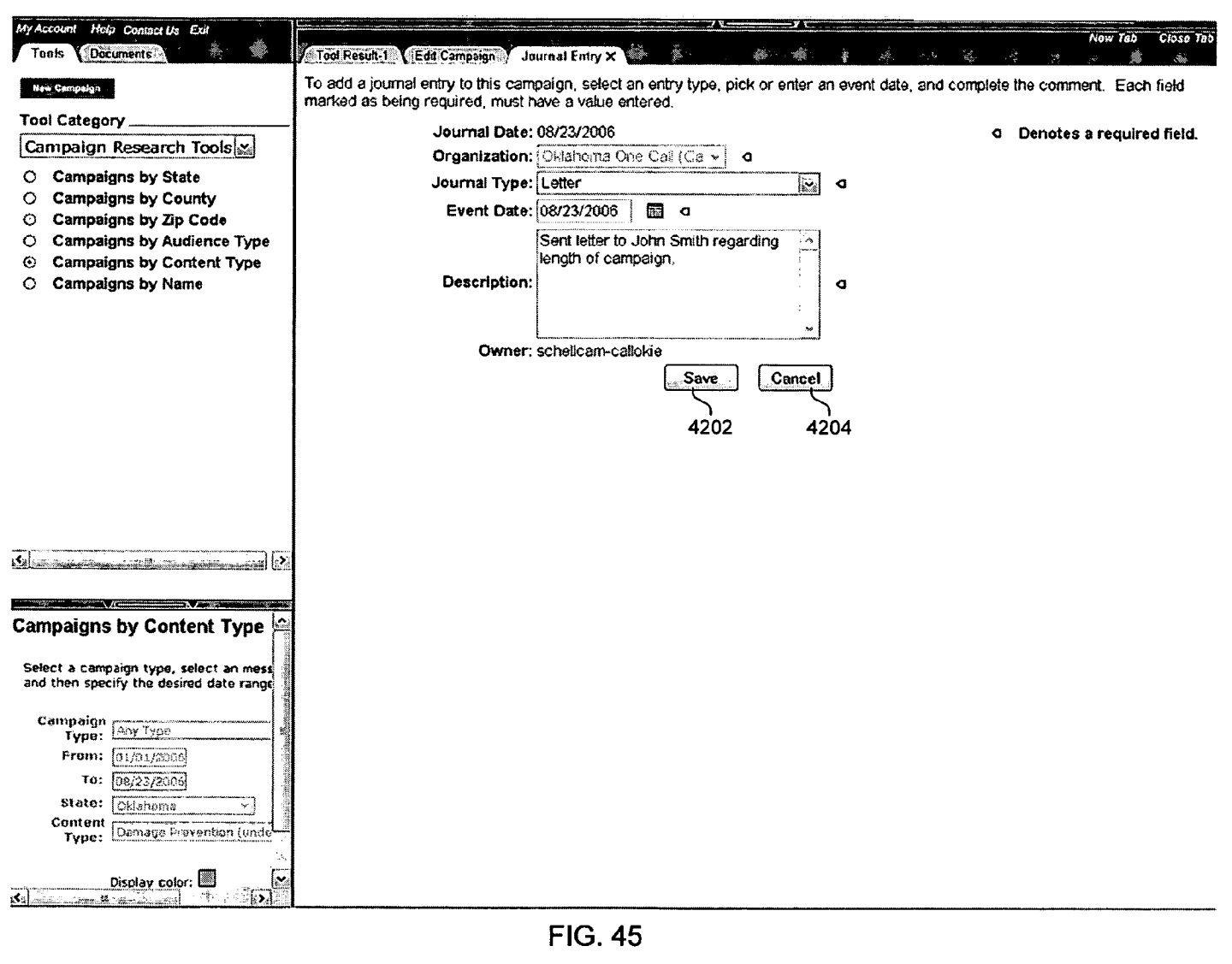
Figure 46:
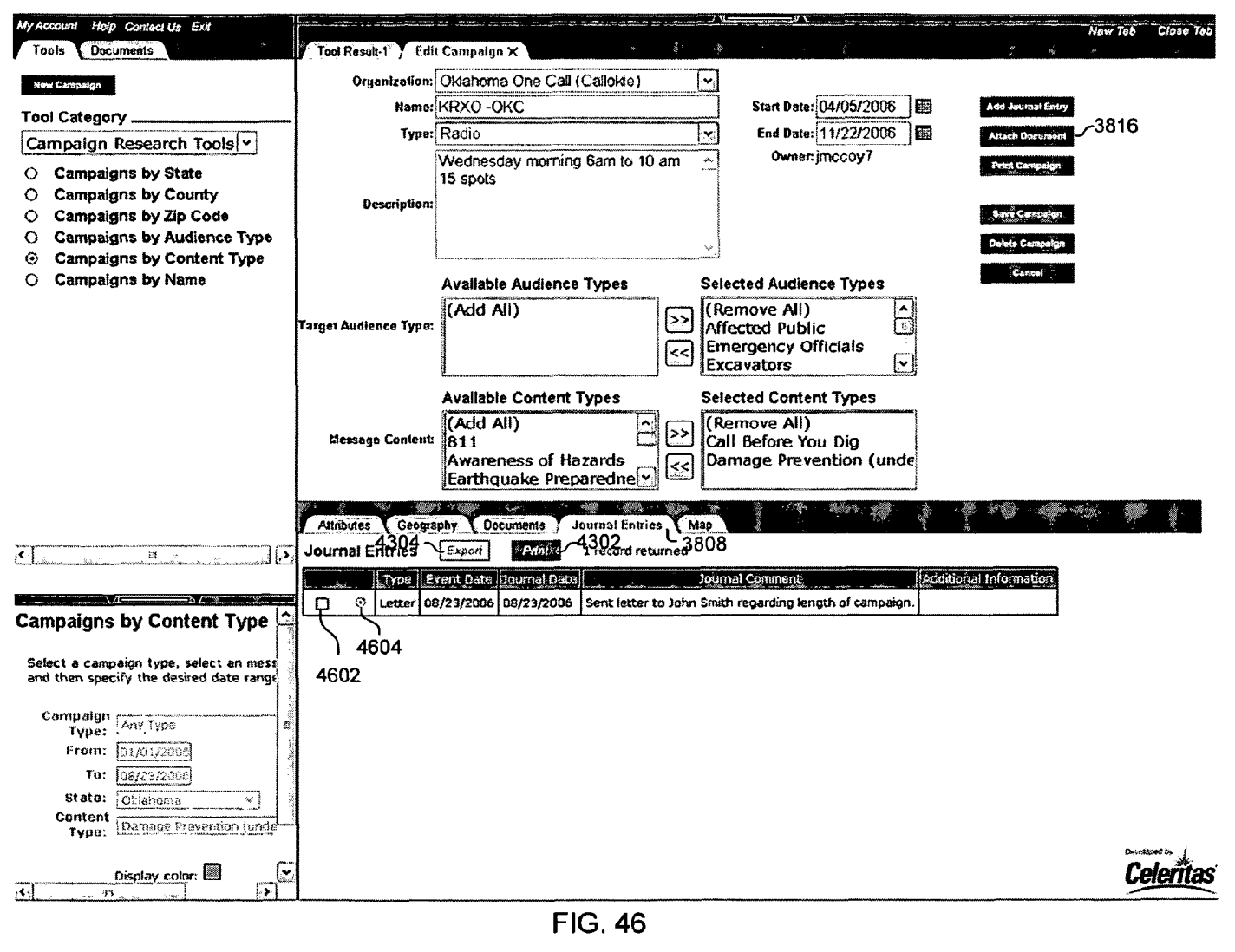

FIGS. 44-46 depict another exemplary embodiment of a journal entry for another campaign. In the example of FIGS. 44-46, the campaign type is a radio campaign, and the journal type is a letter. The user selects the add journal entry button 3814, and the journal entry utility screen is generated for the campaign. The user selects the organization and journal type. The user then enters or selects the event date and the description for the journal entry. A user can also attach one or more documents to the journal entry using the attach documents button 3816. Once complete, the user selects the save button 4202. The user also can cancel the journal entry by selecting the cancel button 4204.

Once the user saves the journal entry, the journal entry is displayed in the journal entries utility 3808. Alternately, a different screen may be selected or viewed, or the default screen may be a different screen. In the example of FIG. 46, the journal entry identifies the journal entry type, the event date, the journal date, the journal comment, and/or additional information. The journal entry also includes an export records check box 4602 for exporting the journal entry and a menu icon 4604 for editing or deleting the journal entry or performing other actions on the journal entry.

Figure 47:

FIG. 47 depicts an exemplary embodiment of the documents utility 3806. The documents utility 3806 enables a user to view documents that are linked to the campaign. In the example of FIG. 47, the documents utility 3806 identifies the effective date of the document (the date the document was created), the date the document was attached or otherwise linked to the campaign, the document title, and/or the document description. In other examples, other document data or different document data may be included.

Each row of document data includes an export records check box 4702 and a menu icon 4704 in some embodiments. The documents utility also includes an export button 4706 and a print button 4708. The user may select the export records check box 4702 and export the document using the export button 4706. In one example, the document is exported to another location, such as to a different storage location. In another example, the export function enables a user to export the document to a different format. Selecting the menu icon 4704 enables a user to view and/or delete the document. The print button 4708 enables a user to print the document. In some examples, the print button 4708 enables a user to print the document to a printer or to an electronic file.

Figure 48:
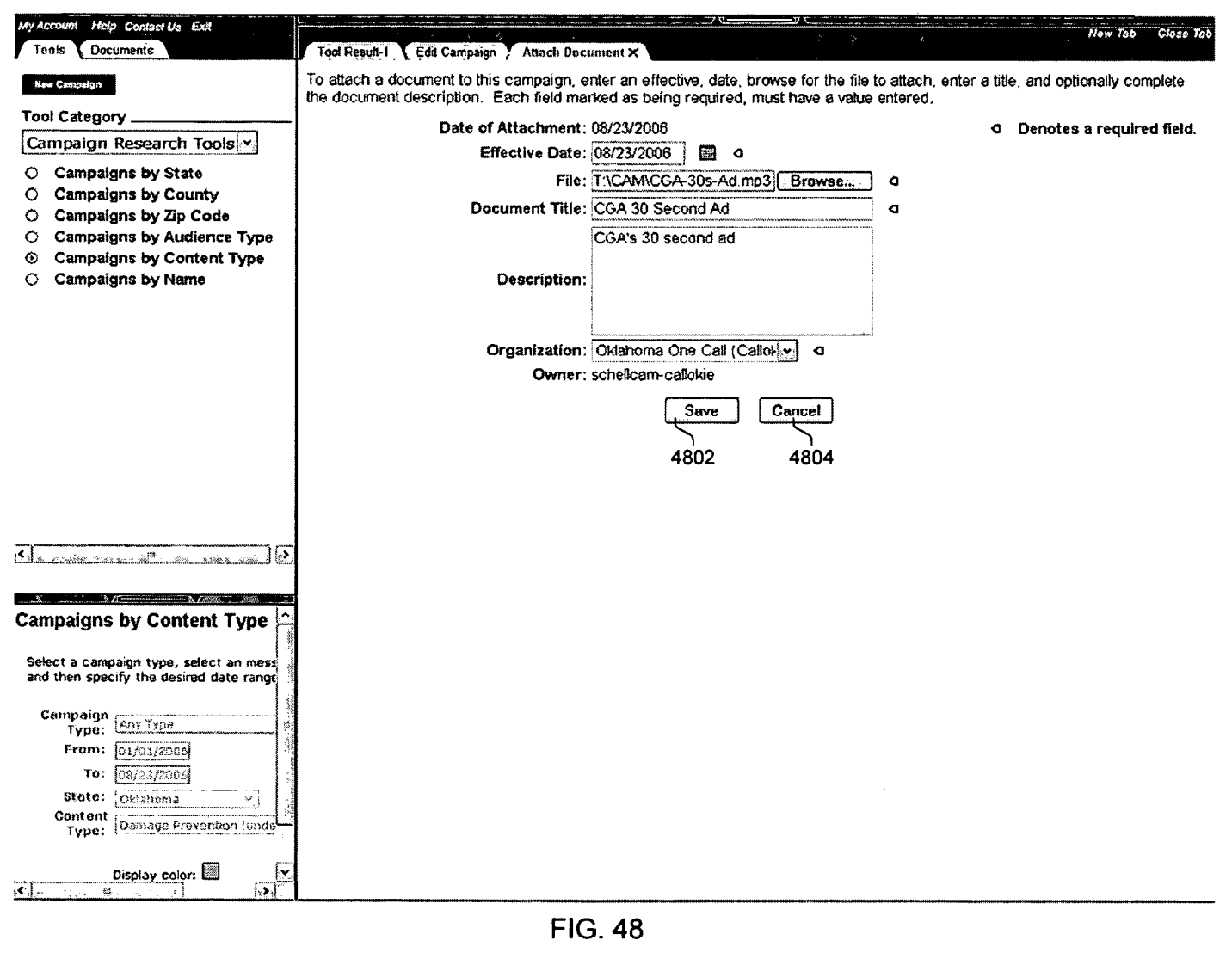

FIG. 48 depicts an exemplary embodiment of an attach document utility. A user can navigate to the attached document utility by selecting the attach document button 3816 of FIG. 38 in one example. The attach document utility identifies the date the document is linked to the campaign data. The attach document utility enables a user to enter an effective date or select the date from a calendar or other entry mechanism. The effective date is the date the document was created. The user also may enter the location of the file or browse for the location of the file to be attached. The user enters the document title and optionally includes a document description. The user also may select the organization identified for the campaign. In some embodiments, one or more of the document data is required. In other embodiments, one or more of the document data is optional. When the user completes the attach document in utility, the user may select the save button 4802. Otherwise, the user may select the cancel button 4804 to cancel attaching the document.

Figure 49:
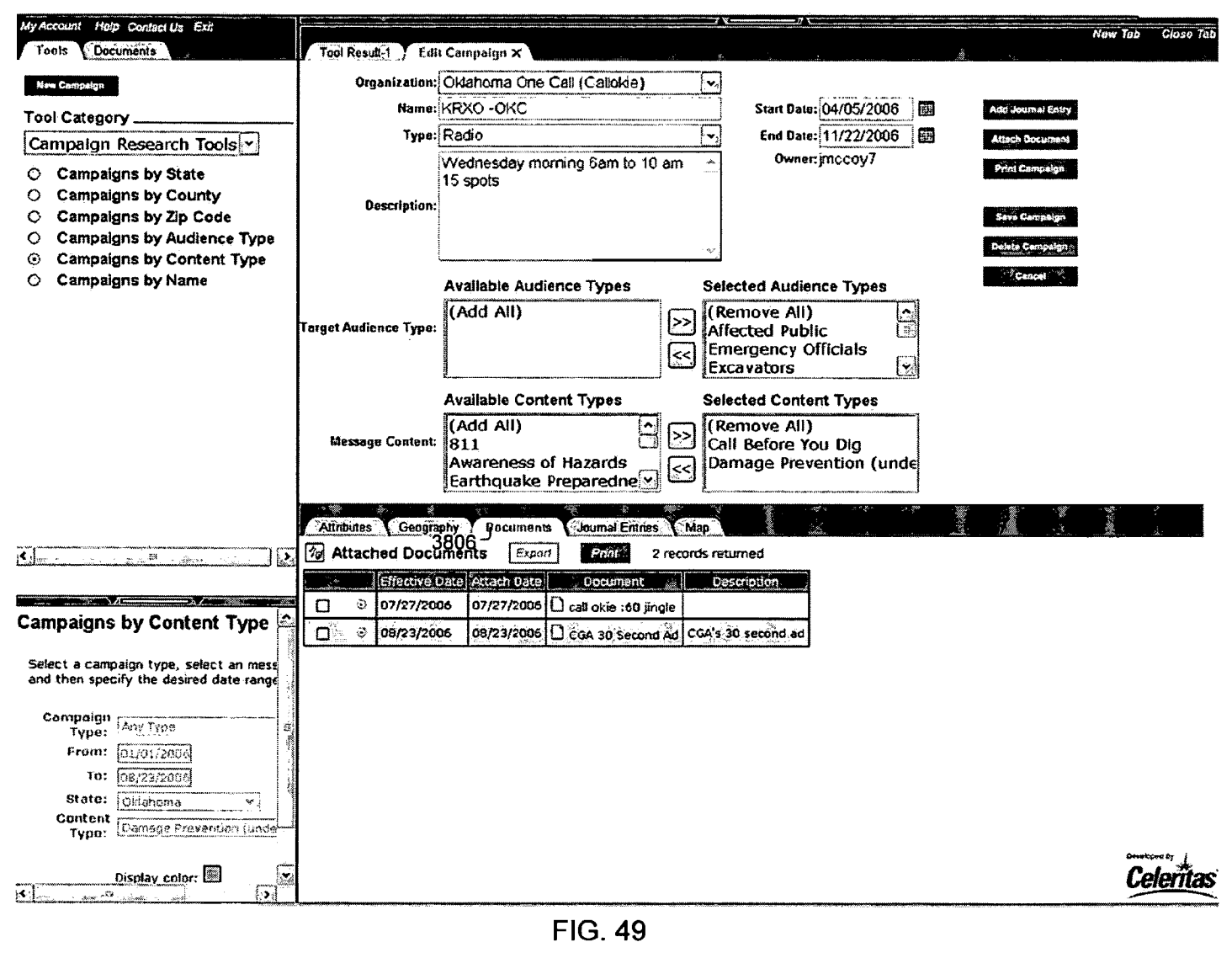

FIG. 49 depicts an exemplary embodiment of another documents utility 3806 in which the attached document data is depicted. In this example, document data identified for attached documents is displayed. Other examples exist.

Figure 50:
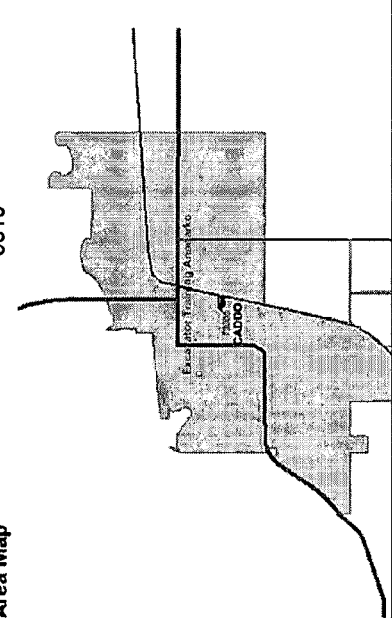

FIG. 50 depicts an exemplary embodiment of the map utility 3810. The map utility 3810 enables a user to view a map representation of the campaign's geographies without having to switch away from the campaign view screen. The map utility 3810 is displayed in the tool results frame 1110.

Figure 51:
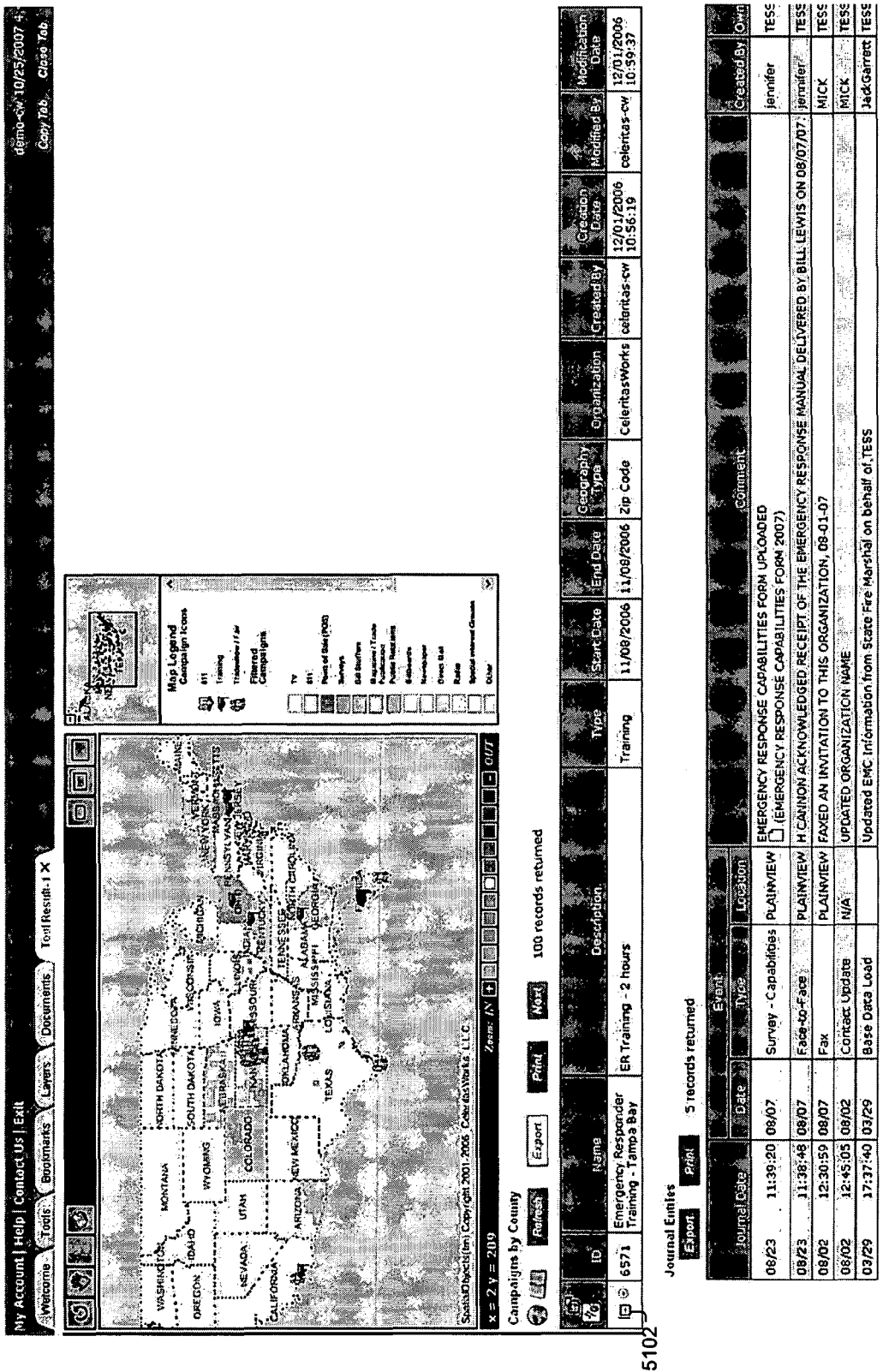

FIG. 51 depicts an exemplary embodiment of a screen using an expander 5102 to display multiple journal entries. A user selects the expander 5102 to see all of the journal entries associated with a campaign event. A user can select the expander 5102 again to reduce or close the set of journal entries.

Figure 52:
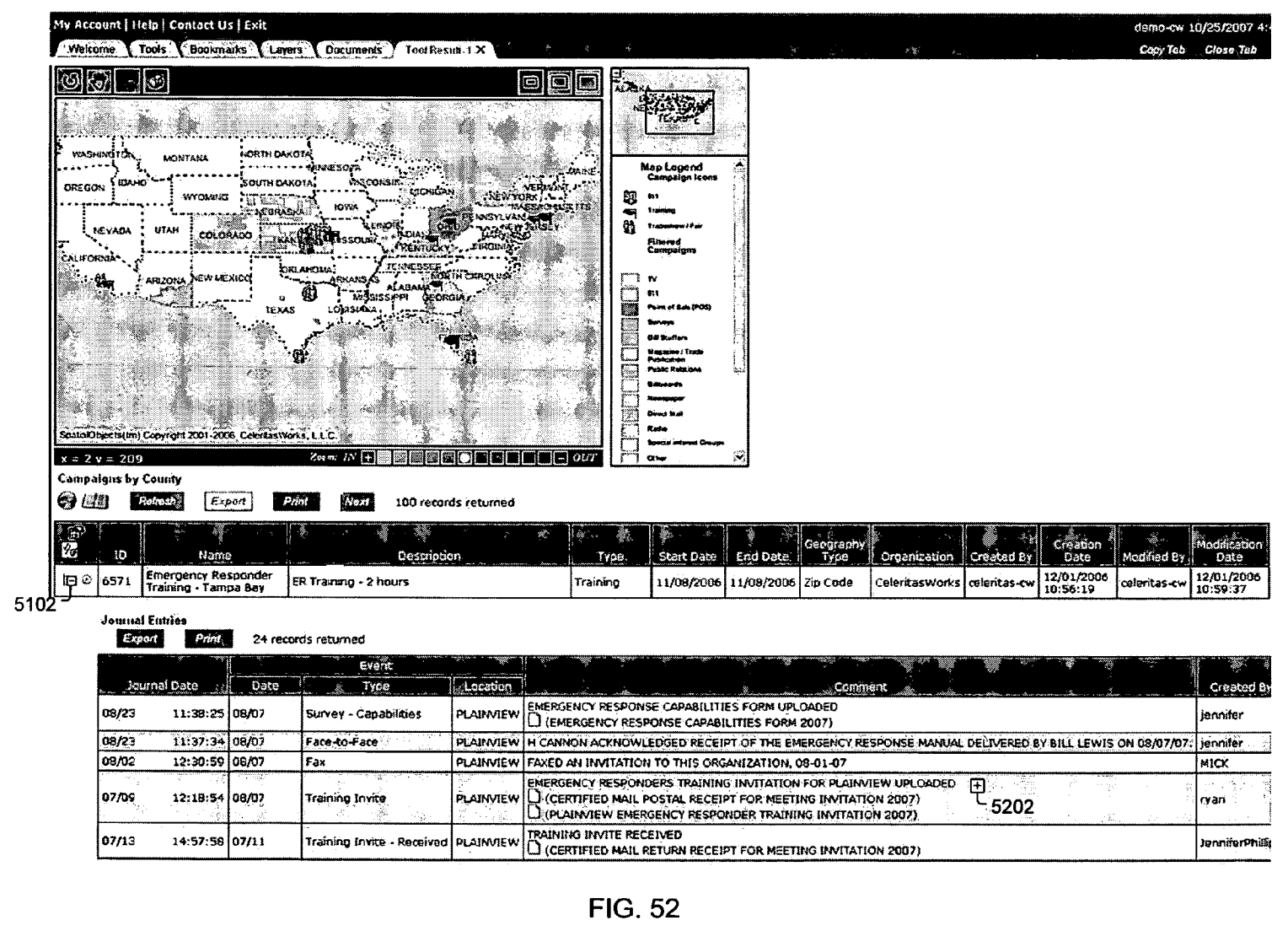

FIG. 52 depicts an exemplary embodiment of a screen using an expander 5202 to display multiple documents associated with a journal entry. A user selects the expander 5202 to see all of the documents for a journal entry. A user can select the expander 5202 again to reduce or close the set of documents.

Optionally, a bookmark feature (not shown) enables a user to save frequently referenced maps or other geospatial data or campaign data. By selecting a bookmark utility, users can save a current location with a title.

Those skilled in the art will appreciate that variations from the specific embodiments disclosed above are contemplated by the invention. The invention should not be restricted to the above embodiments, but should be measured by the following claims.

What is claimed is:

1. A campaign processing system comprising:
    at least one processor;
    a data management system executing on the at least one processor comprising campaign data for at least one campaign and geospatial data for a campaign area to which at least one campaign message for the campaign is directed, the campaign data comprising:
        audience data identifying a target audience to which the campaign message is directed;
        at least one campaign type for the campaign, the campaign type identifying how the campaign message is directed to the target audience; and
        a plurality of campaign events conveying the campaign message for the campaign type to the target audience in the campaign area;
    a spatial management system executing on the at least one processor to initiate a query of the geospatial data and the campaign data to the data management system, to receive selected geospatial data and selected campaign data from the data management system in response to the query, and to generate map image data for at least one image based on the selected geospatial data and at least some selected campaign data, the selected campaign data comprising at least one of the campaign events for the campaign type directed to the target audience and at least some audience data identifying at least one audience member to which the campaign message is directed, the at least one image identifying at least a portion of the campaign area to which the campaign message is directed to the target audience and campaign symbology in the campaign area portion identifying the at least one campaign event for the campaign type directed to the target audience;
    a program management system executing on the at least one processor to initiate the query to the spatial management system in response to an input, to receive the selected campaign data and the map image data from the spatial management system, to generate, based on the at least some campaign data, at least one instruction to render at least one point feature for the at least one audience member within the campaign area portion, and to generate at least one result comprising the selected campaign data and the map image data; and
    a user interface to receive the input, to transmit the input to the program management system, to receive the at least one result from the program management system, and to generate the at least one result for display.

2. The system of claim 1 wherein the selected campaign data comprises a plurality of the campaign events for the campaign type directed to the target audience and the at least one image further identifies the campaign symbology in the campaign area portion identifying the plurality of the campaign events for the campaign type directed to the target audience.

3. The system of claim 1 wherein the selected campaign data comprises a plurality of the campaign events for the campaign type directed to the target audience and the at least some audience data identifying the at least one audience member to which the campaign message is directed and the at least one image further identifies the campaign symbology in the campaign area portion identifying the plurality of the campaign events for the campaign type directed to the target audience and the audience member in the campaign area portion.

4. The system of claim 1 wherein the selected campaign data comprises a plurality of the campaign events for the campaign type directed to the target audience and wherein the at least some audience data identifies a plurality of audience members to which the campaign message is directed and the at least one image further identifies the campaign symbology in the campaign area portion identifying the plurality of the campaign events for the campaign type directed to the target audience and the plurality of audience members in the campaign area portion.

5. The system of claim 1 wherein:
    the campaign data further comprises:
        a plurality of campaign types for the campaign, each campaign type identifying how the campaign message is directed to the target audience; and
        a plurality of campaign events, each conveying the campaign message for at least one of the campaign types to the target audience in the campaign area; and
    the selected campaign data comprises a plurality of the campaign events for the campaign types directed to the target audience; and
    the at least one image further identifies the campaign symbology in the campaign area portion identifying the plurality of the campaign events for the campaign types directed to the target audience.

6. The system of claim 5 wherein the at least some audience data identifies a plurality of audience members to which the campaign message is directed and the at least one image further identifies the audience members in the campaign area portion.

7. The system of claim 1 wherein the at least some audience data identifies at least one audience member to which the campaign message is directed and the at least one image further identifies the campaign symbology in the campaign area portion identifying the audience member in the campaign area portion.

* * * * *